US012366326B2

(12) United States Patent
Lewis et al.

(10) Patent No.: US 12,366,326 B2
(45) Date of Patent: Jul. 22, 2025

(54) REUSE OF CONSTRUCTION SHAFTS IN COMPRESSED AIR ENERGY STORAGE SYSTEMS

(71) Applicant: Hydrostor Inc., Toronto (CA)

(72) Inventors: Cameron Lewis, Toronto (CA); Davin Young, Toronto (CA); Lucas Thexton, Toronto (CA); Josh Burtney, Sudbury (CA); Timothy Ross, Lakewood, CO (US)

(73) Assignee: Hydrostor Inc., Toronto (CA)

( * ) Notice: Subject to any disclaimer, the term of this patent is extended or adjusted under 35 U.S.C. 154(b) by 794 days.

(21) Appl. No.: 17/055,948

(22) PCT Filed: May 17, 2019

(86) PCT No.: PCT/CA2019/050680
§ 371 (c)(1),
(2) Date: Nov. 16, 2020

(87) PCT Pub. No.: WO2019/218085
PCT Pub. Date: Nov. 21, 2019

(65) Prior Publication Data
US 2021/0207771 A1    Jul. 8, 2021

Related U.S. Application Data

(60) Provisional application No. 62/672,785, filed on May 17, 2018, provisional application No. 62/789,240, filed on Jan. 7, 2019.

(51) Int. Cl.
*F17C 1/00* (2006.01)

(52) U.S. Cl.
CPC ........ *F17C 1/007* (2013.01); *F17C 2221/031* (2013.01); *F17C 2223/0123* (2013.01);
(Continued)

(58) Field of Classification Search
CPC ................ F17C 1/007; F17C 2221/031; F17C 2223/0123; F17C 2227/0372; F17C 2270/0147; F17C 2270/0581
See application file for complete search history.

(56) References Cited

U.S. PATENT DOCUMENTS

| 1,382,569 | A |   | 6/1921 | Godfrey |
| 2,749,714 | A | * | 6/1956 | Hunter ...................... B65G 5/00 166/50 |

(Continued)

FOREIGN PATENT DOCUMENTS

| AU | 2006233241 | 5/2007 |
| CA | 1073223 | 3/1980 |

(Continued)

OTHER PUBLICATIONS

Office Action dated Jan. 5, 2022 for Japanese Application No. 2019-562449.

(Continued)

*Primary Examiner* — Shafiq Mian
(74) *Attorney, Agent, or Firm* — Young Basile Hanlon & MacFarlane, P.C.

(57) ABSTRACT

A hydrostatically compensated compressed air energy storage system may include an accumulator disposed underground, a gas compressor/expander subsystem in fluid communication with the accumulator interior via an air flow path; a compensation liquid reservoir spaced apart from the accumulator and in fluid communication with the layer of compensation liquid within the accumulator via a compensation liquid flow path; and a first construction shaft extending from the surface of the ground to the accumulator and being sized and configured to i) accommodate the passage of a construction apparatus therethrough when the hydrostatically compensated compressed air energy storage system is being constructed, and ii) to provide at least a portion of one (Continued)

of the air flow path and the compensation liquid flow path when the hydrostatically compensated compressed air energy storage system is in use.

6 Claims, 21 Drawing Sheets

(52) U.S. Cl.
CPC .............. F17C 2227/0372 (2013.01); F17C 2270/0147 (2013.01); F17C 2270/0581 (2013.01)

(56) References Cited

U.S. PATENT DOCUMENTS

| | | | |
|---|---|---|---|
| 2,949,714 A * | 8/1960 | Davis | B65B 57/06 |
| | | | 53/502 |
| 3,019,854 A | 2/1962 | Waitus | |
| 3,643,426 A | 2/1972 | Janelid | |
| 3,895,493 A | 7/1975 | Rigollot | |
| 3,939,356 A | 2/1976 | Loane | |
| 3,988,897 A | 11/1976 | Strub | |
| 3,996,741 A | 12/1976 | Herberg | |
| 4,085,971 A | 4/1978 | Jacoby | |
| 4,147,204 A * | 4/1979 | Pfenninger | F28D 17/005 |
| | | | 60/659 |
| 4,150,547 A | 4/1979 | Hobson | |
| 4,343,569 A | 8/1982 | Schwarzenbach | |
| 4,355,923 A | 10/1982 | Schwarzenbach | |
| 4,391,552 A | 7/1983 | O'hara | |
| 4,392,354 A | 7/1983 | Schwarzenbach | |
| 4,399,656 A | 8/1983 | Laing | |
| 4,403,477 A | 9/1983 | Schwarzenbach | |
| 4,450,547 A | 5/1984 | Nakamura et al. | |
| 4,454,721 A * | 6/1984 | Hurlimann | B65G 5/00 |
| | | | 60/659 |
| 4,523,432 A | 6/1985 | Frutschi | |
| 4,538,414 A | 9/1985 | Saleh | |
| 4,727,930 A | 3/1988 | Bruckner | |
| 5,634,340 A | 6/1997 | Grennan | |
| 6,167,951 B1 | 1/2001 | Couch | |
| 6,185,841 B1 | 2/2001 | Conochie | |
| 6,467,535 B1 | 10/2002 | Shembekar | |
| 6,637,977 B2 | 10/2003 | Hayashi | |
| 6,739,522 B2 | 5/2004 | Laumen | |
| 7,663,255 B2 | 2/2010 | Kim | |
| 7,755,212 B2 | 7/2010 | Enis et al. | |
| 8,136,354 B2 | 3/2012 | Havel | |
| 8,277,145 B2 | 10/2012 | Dickinson, III et al. | |
| 8,663,255 B2 | 3/2014 | Torain et al. | |
| 8,739,522 B2 | 6/2014 | Anikhindi | |
| 9,045,209 B2 | 6/2015 | Zeren et al. | |
| 9,322,296 B2 | 4/2016 | Hugo et al. | |
| 9,383,105 B2 | 7/2016 | Naeve | |
| 9,404,512 B2 | 8/2016 | Ulrich | |
| 9,422,948 B2 | 8/2016 | Kim et al. | |
| 9,433,910 B2 | 9/2016 | Wyttenbach | |
| 9,739,536 B2 | 8/2017 | Erben | |
| 9,777,965 B2 | 10/2017 | Chordia | |
| 9,803,603 B2 | 10/2017 | Ganser | |
| 9,803,803 B1 * | 10/2017 | Adams | F17C 1/007 |
| 10,859,207 B2 | 12/2020 | Lewis | |
| 11,274,792 B2 | 3/2022 | Stradiotto | |
| 11,519,393 B2 | 12/2022 | Lewis | |
| 11,591,957 B2 | 2/2023 | Howitt | |
| 11,644,150 B2 | 5/2023 | Stradiotto | |
| 11,767,950 B2 | 9/2023 | Lewis et al. | |
| 11,821,584 B2 | 11/2023 | Stradiotto | |
| 11,835,023 B2 | 12/2023 | Young | |
| 2003/0021631 A1* | 1/2003 | Hayashi | B65G 5/00 |
| | | | 405/52 |
| 2005/0004416 A1* | 1/2005 | Okutsu | E21D 9/13 |
| | | | 588/250 |
| 2008/0000233 A1 | 1/2008 | Althaus | |
| 2010/0218500 A1 | 9/2010 | Ruer | |
| 2010/0248500 A1 | 9/2010 | Ting et al. | |
| 2011/0094212 A1 | 4/2011 | Ast | |
| 2011/0094229 A1 | 4/2011 | Freund et al. | |
| 2011/0094231 A1 | 4/2011 | Freund | |
| 2011/0094242 A1 | 4/2011 | Koerner | |
| 2011/0100010 A1 | 5/2011 | Freund et al. | |
| 2011/0296823 A1 | 12/2011 | Mcbride | |
| 2012/0057998 A1 | 3/2012 | Ingersoll | |
| 2012/0067047 A1 | 3/2012 | Peterson | |
| 2012/0102954 A1 | 5/2012 | Ingersoll | |
| 2012/0174569 A1 | 7/2012 | Ingersoll | |
| 2012/0297776 A1 | 11/2012 | Bollinger | |
| 2013/0061591 A1 | 3/2013 | Bove | |
| 2014/0013735 A1* | 1/2014 | McBride | E21D 11/38 |
| | | | 60/398 |
| 2014/0020369 A1 | 1/2014 | Guidati | |
| 2015/0000248 A1 | 1/2015 | del Omo | |
| 2015/0015210 A1 | 1/2015 | Bradwell | |
| 2015/0019096 A1 | 1/2015 | Kim | |
| 2015/0091301 A1 | 4/2015 | Littmann | |
| 2015/0114611 A1 | 4/2015 | Morris | |
| 2015/0125210 A1 | 5/2015 | Ingersoll | |
| 2015/0267612 A1 | 9/2015 | Bannari | |
| 2016/0032783 A1 | 2/2016 | Howes | |
| 2016/0231072 A1 | 8/2016 | Pohlman | |
| 2017/0013867 A1 | 1/2017 | Kelleher et al. | |
| 2017/0138674 A1 | 5/2017 | Pourima | |
| 2017/0159503 A1 | 6/2017 | Plais | |
| 2017/0350658 A1 | 12/2017 | Kerth | |
| 2018/0017213 A1 | 1/2018 | Deleau | |
| 2018/0094581 A1 | 4/2018 | Teixeira | |
| 2018/0179916 A1 | 6/2018 | Larochelle | |
| 2018/0313270 A1 | 11/2018 | Jones | |
| 2019/0011593 A1 | 1/2019 | Marsala et al. | |
| 2019/0346082 A1 | 11/2019 | Lewis | |
| 2020/0103178 A1 | 4/2020 | Gerstler | |
| 2021/0207586 A1 | 7/2021 | Lewis | |
| 2021/0388809 A1 | 12/2021 | Young | |
| 2021/0388810 A1 | 12/2021 | Young | |
| 2022/0090585 A1 | 3/2022 | Lewis | |
| 2022/0196341 A1 | 6/2022 | Young | |
| 2023/0110494 A1 | 4/2023 | Cameron | |
| 2023/0332843 A1 | 10/2023 | Lewis | |
| 2024/0035621 A1 | 2/2024 | Stradiotto | |
| 2024/0191725 A1 | 6/2024 | Young | |
| 2024/0218885 A1 | 7/2024 | Young | |

FOREIGN PATENT DOCUMENTS

| | | | |
|---|---|---|---|
| CA | 1160063 A | 1/1984 | |
| CA | 1179511 | 12/1984 | |
| CA | 1281611 C | 3/1991 | |
| CA | 2785004 A1 | 6/2011 | |
| CA | 2807502 A1 | 2/2012 | |
| CA | 2824798 A1 | 7/2012 | |
| CA | 2982255 A1 | 10/2016 | |
| CA | 3052080 A1 | 8/2018 | |
| CA | 3055620 A1 | 9/2018 | |
| CN | 103206349 A | 7/2013 | |
| CN | 205422944 U | 8/2016 | |
| CN | 107842392 A | 3/2018 | |
| CN | 207847852 U | 9/2018 | |
| DE | 2636417 A1 | 2/1978 | |
| DE | 102010055750 A1 | 6/2012 | |
| EP | 0044581 A1 | 1/1982 | |
| EP | 0566868 A1 | 2/1996 | |
| EP | 1443177 A1 * | 8/2004 | E21D 1/00 |
| EP | 2447501 A2 | 5/2012 | |
| EP | 2450549 A2 | 5/2012 | |
| EP | 2549090 | 1/2013 | |
| EP | 2559881 A2 | 2/2013 | |
| EP | 2530283 B1 | 9/2013 | |
| EP | 2832666 A1 | 2/2015 | |
| FR | 2706432 A1 | 12/1994 | |
| FR | 3023321 | 1/2016 | |
| FR | 3019854 A1 | 10/2016 | |
| GB | 1213112 A | 11/1970 | |
| GB | 2013318 A | 8/1979 | |

(56) References Cited

FOREIGN PATENT DOCUMENTS

| | | |
|---|---|---|
| GB | 2528449 A | 1/2016 |
| JP | S54133211 A | 10/1979 |
| JP | 55-115498 | 8/1980 |
| JP | S55-115498 U | 8/1980 |
| JP | S5797997 A | 6/1982 |
| JP | 85797997 A | 4/1983 |
| JP | H0275730 A | 3/1990 |
| JP | H04121424 A | 4/1992 |
| JP | H05214888 A | 8/1993 |
| JP | H07330079 A | 12/1995 |
| JP | H09-154244 A | 6/1997 |
| JP | 2636417 B2 | 7/1997 |
| JP | H09287156 A | 11/1997 |
| JP | H1121926 | 1/1999 |
| JP | 2005009609 A | 1/2005 |
| JP | 2013509528 A | 3/2013 |
| JP | 2016211515 A | 12/2016 |
| WO | 1998039613 | 9/1998 |
| WO | 2011053411 A1 | 5/2011 |
| WO | 2012097216 | 7/2012 |
| WO | 2013131202 A1 | 9/2013 |
| WO | 2014183894 | 11/2014 |
| WO | 2015015184 A2 | 2/2015 |
| WO | 2015019096 A1 | 2/2015 |
| WO | 2015159278 | 10/2015 |
| WO | 2016012764 A1 | 1/2016 |
| WO | 2016131502 A1 | 8/2016 |
| WO | 2016185906 A1 | 11/2016 |
| WO | 2017093768 A1 | 6/2017 |
| WO | 2017140481 A1 | 8/2017 |
| WO | 2017194253 A1 | 11/2017 |
| WO | 2017198397 A1 | 11/2017 |
| WO | 2018141057 A1 | 8/2018 |
| WO | 2018161172 | 9/2018 |
| WO | 2019011593 A1 | 1/2019 |
| WO | 2019218084 | 11/2019 |
| WO | 2019218085 | 11/2019 |
| WO | 2020146938 | 7/2020 |
| WO | 2020160635 | 8/2020 |
| WO | 2020160670 | 8/2020 |
| WO | 2020160681 | 8/2020 |
| WO | 2020172748 | 9/2020 |
| WO | 2022213179 | 10/2022 |
| WO | 2022226656 | 11/2022 |
| WO | 2024130447 | 6/2024 |

OTHER PUBLICATIONS

European Search Report received for European Application No. 18747216.2 on Apr. 7, 2021, 17 pgs.
Office Action (Notice of Allowance and Fees Due (PTOL-85)) dated Apr. 9, 2024 for U.S. Appl. No. 17/055,949 (pp. 1-8).
Office Action dated Apr. 26, 2024 for Eurpoean Application No. 19803698.
Office Action dated May 3, 2024 for Australian Application 2019268820.
Supplemental Search Report issued for European Application No. 19803698.0, mailed Feb. 8, 2022.
International Search Report and Written Opiniont Received for PCT/CA2019/050680, mailed Jul. 8, 2019.
Jorio, Luigi, "A huge battery made of air" online article published Aug. 10, 2016, available at https://www.swissinfo.ch/eng/sci-tech/energy-in-the-mountains_a-huge-battery-made-of-air/42362400.
Laubscher, Hendrik et al. "Developing a cost effective rock bed thermal energy storage system: Design and modelling", article published Jun. 27, 2017.
Wang, J et al., Overview of Compressed Air Energy Storage and Technology Development; Energies; 2017; 10, 991; 22 pages; http://wrap.warwick.ac.uk/91858/7/WRAP-overview-compressed-air-energy-storage-technology- Jevelopment-Wang-2017.pdf.

RWE Power AG: Essen/Koln, "ADELE-Adiabatic Compressed-Air Energy Storage for Electricity Supply", Feb. 3, 2011; http://www.rwe.com/web/cms/mediablob/en/391748/data/235554/1/rwe-power-ag/press/company/Brochure-ADELE.pdf.
Sequi, P.M. "Modelling of the Dynamic Behavior of an Advanced Adiabatic Compressed Air Energy Storage (AA-Caes)", Nov. 2018; 154 pages with Translation; http://oa.upm.es/53802/1/TFG_PABLO_MARTIN_SEQUI.pdf.
Office Action (Non-Final Rejection) dated Apr. 15, 2024 for U.S. Appl. No. 18/237,021 (pp. 1-11).
Office Action (Non-Final Rejection) dated Jun. 20, 2024 for U.S. Appl. No. 18/377,933 (pp. 1-9).
European Search Report issued for European Appliaction No. 19914559.0, mailed Nov. 9, 2022.
European Search Reported issued for European Appliation No. 20753221.9, mailed Sep. 29, 2022.
International Search Report and Written Opinion received for PCT Serial No. PCT/CA2019/050700 on Sep. 27, 2019, 9 pgs.
Office Action (Final Rejection) dated Jan. 25, 2024 for U.S. Appl. No. 17/429,146 (pp. 1-18).
International Search Report for PCT/CA2020/050169, mailed Apr. 15, 2020.
Office Action (Non-final) issued for U.S. Appl. No. 17/429,155, mailed Dec. 12, 2023.
"Shell and Tube Heat Exchangers" article available online from Thermopedia as of Feb. 8, 2011, available at https://www.thermopedia.com/content/1121/.
"Coil-Wound Heat Exchangers (CWHEs)" publication from Linde Engineering, copyright 2018-2019, available online at https://assets.linde.com/-/media/global/engineering/engineering/home/products-and-services/plant-components/plate-fin-heat-exchangers/coil-wound-heat-exchanger-2019.pdf.
European Search Report issued for European Application No. 20740789.1, mailed Sep. 27, 2022.
International Search Report and Written Opinion received for PCT Serial No. PCT/CA2020/050032 dated Mar. 27, 2020, 10 pgs.
Office Action (Final Rejection) dated Feb. 16, 2024 for U.S. Appl. No. 17/974,363 (pp. 1-6).
Office Action (Notice of Allowance and Fees Due (PTOL-85)) dated Jun. 24, 2024 for U.S. Appl. No. 17/974,363 (pp. 1-8).
International Search Report and Written Opinion received for PCT/CA2020/050153 on Apr. 24, 2020,11 pgs.
Office Action (Final Rejection) dated Apr. 5, 2024 for U.S. Appl. No. 17/422,616 (pp. 1-9).
International Search Report and Written Opinion received for PCT Serial No. PCT/CA2020/050246 dated May 27, 2020, 10 pgs.
International Search Report for PCT/CA2022/050656, mailed Jul. 21, 2022.
International Preliminary Report on Patentability for PCT/CA2022/050656, mailed Oct. 24, 2023.
International Preliminary Report on Patentability issued on PCT/CA2022/050503 on Oct. 10, 2023.
International Search Report and Written Opinion for PCT/CA2023/051761 mailed Feb. 19, 2024.
International Preliminary Report on Patentability issued on PCT/CA2018/050112 mailed May 21, 2019 (26 pages).
International Preliminary Report on Patentability issued on PCT/CA2018/050282 mailed Sep. 10, 2019.
International Preliminary Report on Patentability issued on PCT/CA2019/050679 mailed Nov. 17, 2020.
International Preliminary Report on Patentability issued on PCT/CA2019/050680 mailed on Nov. 17, 2020.
Non-final office action issued for U.S. Appl. No. 17/429,146, mailed on Aug. 8, 2024.
Sequi, P. M., "Modelling of the Dynamic Behavior of an Advanced Adiabatic Compressed Air Energy Storage (AA-Caes", Escuela Tecnica Superior de Ingenieros Industriales-UPM, (20181100), pp. 41-117, URL: http://oa.upm.es/53802/1/TFG_PABLO_MARTIN_SEQUI.pdf, (Mar. 25, 2020), XP055731474.

\* cited by examiner

REUSE OF CONSTRUCTION SHAFTS IN COMPRESSED AIR ENERGY STORAGE SYSTEMS

CROSS-REFERENCE TO RELATED APPLICATIONS

This application claims priority to U.S. Provisional Patent Application Ser. No. 62/672,785, filed May 17, 2018 and entitled A Hydrostatically Compressed Gas Energy Storage System, and to U.S. Provisional Patent Application Ser. No. 62/789,240, filed Jan. 7, 2019 and entitled A Compressed Gas Energy Storage System, and the entirety of these applications being incorporated by reference herein.

FIELD

The present disclosure relates generally to compressed gas energy storage, and more particularly to a compressed gas energy storage system such as, for example, one including a hydrostatically compensated, compressed air energy storage accumulator located underground, the use thereof.

INTRODUCTION

Electricity storage is highly sought after, in view of the cost disparities incurred when consuming electrical energy from a power grid during peak usage periods, as compared to low usage periods. The addition of renewable energy sources, being inherently of a discontinuous or intermittent supply nature, increases the demand for affordable electrical energy storage worldwide.

Thus, there exists a need for effectively storing the electrical energy produced at a power grid or a renewable source during a non-peak period and providing it to the grid upon demand. Furthermore, to the extent that the infrastructural preparation costs and the environmental impact from implementing such infrastructure are minimized, the utility and desirability of a given solution is enhanced.

Furthermore, as grids transform and operators look to storage in addition to renewables to provide power and replace traditional forms of generation that also provide grid stability, such as voltage support, a storage method that offers inertia based synchronous storage is highly desirable.

SUMMARY OF THE INVENTION

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

The present invention is a novel system and method for repurposing an excavation shaft, or set of shafts, used to construct a compressed gas energy storage system for use as a thermal storage reservoir. The invention contemplates two states of the system: first, when the system is being constructed; and second, when the system is in operation as a compressed gas energy storage system. In the construction state, the excavation shaft(s) is connected to the accumulator and configured so that the interior of the accumulator is accessible via the excavation shaft. In the operation state, the excavation shaft is isolated from the accumulator with a seal on the lower end of the excavation shaft and is used to store thermal storage media that exchanges thermal energy with the compressed gas.

In a preferred embodiment, the excavation shaft is lined with a shaft liner to make the shaft substantially liquid impermeable and reduce transfer of thermal energy with the surrounding environment.

The invention contemplates a variety of possible designs of the excavation shaft(s), which may maintain its original shape as excavated, or may be further developed with at least one chamber attached to the excavation shaft(s) to aid in storing the thermal storage media. In some embodiments, the system may include multiple shafts (optionally lined) that are connected in fluid communication with each other (at their lower end or bottom). The shafts may be connected via a lateral shaft, cavern and/or via an underground chamber that is in communication with each shaft. This underground chamber may be at the same horizon/depth as the accumulator, which may help reduce shaft breakout costs. Alternatively, the underground chamber may be at a shallower horizon/depth than the accumulator, which may help reduce pumping requirements. Because the contents of the chamber/shafts will be at a different temperature than the contents of the accumulator, it may be desirable for the chamber/shafts to be separated from the accumulator with one or more walls, which may include one or more concrete bulkheads/plugs.

There are several possibilities for the thermal storage media, including liquids or solids, such as granular particles like sand or gravel. Similarly, there are many possible configurations for the heat exchange of thermal energy between the thermal storage media and the compressed gas, including both direct and indirect heat exchangers. The choice of heat exchanger style may be influenced by the choice of thermal storage media.

Water may be a preferable choice of thermal storage media. Water has relatively fewer environmental concerns than some other possible thermal storage fluids, has relatively few or limited adverse effects on human health, is relatively plentiful and inexpensive and can be used at suitable operating temperatures for the systems described herein when kept under an appropriate pressure. If water is pressurized above its vapour pressure for a given temperature, then the water will stay in its liquid state even if it would have boiled were it being maintained at a lower pressure. Pressuring water to above atmospheric pressures may help keep it in its liquid state at temperatures higher than 100 deg. C., which may help facilitate the storage of more thermal energy within the water than would be possible at atmospheric pressure.

In accordance with one broad aspect of the teachings described herein, which may be used alone or in combination with any other aspect, a compressed gas energy storage system may include an accumulator disposed underground and having an interior configured to contain compressed gas when in use; a gas compressor/expander subsystem spaced apart from the accumulator and comprising at least a first compression stage having a gas inlet and a gas outlet in fluid communication with the accumulator interior via a gas flow path for conveying compressed gas to the accumulator when in a charging mode and from the accumulator when in a discharging mode; at least a first thermal storage reservoir disposed at least partially underground and comprising; i. at least one excavation shaft extending between an upper end accessible from the surface and a lower end adjacent to the accumulator and configured so that when the accumulator was being constructed the interior of the accumulator was accessible via the excavation shaft, ii. a lower end wall sealing the lower end of the excavation shaft and fluidly isolating the excavation shaft from the interior of the accumulator, iii. an upper end wall sealing the upper end of the excavation shaft and fluidly isolating the excavation shaft from the atmosphere, iv. a thermal storage media disposed within the excavation shaft and configured to exchange thermal energy with the compressed gas travelling through the gas flow path; whereby when the compressed gas energy storage system is in the charging mode thermal energy is transferred from the compressed gas stream being conveyed into the accumulator to the thermal storage media, and when the compressed gas energy system is in the discharging mode thermal energy is transferred from the thermal storage media to the compressed gas stream being conveyed from the accumulator.

In accordance with another broad aspect of the teachings described herein, a hydrostatically compensated compressed air energy storage system may contain an accumulator disposed underground and including an accumulator interior for containing a layer of compressed air above a layer of compensation liquid. A hydrostatically compensated compressed air energy storage system may also contain a gas compressor/expander subsystem which may be in fluid communication with the accumulator interior via an air flow path that may be configured to convey a flow of compressed air into and out of the accumulator. A hydrostatically compensated compressed air energy storage system may also contain a compensation liquid reservoir spaced apart from the accumulator and which may be in fluid communication with the layer of compensation liquid within the accumulator via a compensation liquid flow path such that compensation liquid can flow between the accumulator and the compensation liquid reservoir when in use. A hydrostatically compensated compressed air energy storage system may also contain a first construction shaft extending from the surface of the ground to the accumulator and being sized and configured to accommodate the passage of a construction apparatus therethrough when the hydrostatically compensated compressed air energy storage system may be being constructed, and to provide at least a portion of one of the air flow path and the compensation liquid flow path when the hydrostatically compensated compressed air energy storage system is in use.

The system may be operable in a charging mode in which the gas compressor/expander subsystem may covey compressed air at a storage pressure into the layer of compressed air which displaces a corresponding amount of compensation liquid from the layer of compensation liquid out of the accumulator via the compensation liquid flow path thereby maintaining the layer of compressed air at substantially the storage pressure during the charging mode. The system where the system may also be operable in a discharging mode in which air from the layer of compressed air exits the accumulator and drives the gas compressor/expander subsystem and a corresponding amount of compensation liquid may be re-introduced into the layer of compensation liquid within the accumulator via the compensation liquid flow path thereby maintaining the layer of compressed air at substantially the storage pressure during the discharging mode. The system where the system may also be operable in a storage mode in which there may be no flow of the compressed air or compensation liquid and the layer of compressed air and the layer of compensation liquid are retained within the accumulator at substantially the storage pressure.

The first construction shaft may provide at least a portion of the compensation liquid flow path such that when the system may be in the charging mode compensation liquid flows through the first construction shaft from the accumulator to the compensation liquid reservoir.

When the system is in the discharging mode compensation liquid may flow through the first construction shaft from the compensation liquid reservoir to the accumulator.

The first construction shaft may have an upper end proximate the ground surface and a lower end connected to an upper wall of the accumulator and may contain a lower end wall fluidly separating an interior of the first construction shaft from an interior of the accumulator, and wherein the compensation liquid flow path may further contain a liquid supply conduit having an upper end in communication with the interior of the first construction shaft and a lower end provided within the accumulator and submerged within the layer of compensation liquid thereby providing fluid communication between the layer of compensation liquid and the interior of the first construction shaft.

The accumulator may contain a lower wall underlying and generally opposing the upper wall and a sump chamber extending below the lower wall and containing compensation liquid, and wherein the lower end of the liquid supply conduit may be disposed within the sump chamber.

The upper end of the first construction shaft may be in fluid communication with the compensation liquid reservoir.

The first construction shaft may have a substantially constant cross-sectional area between the upper end and lower end.

The system may further contain a second construction shaft spaced apart from the first construction shaft and extending from the surface of the ground to the accumulator and being sized and configured to accommodate the passage of a construction apparatus therethrough or as a supply conduit of ventilation air when the hydrostatically compensated compressed air energy storage system is being constructed, and to provide at least a portion of the air flow path when the hydrostatically compensated compressed air energy storage system is in use.

When the system is in the charging mode compressed air may flow through the second construction shaft from the gas compressor/expander subsystem to the accumulator.

When the system is in the discharging mode compressed air may flow through the first construction shaft from the accumulator to the gas compressor/expander subsystem.

The second construction shaft has an upper end proximate the surface and may be in fluid communication with the gas compressor/expander subsystem and a lower end proximate the accumulator and in fluid communication with the layer of compressed air.

The upper end of the second construction shaft may be sealed thereby the interior of the second construction shaft is fluidly isolated from the atmosphere.

The first construction shaft may have a larger cross-sectional area than the second construction shaft.

The first construction shaft may have the same cross-sectional area as the second construction shaft.

The first construction shaft may provide at least a portion of the air flow path and when the system may be in the charging mode compressed air flows through the first construction shaft from the gas compressor/expander subsystem to the accumulator.

The first construction shaft may provide at least a portion of the air flow path and when the system is in the discharging mode compressed air may flow through the first construction shaft from the accumulator to the gas compressor/expander subsystem The system may further contain a thermal storage subsystem including a thermal source reservoir for containing a thermal storage liquid at a low storage temperature. The system may further contain a thermal storage subsystem which may include a thermal storage reservoir which may be in communication with the thermal source reservoir via a thermal liquid flow path and configured to contain the thermal storage liquid at a high storage temperature. The system may further contain a thermal storage subsystem including at least a first heat exchanger which may be disposed in the thermal liquid flow path between the thermal source reservoir and the thermal storage reservoir and in the air flow path between the gas compressor/expander subsystem and the accumulator, whereby when the compressed gas energy storage system may be in the charging mode thermal energy is transferred from the compressed air flowing through the air flow path to the thermal storage liquid flowing through the thermal liquid flow path.

The system may further contain a third construction shaft spaced apart from the first and second construction shafts and extending from the surface of the ground to the accumulator and being sized and configured to accommodate the passage of a construction apparatus therethrough or as a supply conduit of ventilation air when the hydrostatically compensated compressed air energy storage system may be being constructed, and may contain at least a portion of the thermal storage reservoir when the system may be in use.

The first construction shaft may be sized to receive an equipment lifting platform when a hoist is positioned at an upper end of the first construction shaft.

The first construction shaft may directly contact one of the compressed gas or the compensation liquid when the when the hydrostatically compensated compressed air energy storage system is in use.

The one of the air flow path and the compensation liquid flow path may contain an inner fluid flow conduit extending within the first construction shaft.

The first construction shaft may have an upper end proximate the surface and a lower end proximate the accumulator.

The lower end of the shaft may be connected to an upper wall of the accumulator.

The lower end of the shaft may be connected to a sump chamber extending below the lower wall of the accumulator.

The first construction shaft may have a transverse width of about 2 m or more.

The first construction shaft may have a generally circular cross-sectional shape and has a diameter of between about 1.5 m and about 7 m.

The first construction shaft has a generally circular cross-sectional shape and has a diameter of between about 2 m and about 5 m.

The first construction shaft may have a cross-sectional area of between about 3 $m^2$ and about 60 $m^2$.

The first construction shaft may have a cross-sectional area of between about 4 $m^2$ and about 20 $m^2$.

The first construction shaft may be lined with a shaft liner that may be substantially liquid impermeable.

The first construction shaft may be lined with a shaft liner that may be substantially air impermeable.

The shaft liner may contain at least one of concrete, metal, shotcrete, gunite, sprayed concrete, grout, composite materials, and plastic.

The shaft liner may have a thickness in the lateral direction that may be between about 0.02 m and about 2 m, and preferably is about 0.3 m.

The shaft liner may be configured to withstand pressure differences of between about between about 20 bar and about 100 bar, and preferably between about 40 bar and about 80 bar.

The shaft liner may have a thermal conductivity of between about 0.02 W/m K to 60 W/m K to inhibit thermal transfer between an interior of the first construction shaft and the surrounding ground when the hydrostatically compensated compressed air energy storage system may be in use.

The shaft liner may be configured to accommodate the passage of a construction apparatus, through the first construction shaft when the hydrostatically compensated compressed air energy storage system may be being constructed and to accommodate the flow of the compensation liquid when the first construction shaft may be filled with the compensation liquid when the hydrostatically compensated compressed air energy storage system is in use.

The first construction shaft may contain a generally vertical bore extending axially from the surface to the accumulator.

The first construction shaft may be configured as a helical decline ramp.

The first construction shaft may be configured as a decline ramp with at least one of linear and curved sections.

The decline ramp may contain a substantially flat bottom wall to accommodate the driving of vehicles and a curved, opposing upper wall.

The system may further contain at least a first debris catchment provided in the bottom wall of the decline and may be configured to receive and retain debris travelling within the first construction shaft when the system is in use.

The first debris catchment may include a cover that may be movable between an open position, in which first debris catchment may be uncovered to receive debris travelling within the shaft, and a closed position, in in which the first debris catchment may be covered and can be traversed by a vehicle travelling along the bottom wall of the decline.

The first construction shaft may contain at least a first dispersion member configured to break-up bubbles travelling upwardly through the decline.

The first dispersion member may be moveable between a deployed position in which is covers between about 10% and about 80% of a cross-sectional flow area of the shaft and a retracted position in which a vehicle can drive through the shaft without interference from the first dispersion member.

In accordance with another broad aspect of the teachings described herein, a method of reusing at least a first construction shaft utilized for the construction of a hydrostatically compressed air energy storage system during the operation of the hydrostatically compressed air energy storage system may include conveying at least a first construction apparatus into or out of an underground accumulator through the first construction shaft when constructing the accumulator. A method of reusing at least a first construction shaft utilized for the construction of a hydrostatically compressed air energy storage system during the operation of the hydrostatically compressed air energy storage system may also include removing the first construction apparatus from the accumulator and the first construction shaft. A method of reusing at least a first construction shaft utilized for the construction of a hydrostatically compressed air energy storage system during the operation of the hydrostatically compressed air energy storage system may also include converting the first construction shaft to become an operating component of the hydrostatically compressed air energy storage system by fluidly connecting the first construction shaft to form part of at least one of: an air flow path fluidly connecting a gas compressor/expander subsystem with a layer of compressed gas within the accumulator; a compensation liquid flow path fluidly connecting a compensation liquid reservoir and a layer of compensation liquid within the accumulator; and a thermal fluid flow path fluidly connecting a thermal source reservoir and a thermal storage reservoir.

The method may further contain operating the hydrostatically compressed air energy storage system in at least one of: a charging mode in which the gas compressor/expander subsystem may convey compressed air at a storage pressure into the layer of compressed air which displaces a corresponding amount of compensation liquid from the layer of compensation liquid out of the accumulator via the compensation liquid flow path thereby maintaining the layer of compressed air at substantially the storage pressure during the charging mode; a discharging mode in which air from the layer of compressed air may exit the accumulator and drive the gas compressor/expander subsystem and a corresponding amount of compensation liquid may be re-introduced into the layer of compensation liquid within the accumulator thereby maintaining the layer of compressed air at substantially the storage pressure during the discharging mode; and a storage mode in which there may be no flow of the compressed air or compensation liquid and the layer of compressed air and the layer of compensation liquid may be retained within the accumulator at substantially the storage pressure.

The first step further includes transporting construction debris from an interior of the accumulator to the surface via the first construction shaft.

The method may further include providing a hoist at an upper end of the first construction shaft for raising and lowering the at least one of the first construction apparatus, construction personnel, or construction debris within the first construction shaft the first and second steps and then removing the hoist.

The first construction shaft may form part of the compensation liquid flow path for conveying compensation liquid between the compensation liquid reservoir and an interior of the accumulator via the first construction shaft.

A lower end of the first construction shaft may be connected to an upper wall of the accumulator and wherein the third step includes sealing the lower end of the first construction shaft with a lower end wall to fluidly isolate an interior of the first construction shaft from a layer of compressed air within an upper portion of the accumulator and providing liquid supply conduit having one end in communication with the interior of the first construction shaft and a second end submerged within a layer of compensation liquid within the accumulator The method may further include arranging the fluid supply conduit to extend into a sump chamber extending below the lower end wall.

The method may further include excavating the first construction shaft prior to the first step.

Excavating the first construction shaft may include blind boring, raise boring, tunnel boring, or various iterations of drilling, blasting and mucking.

The method may further include lining an interior surface of the first construction shaft with a shaft liner that is substantially liquid impermeable, and wherein the second step is completed with the shaft liner in place.

The method may further include reusing a second construction shaft utilized for the construction of the hydrostatically compressed air energy storage system during the operation of the hydrostatically compressed air energy storage system, and including the steps of: conveying at least one of ventilation air, construction personnel, or at least a second construction apparatus into or out of the underground accumulator through the second construction shaft when constructing the accumulator; removing the ventilation air, construction personnel, or second construction apparatus from the accumulator and the second construction shaft; converting the second construction shaft to become an operating component of the hydrostatically compressed air energy storage system by fluidly connecting the second construction shaft to form part of at least one of: an air flow path which may fluidly connect a gas compressor/expander subsystem with a layer of compressed gas within the accumulator, a compensation liquid flow path which may fluidly connect a compensation liquid reservoir and a layer of compensation liquid within the accumulator; and a thermal fluid flow path which may fluidly connect a thermal source reservoir and a thermal storage reservoir.

Some steps described herein may be conducted simultaneously with each other.

Some steps described herein may be conducted independently of each other.

The second construction shaft may be fluidly connected to form part of a different one of the air flow path, compensation liquid flow path and thermal fluid flow path than the first construction shaft.

The second construction shaft may form part of the air flow path.

The third step may include maintaining fluid communication between a lower end of the second construction shaft and an upper portion of an interior of the accumulator, fluidly connecting an upper end of the second construction shaft to the gas compressor/expander subsystem, and fluidly isolating an interior of the second construction shaft from the surrounding atmosphere.

Fluidly isolating an interior of the second construction shaft from the surrounding atmosphere may include sealing an upper end of the second construction shaft using an upper end wall.

The method may further include reusing a third construction shaft utilized for the construction of the hydrostatically compressed air energy storage system during the operation of the hydrostatically compressed air energy storage system, and including the steps of: conveying at least one of ventilation air, construction personnel, muck, or at least a third construction apparatus into or out of the underground accumulator through the third construction shaft when constructing the accumulator; removing the ventilation air, construction personnel, muck, or the third construction apparatus from the accumulator and the third construction shaft; converting the third construction shaft to become an operating component of the hydrostatically compressed air energy storage system by fluidly connecting the third construction shaft to form part of at least one of: an air flow path fluidly connecting a gas compressor/expander subsystem with a layer of compressed gas within the accumulator; a compensation liquid flow path fluidly connecting a compensation liquid reservoir and a layer of compensation liquid within the accumulator; and a thermal fluid flow path fluidly connecting a thermal source reservoir and a thermal storage reservoir.

The third construction shaft may be fluidly connected to form part of a different one of the air flow path, compensation liquid flow path and thermal fluid flow path than the first construction shaft and the second construction shaft.

The third construction shaft may contain at least a portion of the thermal storage reservoir.

The first construction shaft may be fluidly connected to form part of the air flow path for conveying compressed air between the compressor/expander subsystem and an interior of the accumulator via the first construction shaft.

The first construction shaft may be fluidly connected to form part of the thermal fluid flow path for conveying thermal fluid between the thermal source reservoir and the thermal storage reservoir.

Another broad aspect of the teachings described may include the use of a first construction shaft as an fluid conveying component of a hydrostatically compressed air energy storage system, the first construction shaft may extend from the surface of the ground to the underground accumulator and may be sized and configured to accommodate the passage of a construction apparatus therethrough when the hydrostatically compensated compressed air energy storage system is being constructed, and wherein when the hydrostatically compressed air energy storage system is use the first construction shaft may be configured to be part of at least one of: an air flow path extending between a compressor/expander subsystem and an underground accumulator containing a layer of compressed air atop a layer of the compensation liquid; a compensation liquid flow path extending between a compensation liquid reservoir and the underground accumulator containing the layer of compressed air atop the layer of the compensation liquid; and a thermal fluid flow path fluidly connecting a thermal source reservoir and a thermal storage reservoir.

In accordance with another broad aspect of the teachings described herein, a hydrostatically compensated compressed air energy storage system may contain an accumulator comprising an underground chamber having an accumulator interior for containing a layer of compressed air at a storage pressure above a layer of compensation liquid. A hydrostatically compensated compressed air energy storage system may also contain a gas compressor/expander subsystem in fluid communication with the accumulator interior via an air flow path and configured to convey a flow of compressed air into the accumulator when in a charging mode and out of the accumulator when in a discharging mode. A hydrostatically compensated compressed air energy storage system may also contain a compensation liquid reservoir spaced apart from the accumulator and in fluid communication with the layer of compensation liquid within the accumulator via a compensation liquid flow path, compensation liquid can flow between the accumulator and the compensation liquid reservoir when in use A hydrostatically compensated compressed air energy storage system may also contain a thermal storage subsystem containing: a thermal source reservoir for containing a thermal storage liquid at a low storage temperature; a thermal storage reservoir in communication with the thermal source reservoir via a thermal liquid flow path and configured to contain the thermal storage liquid at a high storage temperature; and at least a first heat exchanger disposed in the thermal liquid flow path between the thermal source reservoir and the thermal storage reservoir and in the air flow path between the gas compressor/expander subsystem and the accumulator, whereby when the compressed gas energy storage system is in the charging mode thermal energy is transferred from the compressed air flowing through the air flow path to the thermal storage liquid. A hydrostatically compensated compressed air energy storage system may also contain a first construction shaft extending from an upper end proximate the surface of the ground to a lower end disposed below ground and being sized and configured to accommodate the passage of a construction apparatus therethrough when the hydrostatically compensated compressed air energy storage system is being constructed, and wherein the first construction shaft comprises at least a portion of at least one of the thermal liquid flow path and the thermal storage reservoir.

The system may be operable in a charging mode in which the gas compressor/expander subsystem coveys compressed air at the storage pressure into the layer of compressed air which displaces a corresponding amount of compensation liquid from the layer of compensation liquid out of the accumulator via the compensation liquid flow path thereby maintaining the layer of compressed air at substantially the storage pressure during the charging mode, and wherein thermal energy may be transferred from the compressed air into the thermal storage liquid via the first heat exchanger. The system where the system may also be operable in a discharging mode in which air from the layer of compressed air may exit the accumulator and drive the gas compressor/expander subsystem and a corresponding amount of compensation liquid may be re-introduced into the layer of compensation liquid within the accumulator thereby maintaining the layer of compressed air at substantially the storage pressure during the discharging mode and wherein thermal energy is transferred from the thermal storage liquid to the compressed air via the first heat exchanger. The system where the system may also be operable in a storage mode in which there is no flow of the compressed air or compensation liquid and the layer of compressed air and the layer of compensation liquid are retained within the accumulator at substantially the storage pressure.

The thermal storage reservoir may contain a first containment portion disposed within an interior of the first construction shaft and a reservoir chamber portion provided within the underground chamber and separated from the accumulator interior by a dividing wall.

The system where a second construction shaft may be extending from the surface of the ground to the reservoir chamber portion and being sized and configured to accommodate the passage of a construction apparatus therethrough when the hydrostatically compensated compressed air energy storage system is being constructed, wherein the thermal storage reservoir comprises a second containment portion disposed within an interior of the second construction shaft and in fluid communication with the reservoir chamber portion.

The reservoir chamber portion may be at substantially the same depth below the ground surface as the accumulator.

The system may further contain a shaft liner covering at least a portion of an inner surface of the first construction shaft and may be substantially liquid and gas impermeable.

The shaft liner may have a thermal conductivity of 0.02 W/m K to 60 W/m K thereby inhibiting a transfer of thermal energy between the thermal storage fluid within the first construction shaft and the surrounding ground.

The shaft liner may withstand operating temperatures of between about 150 and 300 deg. C. and pressure differences of between about 1 bar and about 150 bar.

The thermal storage liquid comprises water.

The first heat exchanger may include an indirect heat exchanger.

The first heat exchanger may include a direct contact heat exchanger.

The system may further contain a second heat exchanger provided in the air flow path downstream from the first heat exchanger and operable to transfer thermal energy between the compressed gas travelling through the air flow path and the thermal storage liquid.

The compressed gas energy storage system may further contain a third heat exchanger provided in the provided in the air flow path downstream from the second heat exchanger and operable to transfer thermal energy between the compressed air travelling through the air flow path and the thermal storage liquid.

The first construction shaft may contain a first cover portion disposed above the first containment region and containing a cover gas at a cover pressure.

The thermal storage liquid in the containment region may be at a thermal storage temperature that is greater than a boiling temperature of the thermal storage liquid at atmospheric pressure, and wherein the partial pressure of the thermal storage liquid in the cover gas is equal to or greater than the vapour pressure of thermal storage liquid at the thermal storage temperature whereby the thermal storage liquid remains liquid.

The thermal storage temperature may be between about 150 degrees Celsius and about 350 degrees Celsius.

The storage pressure may be between about 15 bar and about 100 bar when the compressed gas energy storage system is in use.

The cover pressure may be at least substantially equal to the storage pressure.

The system may further contain a thermal liquid flow conduit having an upper conduit end disposed at the upper end of the first construction shaft and in liquid communication with the first heat exchanger and a lower conduit end disposed toward the lower end of the first construction shaft and in liquid communication with the first containment portion and the reservoir chamber portion.

The liquid flow conduit extends through an upper end wall of the construction shaft.

The construction shaft may be substantially vertical and may extend along a shaft axis by a shaft height, and wherein the first construction shaft has a generally constant cross-sectional area along at least about 75% of the shaft height.

A cross-sectional area of the first cover portion may be different than a cross sectional area of the first containment region.

The cross-sectional area of the first containment region may be greater than the cross-sectional area of the first cover portion.

The thermal storage liquid in the thermal source reservoir may be at a lower temperature than the thermal storage liquid in the first thermal storage reservoir.

The thermal source reservoir may be disposed substantially above ground.

The thermal source reservoir may contain a liquid storage tank.

The thermal source reservoir may be spaced apart from and does not overlie the upper end wall of the construction shaft.

The system may further contain a second construction shaft extending between an upper end accessible from the surface and a lower end in fluid communication with the interior of the accumulator so that when the accumulator was being constructed the interior of the accumulator was accessible via the construction shaft, the upper end of the second construction shaft may be sealed fluidly isolating an interior of the second construction shaft from the atmosphere and wherein the interior of the second construction shaft forms part of the compensation liquid flow path and may be in fluid communication with the compensation liquid reservoir.

A liquid conduit extending through the upper end wall of the second construction shaft may form at least part of the air flow path between the compensation liquid reservoir and the interior of the second construction shaft.

The second construction shaft may be external and spaced apart from the first construction shaft.

In accordance with another broad aspect of the teachings described herein, a hydrostatically compensated compressed gas energy storage system may contain an accumulator comprising an underground chamber having an accumulator interior for containing a layer of compressed air at a storage pressure above a layer of compensation liquid. A hydrostatically compensated compressed gas energy storage system may also contain a gas compressor/expander subsystem which may be in fluid communication with the accumulator interior via an air flow path and configured to convey a flow of compressed air into the accumulator when in a charging mode and out of the accumulator when in a discharging mode. A hydrostatically compensated compressed gas energy storage system may also contain a compensation liquid reservoir spaced apart from the accumulator and in fluid communication with the layer of compensation liquid within the accumulator via a compensation liquid flow path compensation liquid can flow between the accumulator and the compensation liquid reservoir when in use. A hydrostatically compensated compressed gas energy storage system may also contain a first construction shaft extending from an upper end proximate the surface of the ground to a lower end disposed below ground and being sized and configured to accommodate the passage of a construction apparatus therethrough when the hydrostatically compensated compressed air energy storage system is being constructed, and configured to form part of the air flow path when the system is in use. A hydrostatically compensated compressed gas energy storage system may also contain a thermal storage subsystem containing at least a first thermal storage reservoir disposed at least partially within the first construction shaft. A hydrostatically compensated compressed gas energy storage system may also contain granular, thermal storage particles disposed within the first thermal storage reservoir within the first construction shaft and configured to directly contact and exchange thermal energy with the compressed air travelling through the air flow path. Whereby when the system may be in the charging mode thermal energy may be transferred from the compressed air being conveyed into the accumulator to the thermal storage particles, and when the system is in the discharging mode thermal energy may be transferred from the thermal storage particles to the compressed air being conveyed from the accumulator.

The thermal storage particles may include stone/rock particles.

The system may further contain at least a second construction shaft spaced from the first construction shaft, containing additional thermal storage particles and extending between an upper end accessible from the surface and a lower end connected to the accumulator and configured so that when the accumulator was being constructed the interior of the accumulator was accessible via the second construction shaft, the second construction shaft having: a second lower dividing wall sealing the lower end of the second construction shaft and fluidly isolating the second construction shaft from the interior of the accumulator; and a second upper end wall sealing the upper end of the second construction shaft and fluidly isolating the construction shaft from the atmosphere. The system may further contain a transverse shaft extending between and fluidly connecting the construction shaft and the second construction shaft. Wherein the air flow path comprises the first construction shaft, the second construction shaft and the transverse shaft and when the system is in the charging mode thermal energy is transferred from the compressed air in the air flow path to the thermal storage particles in the first construction shaft and the thermal storage particles in the second construction shaft.

A number of construction shafts in the system may be determined based on a number of compression stages in the gas compressor/expander subsystem based on the formula:

(Number of construction shafts)=((Number of compressions stages)1)*2+1, and the number of transverse shafts constructed is determined based on the formula (Number of transverse shafts)=(Number of compressions stages)−1

The gas compressor/expander subsystem may contain a first compressor in the air flow path upstream from the first construction shaft and a second compressor in the air flow path between the second construction shaft and the accumulator, wherein when the system is in the charging mode compressed air flows from the first compressor, generally downwardly through the first construction shaft, through the transverse shaft, generally upwardly through the second construction shaft, through the second compressor and then generally downwardly through the gas flow path to the accumulator.

The compressed gas energy system may further contain a third construction shaft spaced apart from the first construction shaft and the second construction shaft, extending between an upper end accessible from the surface and a lower end in fluid communication with the accumulator and containing additional thermal storage particles, the third construction shaft being disposed in the air flow path between the second compressor and the accumulator, whereby when the compressed gas energy storage system may be in the charging mode thermal energy is transferred from the compressed air in the air flow path downstream from the second compressor to the thermal storage particles in the third construction shaft.

In accordance with another broad aspect of the teachings described herein, a hydrostatically compensated compressed air energy storage system may contain an accumulator containing an underground cavern defining an accumulator interior for containing a layer of compressed air above a layer of compensation liquid, an inner surface of the underground cavern being covered, at least partially, with an accumulator liner that is substantially liquid impermeable. A gas compressor/expander subsystem which may be in fluid communication with the accumulator interior via an air flow path and configured to convey a flow of compressed air into and out of the accumulator. A compensation liquid reservoir spaced apart from the accumulator and which may be in fluid communication with the layer of compensation liquid within the accumulator via a compensation liquid flow path compensation liquid can flow between the accumulator and the compensation liquid reservoir when in use. The system may be operable in a charging mode in which the gas compressor/expander subsystem may covey compressed air at a storage pressure into the layer of compressed air which displaces a corresponding amount of compensation liquid from the layer of compensation liquid out of the accumulator via the compensation liquid flow path thereby maintaining the layer of compressed air at the storage pressure during the charging mode. The system may also be operable in a discharging mode in which air from the layer of compressed air may exit the accumulator and drive the gas compressor/expander subsystem and a corresponding amount of compensation liquid may be re-introduced into the layer of compensation liquid within the accumulator thereby maintaining the layer of compressed air at the storage pressure during the discharging mode. The system may also be operable in a storage mode in which there may be no flow of the compressed air or compensation liquid and the layer of compressed air and the layer of compensation liquid are retained within the accumulator at the storage pressure.

The accumulator liner may be substantially air impermeable.

The accumulator liner may contain at least one of concrete, metal, shotcrete, gunite, sprayed concrete, grout, composite materials, and plastic.

The accumulator liner may be formed from grout injected into the pores of the accumulator walls up to some distance away from the inner surface.

The accumulator liner may have a thickness that is between about 0.2 m and about 10 m.

The accumulator liner thickness may be about 1 m.

The accumulator liner may be configured to withstand pressure differences of between about between about 5 bar and about 100 bar.

The accumulator liner may be configured to withstand pressure differences between about 40 bar and about 80 bar.

The accumulator liner may have a thermal conductivity of between about 0.02 W/m K to 60 W/m K to inhibit thermal transfer between an interior of the accumulator and the surrounding ground when the hydrostatically compensated compressed air energy storage system is in use.

The accumulator may contain a lower wall submerged beneath the layer of compensation liquid, an opposing upper wall and a sidewall extending therebetween, and wherein the liner may be configured to cover at least the upper wall and sidewall.

The system where the liner may be configured to cover the upper wall, the sidewall and at least a portion of the lower wall.

A portion of the accumulator liner covering the lower wall may be sloped to direct compensation water The accumulator liner may have a substantially equal thickness around the inner surface of the underground cavern.

The compensation liquid flow path may contain a first shaft extending from an upper end proximate the surface of the ground to a lower end proximate the accumulator, and wherein the first shaft may be lined with a shaft liner that is substantially liquid impermeable.

The shaft liner may be substantially air impermeable.

The shaft liner may contain at least one of concrete, metal, shotcrete, gunite, sprayed concrete, grout, composite materials, and plastic.

The shaft liner may have a thickness in the lateral direction that may be between about 0.02 m and about 2 m, and preferably is about 0.3 m.

The shaft liner may be configured to withstand pressure differences of between about between about 20 bar and about 100 bar, and preferably between about 40 bar and about 80 bar.

The shaft liner may have a thermal conductivity of between about 0.02 W/m K to 60 W/m K to inhibit thermal transfer between an interior of the first shaft and the surrounding ground when the hydrostatically compensated compressed air energy storage system is in use.

The accumulator liner may be formed from the same material as the shaft liner.

The system may further contain a thermal storage subsystem including: a thermal source reservoir for containing a thermal storage liquid at a low storage temperature; a thermal storage reservoir in communication with the thermal source reservoir via a thermal liquid flow path and which may be configured to contain the thermal storage liquid at a high storage temperature, an inner surface of the thermal storage reservoir being covered by a thermal storage liner that may be substantially liquid impermeable; and at least a first heat exchanger which may be disposed in the thermal liquid flow path between the thermal source reservoir and the thermal storage reservoir and in the air flow path between the gas compressor/expander subsystem and the accumulator, whereby when the compressed gas energy storage system may be in the charging mode thermal energy may be transferred from the compressed air flowing through the air flow path to the thermal storage liquid.

The thermal storage liner may be substantially air impermeable

The thermal storage liner may contain at least one of concrete, metal, and grout.

The system where the thermal storage liner may have a thickness in the lateral direction that may be between about 0.5 m and about 2 m, and preferably is about 1 m.

The thermal storage liner may be configured to withstand operating pressures of between about between about 20 bar and about 100 bar, and preferably between about 40 bar and about 80 bar when filed with the thermal storage liquid.

The thermal storage liner may have a thermal conductivity of between about 0.02 W/m K to 60 W/m K to inhibit thermal transfer between an interior of the thermal storage reservoir and the surrounding ground when the hydrostatically compensated compressed air energy storage system is in use.

The accumulator liner may be formed from the same material as the thermal storage liner.

The thermal storage reservoir may be disposed at least partially underground.

BRIEF DESCRIPTION OF THE DRAWINGS

The drawings included herewith are for illustrating various examples of articles, methods, and apparatuses of the teaching of the present specification and are not intended to limit the scope of what is taught in any way.

DETAILED DESCRIPTION

Figure 1:
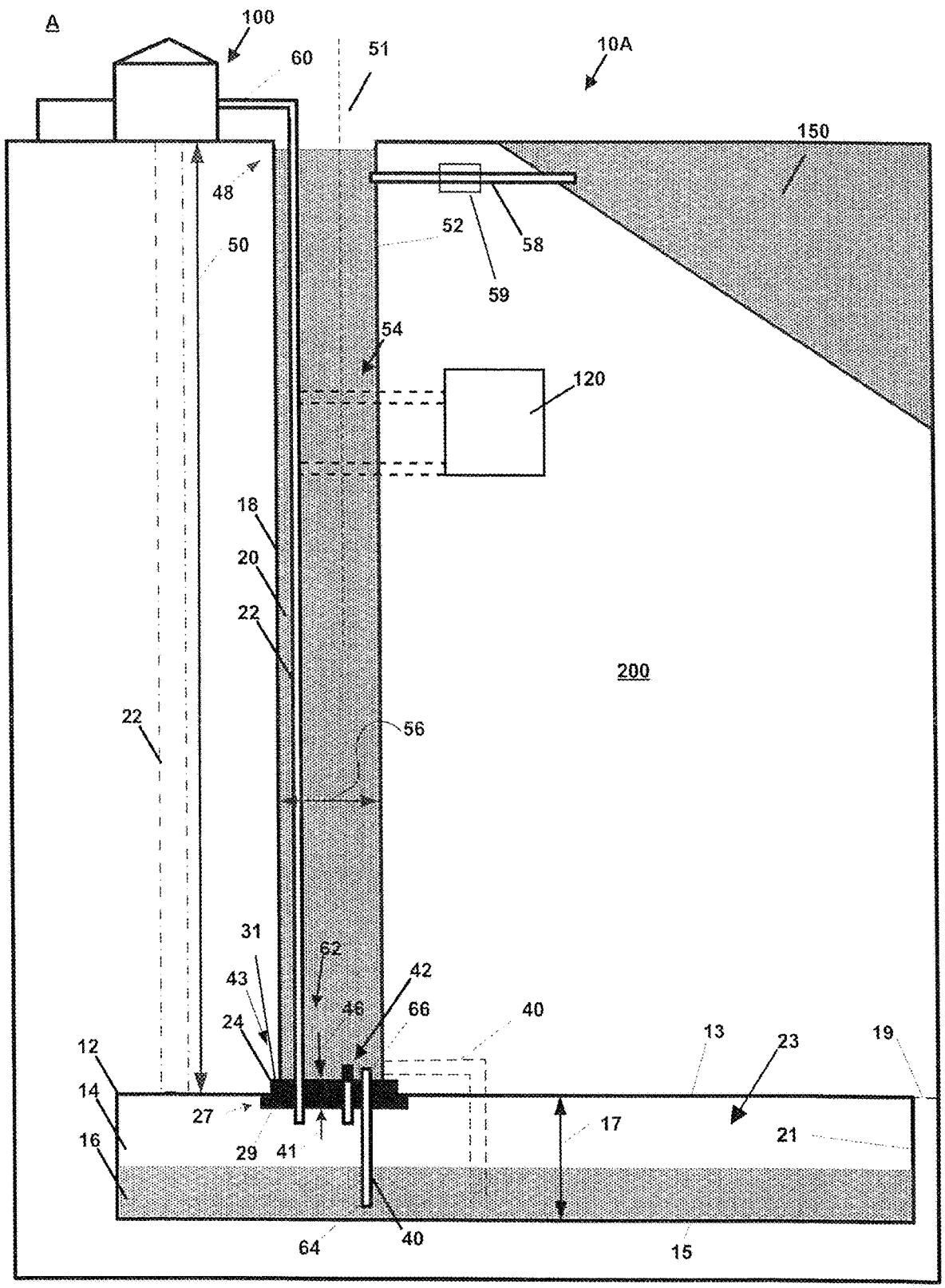
FIG. 1 is a schematic representation of one example of a hydrostatically compressed gas energy storage system.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Energy produced by some types of energy sources, such as windmills, solar panels and the like may tend to be produced during certain periods (for example when it is windy, or sunny respectively), and not produced during other periods (if it is not windy, or at night, etc.). However, the demand for energy may not always match the production periods, and it may be useful to store the energy for use at a later time. Similarly, it may be helpful to store energy generated using conventional power generators (coal, gas and/or nuclear power plants for example) to help facilitate storage of energy generated during non-peak periods (e.g. periods when electricity supply could be greater than demand and/or when the cost of electricity is relatively high) and allow that energy to be utilized during peak periods (e.g. when the demand for electricity may be equal to or greater than the supply, and/or when the cost of electricity is relatively high).

As described herein, compressing and storing a gas (such as air), using a suitable compressed gas energy storage system, is one way of storing energy for later use. For example, during non-peak times, energy (i.e. electricity) can be used to drive compressors and compress a volume of gas to a desired, relatively high pressure for storage. The gas can then be stored at the relatively high pressure inside any suitable container or vessel, such as a suitable accumulator. To extract the stored energy, the pressurized gas can be released from the accumulator and used to drive any suitable expander apparatus or the like, and ultimately to be used to drive a generator or the like to produce electricity. The amount of energy that can be stored in a given compressed gas energy storage system may be related to the pressure at which the gas is compressed/stored, with higher pressure storage generally facilitating a higher energy storage. However, containing gases at relatively high pressures in conventional systems, such as between about 45-150 atm, can require relatively strong, specialized and often relatively costly storage containers/pressure vessels.

When gas is compressed for storage (for example during a charging mode) its temperature tends to increase, and if the gas passes through multiple compression stages its temperature can increase with each stage. Further, some compressors may have a preferred inlet temperature range in which they operate with a desired level of efficiency. Gas that has been compressed in a one compression stage may, in some systems, be heated to a temperature that is above a desired inlet temperature for a subsequent compressions stage. Reducing the temperature of the gas exiting an upstream compressions stage before it reaches a subsequent compression stage may be advantageous.

Similarly, when compressed gas is removed from an accumulator and expanded for electricity generation (for example when in a discharge mode), the expansion process is endothermic and thermal energy is transferred into the expanding gas.

Optionally, heat that is removed/extracted from the gas exiting one or more compression stages when the system is in a charging mode of the system can be stored in a suitable thermal storage subsystem, and preferably that heat/thermal energy can then be re-introduced into the gas that is removed from the accumulator and is passing through suitable expansion stages during the discharge mode. This may help improve the overall efficiency of a compressed gas energy storage system. This may also help reduce and/or eliminate the need for heat sinks/sources or other apparatuses to dissipate heat when in the charging mode and/or supply new heat when in the discharge mode.

Thermal energy/heat that is extracted from the compressed gas can be stored in any suitable thermal storage apparatus, including those described herein. Preferably, at least a portion of the thermal storage subsystem and/or thermal storage apparatus may be provided by adapting and/or repurposing one or more portions of the overall compressed gas energy storage system. For example, systems in which the accumulator and/or other system components are located underground may utilize one or more excavation shafts or similar structures during the construction phase to help transport equipment and personnel to the underground structures and/or to extract debris and other material from the construction sites and/or to provide ventilation during underground construction. Shafts of this nature will generally extend from an upper end at the surface, or at least accessible from the surface during construction, to a lower end that is adjacent and at least temporarily connected to the underground structure/cavern/chamber, etc. that is being constructed. This can help facilitate the movement of equipment, air, people and debris. In some examples, more than one such shaft may be created for a variety of reasons, including to help expedite construction, provide two or more access and egress locations for safety-related reasons, provide underground ventilation and other such purposes. In some embodiments of the compressed gas energy storage systems described herein, these shafts may extend at least 100 m, 200 m, 300 m, 400 m, 500 m, 600 m, 700 m, or more (for example up to about 1000 m or more) into the ground, depending on the design constraints and ground conditions surrounding a given compressed gas energy storage systems. Such shafts may be generally referred to as excavation shafts even if their primary function is ventilation or access and even if no debris is actually extracted via the shaft during construction. Similarly, while the term "shaft" is used for convenience, the actual geometry of the structure may vary depending on the particular building techniques used and may take the form of a declined ramp or access tunnel, chamber or other such structure, and may be substantially vertical or may be inclined, and/or may be generally linear or may have a curved or varying geometry.

Shafts of this nature may be relatively costly and time consuming to create, and in known designs are generally not utilized when the accumulator construction is completed, and the compressed gas energy storage system is in use. Optionally, one or more of these shafts or other construction-phase legacy structures may be converted into another use as part of an operating compressed gas energy storage system. For example, one or more of the shafts excavated during construction may be repurposed (a) as liquid flow path to convey compensation water in and out of the accumulator; (b) as a gas flow path to convey compressed air in and out of the accumulator; or (c) as a thermal storage subsystem. This may help reduce the overall cost of constructing the compressed gas energy storage system and may help reduce the overall size/footprint of the compressed gas energy storage system. This may also, in some circumstances, help reduce the overall construction time for the compressed gas energy storage system, as at least some aspects of the thermal storage subsystem need not be separately constructed following the completion of the shaft(s) itself.

In one example, one or more of the excavation shafts may be configured as a liquid flow path or conduit that is configured to convey compensation water in and out of the accumulator. The liquid conduit may be configured to possess specific features as discussed further herein. For example, the lower end liquid conduit may preferably be located in a low point of the accumulator to help reduce the chances of the lower end of the liquid conduit being exposed to the gas layer within the accumulator.

In another example, one or more of the excavation shafts may be configured as a gas flow path or gas conduit that is configured to convey compressed gas in and out of the accumulator. The gas conduit may be configured to possess specific features as discussed further herein. For example, the lower end of the gas conduit may be positioned at a high point of the upper wall of the accumulator.

In another example, one or more of the excavation shafts may be configured as a reservoir that is configured to contain a suitable thermal storage media (such as a liquid, solid or the like) that can be used to receive and retain/store thermal energy from the compressed gas when in the charging mode. For example, one or both ends of the shaft can be sealed using suitable structures to enclose the shaft interior and isolate it from the surrounding environment (if desired) and from other operating system components (e.g. the accumulator, gas conduits, and the like).

The thermal storage media can then be contained within the shaft until the system enters the discharge mode, at which point thermal energy can be returned from the thermal storage media contained in the shaft to the gas exiting the accumulator (and optionally prior to the inlet of two or more expanders). The thermal exchange between the gas and the thermal storage media may be achieved by way of any suitable direct and/or indirect heat exchanger, and the exchange may occur within the shaft itself or the thermal storage media may be passed through a heat exchanger that is external the shaft. If a liquid thermal storage media is used, the shaft or at least portions thereof may be pressurized to higher than atmospheric pressure to help allow the liquid to be heated past its boiling temperature at atmospheric pressure. This can help the system absorb more thermal energy than an analogous unpressurized system using the same thermal storage liquid.

It is noted that using some known construction techniques for creating such excavation and/or construction shafts may not produce shafts that are suitable for repurposing in this manner. For example, shafts that are to be repurposed to function as thermal storage reservoir may be exposed to operating temperatures and pressures that are higher than would be expected during normal construction. Therefore, conventional shaft liners, grouts and construction materials may be unsuitable for use on the shafts as they may tend to be ineffective at retaining high temperature and/or high-pressure materials, and/or may tend to degrade or fail under such conditions. Even if some of the conventional construction materials would be suitable for repurposing, conventionally sunk shafts typically do not utilize such linings, and as such would tend not effectively contain fluid.

Shafts that are constructed with a secondary repurposing in mind may be built with different techniques and/or materials that allow them to function satisfactorily as a construction shaft and that can provide suitable performance when reconfigured as a liquid conduit, gas conduit, or thermal storage reservoir. This may help reduce the need for further processing and/or refurbishing of the shafts.

Thermal storage subsystems that utilize repurposed shafts or other construction related apparatuses may be used in combination with any suitable type of compressed gas energy storage system that utilizes an underground accumulator, including hydrostatically compensated compressed gas energy storage systems and compressed gas energy storage systems that are not hydrostatically compensated.

Referring to FIG. 1 one example of a hydrostatically compensated compressed gas energy storage system 10A, that can be used to compress, store and release a gas, includes an accumulator 12 that is located underground (although in another embodiment the accumulator may be located above ground). In this example, the accumulator 12 serves as a chamber for holding both compressed gas and a liquid (such as water) and can include any suitable type of pressure vessel or tank, or as in this example can be an underground cave or chamber that is within ground 200. In this embodiment, accumulator 12 may be lined, for example using concrete, metal, plastic and combinations thereof or the like, to help make it substantially gas and/or liquid impermeable to help to prevent unwanted egress of gas or liquid from within the interior 23. In another embodiment, the accumulator is preferably impermeable to gas and or liquid without requiring a lining.

The accumulator 12 may have any suitable configuration, and in this example, includes an upper wall 13 and an opposing lower wall 15 that are separated from each other by an accumulator height 17. The upper and lower walls 13 and 15 may be of any suitable configuration, including curved, arcuate, angled, and the like, and in the illustrated example are shown as generally planar surfaces, that are generally parallel to a horizontal reference plane 19. The accumulator 12 also has an accumulator width and depth (not shown—measured into the page as illustrated in FIG. 1). The upper and lower walls 13 and 15, along with one or more sidewalls 21 at least partially define an interior 23 of the accumulator 12, that has an accumulator volume.

The accumulator 12 in a given embodiment of the system 10A can be sized based on a variety of factors (e.g. the quantity of gas to be stored, operating pressure of the accumulator, the available space in a given location, etc.) and may, in some examples may be between about 1,000 m$^3$ and about 2,000,000 m$^3$ or more. For example, in this embodiment the accumulator 12 contains a layer of stored compressed gas 14 atop a layer of compensation liquid 16, and its volume (and thus capacity) can be selected based on the quantity of gas 14 to be stored, the duration of storage required for system 10A, and other suitable factors which may be related to the capacity or other features of a suitable power source and/or power load (see power source/load S/L in FIG. 2) with which the system 10A is to be associated. The power source/load S/L may be, in some examples, a power grid, a power source (including renewable and optionally non-renewable sources) and the like. Furthermore, the power source and power load may be completely independent of each other (e.g. the power source 25 may be a renewable source, and the power load may be the grid).

Preferably, the accumulator 12 may be positioned below ground or underwater, but alternatively may be at least partially above ground. Positioning the accumulator 12 within the ground 200, as shown, may allow the weight of the ground/soil to help backstop/buttress the walls 13, 15 and 21 of the accumulator 12, and help resist any outwardly acting forces that are exerted on the walls 13, 15 and 21 of the interior 23 of the accumulator. Its depth in the ground is established according to the pressures at which the compression/expansion equipment to be used is most efficiently operated, the geology in the surrounding area, system energy capacity and the like.

The gas that is to be compressed and stored in the accumulator 12 may be any suitable gas, including, but not limited to, air, nitrogen, noble gases and combinations thereof and the like. Using air may be preferable in some embodiments as a desired quantity of air may be drawn into the system from the surrounding, ambient environment and gas/air that is released from within the accumulator 12 can similarly be vented to the ambient environment, optionally and preferably without requiring further treatment. In this embodiment, the compressed gas 14 is compressed atmospheric air, and the compensation liquid is water.

Optionally, to help provide access to the interior of the accumulator 12, for example for use during construction of the accumulator and/or to permit access for inspection and/or maintenance, the accumulator 12 may include at least one opening that can be sealed in a generally air/gas tight manner when the system 10A is in use. In this example, the accumulator 12 includes a primary opening 27 that is provided in the upper wall 13. The primary opening 27 may be any suitable size and may have a cross-sectional area (taken in the plane 19) that is adequate based on the specific requirements of a given embodiment of the system 10A. In one embodiment the cross-sectional area is between about 0.75 m2 and about 80 m2 but may be larger or smaller in a given embodiment.

When the system 10A is in use, the primary opening 27 may be sealed using any suitable type of partition that can function as a suitable sealing member. In the embodiment of FIG. 1, the system 10A includes a partition in the form of a bulkhead 24 that covers the primary opening 27. Some examples of suitable partitions are described in PCT/CA2018/050112 and PCT/CA2018/050282, which are incorporated herein by reference.

When the bulkhead 24 is in place, as shown in FIG. 1, it can be secured to, and preferably sealed with the accumulator wall, in this embodiment upper wall 13, using any suitable mechanism to help seal and enclose the interior 23. In other embodiments, the bulkhead 24 may have a different, suitable configuration.

The bulkhead 24 may be manufactured in situ, or may be manufactured offsite, and may be made of any suitable material, including, concrete, metal, plastics, composites and the like. In the illustrated embodiment, the bulkhead 24 is assembled in situ at the interface between a shaft 18 and the accumulator 12 of multiple pieces of reinforced concrete. In this embodiment the shaft 18 is illustrated schematically as a generally linear, vertical column. Alternatively, the shaft 18 may be a generally linear inclined shaft or may be a curved and/or generally spiral/helical type configuration and which may be referred to as a shaft or generally as a decline. Some embodiments may include a generally spiralling configured decline that winds from an upper end to a lower end and can have an analogous function and attributes as the vertical shaft 18 of FIG. 1 despite having a different geometrical configuration. Discussions of the shaft/decline 18 and its purposes in one embodiment can be applied to other embodiments described herein.

Figure 3:
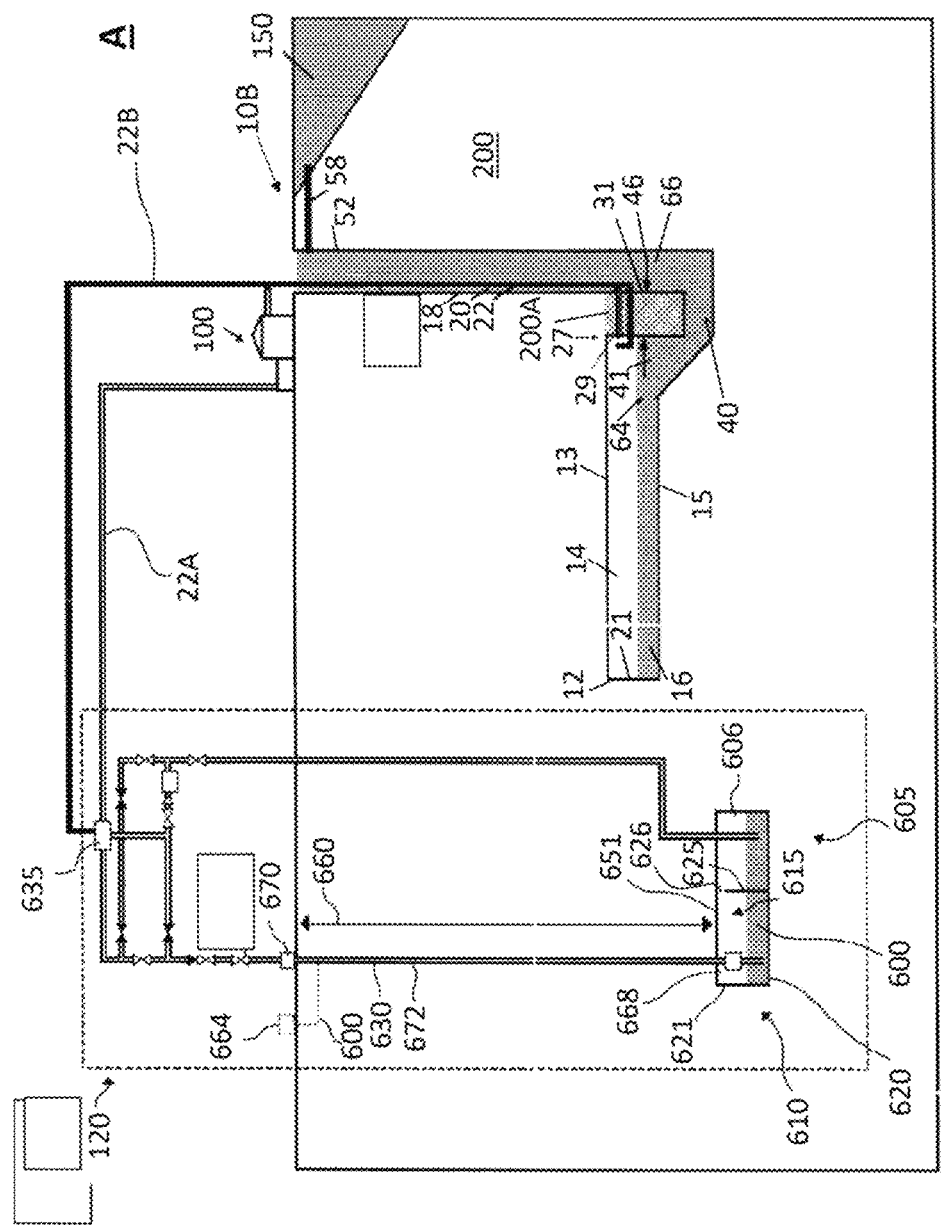
FIG. 3 is a schematic representation of another example of a hydrostatically compressed gas energy storage system.

In the embodiment of FIG. 1, the primary opening 27 is provided in the upper surface 13 of the accumulator 12. Alternatively, in other embodiments the primary opening 27 and any associated partition may be provided in different portions of the accumulator 12, including, for example, on a sidewall (such as sidewall 21 as shown in FIG. 3), in a lower surface (such as lower surface 15) or other suitable location. The location of the primary opening 27, and the associated partition, can be selected based on a variety of factors including, for example, the soil and underground conditions, the availability of existing structures (e.g. if the system 10A is being retrofit into some existing spaces, such as mines, quarries, storage facilities and the like), operating pressures, shaft configurations and the like. For example, some aspects of the systems 10A described herein may be retrofit into pre-existing underground chambers, which may have been constructed with openings in their sidewalls, floors and the like. Utilizing some of these existing formations may help facilitate construction and/or retrofit of the chambers used in the system and may reduce or eliminate the need to form additional openings in the upper surfaces of the chambers. Reducing the total number of openings in the accumulator may help facilitate sealing and may help reduce the chances of leaks and the like. In other embodiments, the components of the systems described herein may be pose-built for the described purposes and may be configured in manner that helps facilitate both construction and operation of the systems.

When the primary opening 27 extends along the sidewall 21 of the accumulator 12 as shown in the embodiment of FIG. 3, it may be positioned such that is contacted by only the gas layer 14 (i.e. toward the top of the accumulator 12), contacted by only the liquid layer 16 (i.e. submerged within the compensation liquid layer 16 and toward the bottom of the accumulator) and/or by a combination of both the gas layer 14 and the compensation liquid layer 16 (i.e. partially submerged and partially non-submerged in the liquid). The specific position of the free surface of the compensation liquid layer 16 (i.e. the interface between the compensation liquid layer 16 and the gas layer 14) may change while the system 10 is in use as gas is forced into (causing the liquid layer to drop) and/or withdrawn from the accumulator (allowing the liquid level to rise).

When the accumulator 12 is in use, at least one of the pressurized gas layer 14 and the compensation liquid layer 16 may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24. The magnitude of the internal accumulator force 41 acting on the partition may be at least partially dependent on the pressure of the gas 14 and the cross-sectional area (taken in plane 19) of the lower surface 29. For a given lower surface 29 area, the magnitude of the internal accumulator force 41 may vary generally proportionally with the pressure of the gas 14.

In some embodiments, for example if the compressed gas energy storage system is not hydrostatically compensated, the partition may be configured to resist substantially the entire internal accumulator force 41 and/or may be reinforced with the ground 200 or other suitable structures. Alternatively, an inwardly, (downwardly in this embodiment) acting force can be applied to the outer-surface 31 of the bulkhead 24 to help at least partially offset and/or counterbalance the internal accumulator force 41. Applying a counter force of this nature may help reduce the net force acting on the bulkhead 24 while the system 10 is in use. This may help facilitate the use of a bulkhead 24 with lower pressure tolerances than would be required if the bulkhead 24 had to resist the entire magnitude of the internal accumulator force 41. This may allow the bulkhead 24 be relatively smaller, lighter and less costly. This arrangement may also help reduce the chances of the bulkhead 24 failing while the system 10 is in use. Optionally, a suitable counter force may be created by subjecting the upper surface 31 to a pressurized environment, such as a pressurized gas or liquid or the distributed weight from a pile of solid material that is in contact with the upper surface 31, and calibrating the pressure acting on the upper surface 31 (based on the relative cross-sectional area of the upper surface 31 and the pressure acting on the lower surface 29) so that the resulting counter force, shown by arrow 46 in FIG. 1, has a desirable magnitude. In some configurations, the magnitude of the counter force 46 may be between about 80% and about 99% of the internal accumulator force 41 and may optionally be between 5 about 90% and about 97% and may be about equal to the magnitude of the internal accumulator force 41.

In the present embodiment, the system 10 includes a shaft 18 that is configured so its lower end 43 is in communication with the opening 27 of the accumulator 12, and its upper end 48 that is spaced apart from the lower end 43 by a shaft height 50. At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear, curved, or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 m³ of water.

In this arrangement, the bulkhead 24 is positioned at the interface between the shaft 18 and the accumulator 12, and the outer surface 31 (or at least a portion thereof) closes and seals the lower end 43 of the shaft 18. Preferably, the other boundaries of the shaft 18 (e.g. the sidewall 52) are generally liquid impermeable, such that the interior 54 can be filled with, and can generally retain a quantity of a liquid, such as water 20. A water supply/replenishment conduit 58 can provide fluid communication between the interior 54 of the shaft 18 and a water source/sink 150 to allow water to flow into or out of the interior of the shaft 18 as required when the system 10 is in operational modes. Optionally, a flow control apparatus 59 (as shown in FIG. 1) may be provided in the water supply/replenishment conduit 58. The flow control apparatus 59 may include a valve, sluice gate, or other suitable mechanism. The flow control apparatus 59 can be open while the system 10 is in operational modes to help facilitate the desired flow of water between the shaft 18 and the water source/sink 150. Optionally, the flow control apparatus 59 can be closed to fluidly isolate the shaft 18 and the water source/sink 150 if desired. For example, the flow control apparatus 59 may be closed to help facilitate draining the interior 54 of the shaft 18 for inspection, maintenance or the like.

The water source/sink 150 may be of any suitable nature, and may include, for example a connection to a municipal water supply or reservoir, a purposely built reservoir, a storage tank, a water tower, and/or a natural body of water such as a lake, river or ocean, groundwater, or an aquifer. In the illustrated example, the water source/sink 150 is illustrated as a lake. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end 48. Preferably, the conduit 58 can be positioned and configured such that water will flow from the source/sink 150 to the shaft 18 via gravity, and need not include external, powered pumps or other conveying apparatus. Although the conduit 58 is depicted in the figures as horizontal, it may be non-horizontal.

In this example, the water 20 in the shaft 18 bears against the outside of bulkhead 24 and is thereby supported atop bulkhead 24. The amount of pressure acting on the height 50 of the water column.

The layer of stored compressed air 14 underlying bulkhead 24 serves, along with the technique by which bulkhead 24 is stably affixed to the surrounding in the ground, in one alternative to surrounding stone in the ground at the interface between accumulator 12 and shaft 18, to support bulkhead 24 and the quantity of liquid contained within shaft 18.

Preferably, as will be described, the pressure at which the quantity of water 20 bears against bulkhead 24 can be maintained so that magnitude of the counter force 46 is equal, or nearly equal, to the magnitude of the internal accumulator force 41 exerted by the compressed gas in compressed gas layer 14 stored in accumulator 12. In the illustrated embodiment, system 10 is operated so as to maintain a pressure differential (i.e. the difference between gas pressure inside the accumulator 12 and the hydrostatic pressure at the lower end 43 of the shaft 18) below a threshold amount—an amount preferably between 0 and 4 Bar, such as 2 Bar—the resulting net force acting on the bulkhead 24. Maintaining the net pressure differential, and the related net force magnitude, below a threshold net pressure differential limit may help reduce the need for the bulkhead 24 to be very large and highly-reinforced, and accordingly relatively expensive. In alternative embodiments, using a relatively stronger bulkhead 24 and/or installation technique for affixing the bulkhead 24 to the accumulator 12 may help withstand relatively higher pressure and net pressure differential, but may be more expensive to construct and install, all other things being equal. Furthermore, the height 17 of the accumulator 12 may be important to the pressure differential: if the height 17 is about 10 metres, then the maximum upward pressure on the bulkhead 24 will be 1 Bar higher than the downward pressure on the bulkhead 24 from the water 20 in shaft 18. The maximum pressure differential that is experienced by bulkhead 24 may increase by about 0.1 bar for every meter that the height 17 of the accumulator 12 is increased and may decrease by about 0.1 bar for every meter that the height 17 of the accumulator 12 is decreased.

Each of shaft 18 and accumulator 12 may be formed in ground 200 using techniques similar to those used for producing mineshafts and other underground structures.

To help maintain substantially equal outward and inward forces 41 and 46 respectively on the bulkhead 24, the system 10 may be utilized to help maintain a desired differential in accumulator and shaft pressures that is below a threshold amount. These pressures may be controlled by adding or removing gas from the compressed gas layer 14 in accumulator 12 using any suitable compressor/expander subsystem 100, and in turn conveying water between the compensation liquid layer 16 in accumulator 12 and the water 20 in shaft 18.

In this embodiment, the system 10A includes a gas flow path that provides fluid communication between the compressor/expander subsystem 100 and the accumulator 12. The gas flow path may include any suitable number of conduits, passages, hoses, pipes and the like and any suitable equipment may be provided in (i.e. in air flow communication with) the gas flow path, including, compressors, extractors, heat exchangers, valves, sensors, flow meters and the like. Referring to the example of FIG. 1, in this example the gas flow path includes a gas conduit 22 that is provided to convey compressed air between the compressed gas layer 14 and the compressor/expander subsystem 100, which can convert the potential energy of compressed air to and from electricity. Similarly, the system 10A includes a liquid flow path that provides fluid communication between the compensation liquid layer 16 and the water 20 in shaft 18. The liquid flow path may include any suitable number of conduits, passages, hoses, pipes and the like. Referring to the example of FIG. 1, in this example the liquid flow path includes a liquid supply conduit 40 that is is configured to convey water between the compensation liquid layer 16 and the water 20 in shaft 18. Each conduit 22 and 40 may be formed from any suitable material, including metal, the surrounding rock, plastic and the like.

As discussed herein, the gas flow path and liquid flow path may be formed out of repurposed excavation shafts that were created during construction of the system.

In this example, the gas conduit 22 has an upper end 60 that is connected to the compressor/expander subsystem 100, and a lower end 62 that is in communication with the compressed gas layer 14. The gas conduit 22 is, in this example, positioned inside and extends within the shaft 18, and passes through the bulkhead 24 to reach the compressed gas layer 14. Positioning the gas conduit 22 within the shaft 18 may eliminate the need to bore a second shaft and/or access path from the surface to the accumulator 12. The positioning in the current embodiment may also leave the gas conduit 22 generally exposed for inspection and maintenance, for example by using a diver or robot that can travel through the water 20 within the shaft 18 and/or by draining some or all the water from the shaft 18. Alternatively, as shown using dashed lines in FIG. 1, the gas conduit 22 may be external the shaft 18. Positioning the gas conduit 22 outside the shaft 18 may help facilitate placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

The liquid supply conduit 40 is, in this example, configured with a lower end 64 that is submerged in the water layer 16 while the system 10 is in use and a remote upper end 66 that is in communication with the interior 54 of the shaft 18. In this configuration, the liquid supply conduit 40 can facilitate the exchange of liquid between the compensation liquid layer 16 and the water 20 in the shaft 18. As illustrated in FIG. 1, the liquid supply conduit 40 can pass through the bulkhead 24 (as described herein), or alternatively, as shown using dashed lines, may be configured to provide communication between the compensation liquid layer 16 and the water 20, but not pas through the bulkhead 24.

In this arrangement, as more gas is transferred into the gas layer 14 during an accumulation cycle, and its pressure increases, in this alternative slightly, water in the water layer 16 can be displaced out of the accumulator 14 and forced upwards through the liquid supply conduit 40 into shaft 18 against the hydrostatic pressure of the water 20 in the shaft 18. More particularly, water can preferably freely flow from the bottom of accumulator 12 and into shaft 18, and ultimately may be exchanged with the source/sink 150 of water, via a replenishment conduit 58. Alternatively, any suitable type of flow limiting or regulating device (such as a pump, valve, orifice plate and the like) can be provided in the water conduit 40. When gas is removed from the gas layer 14, water can be forced from the shaft 18, through the water conduit 40, to refill the water layer 16. The flow through the replenishment conduit 58 can help ensure that a desired quantity of water 20 may be maintained within shaft 18 as water is forced into and out of the water layer 16, as excess water 20 can be drained from and make-up water can be supplied to the shaft 18. This arrangement can allow the pressures in the accumulator 12 and shaft 18 to at least partially, automatically re-balance as gas is forced into and released from the accumulator 12.

Preferably, the lower end 64 of the liquid supply conduit 40 is positioned so that it is and generally remains submerged in the compensation liquid layer 16 while the system 10 is in operational modes and is not in direct communication with the gas layer 14. In the illustrated example, the lower wall 15 is planar and is generally horizontal (parallel to plane 19, or optionally arranged to have a maximum grade of between about 0.01% to about 1%, and optionally between about 0.5% and about 1%, from horizontal), and the lower end 64 of the liquid supply conduit 40 is placed close to the lower wall 15. If the lower wall 15 is not flat or not generally horizontal, the lower end 64 of the liquid supply conduit 40 is preferably located in a low point of the accumulator 12 to help reduce the chances of the lower end 64 being exposed to the gas layer 14.

Similarly, to help facilitate extraction of gas from the gas layer, the lower end 62 of the gas conduit 22 is preferably located close to the upper wall 13, or if the upper wall 13 is not flat or generally horizontal at a high-point in the interior 23 of the accumulator 12. This may help reduce material trapping of any gas in the accumulator 12. For example, if the upper wall 13 were oriented on a grade, the point at which gas conduit 22 interfaces with the gas layer (i.e. its lower end 62) should be at a high point in the accumulator 12, to help avoid significant trapping of gas.

In the embodiment of FIG. 1, the partition includes a fabricated bulkhead 24 that is positioned to cover, and optionally seal the primary opening 27 in the accumulator perimeter. Alternatively, in other embodiments, the partition may be at least partially formed from natural materials, such as rock and the like. For example, a suitable partition may be formed by leaving and/or shaping portions of naturally occurring rock to help form at least a portion of the pressure boundary between the interior of the accumulator and the shaft. Such formations may be treated, coated or otherwise modified to help ensure they are sufficiently gas impermeable to be able to withstand the desired operating pressure differentials between the accumulator interior and the shaft. This may be done, in some embodiments, by selectively excavating the shaft 18 and accumulator 12 such that a portion of the surrounding rock is generally undisturbed during the excavation and construction of the shaft 18 and accumulator 12. Alternatively, rock or other such material may be re-introduced into a suitable location within the accumulator 12 and/or shaft 18 after having been previously excavated. This may help reduce the need to manufacture a separate bulkhead and install it within the system 10. In arrangements of this nature, the primary opening 27 may be formed as an opening in a sidewall 21 of the accumulator 12, or alternatively one side of the accumulator 12 may be substantially open such that the primary opening 27 extends substantially the entire accumulator height 17, and forms substantially one entire side of the accumulator 12.

When the accumulator 12 is in use, at least one of the pressurized gas layer 14 and the compensation liquid layer 16, or both, may contact and exert pressure on the inner-surface 29 of the bulkhead 24, which will result in a generally outwardly, (upwardly in this embodiment) acting internal accumulator force, represented by arrow 41 in FIG. 1, acting on the bulkhead 24. The magnitude of the internal accumulator force 41 is dependent on the pressure of the gas 14 and the cross-sectional area (taken in plane 19) of the lower surface 29. For a given lower surface 29 area, the magnitude of the internal accumulator force 41 may vary generally proportionally with the pressure of the gas 14.

Preferably, an inwardly, (downwardly in this embodiment) acting force can be applied to the outer-surface 31 of the bulkhead 24 to help offset and/or counterbalance the internal accumulator force 41. Applying a counter force of this nature may help reduce the net force acting on the bulkhead 24 while the system 10 is in use. This may help facilitate the use of a bulkhead 24 with lower pressure tolerances than would be required if the bulkhead 24 had to resist the entire magnitude of the internal accumulator force 41. This may allow the bulkhead 24 be relatively smaller, lighter and less costly. This arrangement may also help reduce the chances of the bulkhead 24 failing while the system 10 is in use. Optionally, a suitable counter force may be created by subjecting the upper surface 31 to a pressurized environment, such as a pressurized gas or liquid that is in contact with the upper surface 31, and calibrating the pressure acting on the upper surface 31 (based on the relative cross-sectional area of the upper surface 31 and the pressure acting on the lower surface 29) so that the resulting counter force, shown by arrow 46 in FIG. 1, has a desirable magnitude. In some configurations, the magnitude of the counter force 46 may be between about 80% and about 99% of the internal accumulator force 41 and may optionally be between about 90% and about 97% and may be about equal to the magnitude of the internal accumulator force 41.

In the present embodiment, the system 10 includes a shaft 18 having a lower end 43 that is in communication with the opening 27 in the upper wall 13 of the accumulator 12, and an upper end 48 that is spaced apart from the lower end 43 by a shaft height 50. At least one sidewall 52 extends from the lower end 43 to the upper end 48, and at least partially defines a shaft interior 54 having a volume. In this embodiment, the shaft 18 is generally linear and extends along a generally vertical shaft axis 51, but may have other configurations, such as a linear or helical decline, in other embodiments. The upper end 48 of the shaft 18 may be open to the atmosphere A, as shown, or may be capped, enclosed or otherwise sealed. In this embodiment, shaft 18 is generally cylindrical with a diameter 56 of about 3 metres, and in other embodiments the diameter 56 may be between about 2 m and about 15 m or more, or may be between about 5 m and 12 m, or between about 2 m and about 5 m. In such arrangements, the interior 52 of the shaft 18 may be able to accommodate about 1,000-150,000 m$^3$ of water. In other embodiments the shaft need not be cylindrical and may have other cross-sectional geometries with the same hydraulic diameter.

In this arrangement, the bulkhead 24 is positioned at the interface between the shaft 18 and the accumulator 12, and the outer surface 31 (or at least a portion thereof) closes and seals the lower end 43 of the shaft 18. Preferably, the other boundaries of the shaft 18 (e.g. the sidewall 52) are generally liquid impermeable, such that the interior 54 can be filled with, and can generally retain a quantity of a liquid, such as water 20. A water supply/replenishment conduit 58 can provide fluid communication between the interior 54 of the shaft 18 and a water source/sink 150 to allow water to flow into or out of the interior of the shaft 18 as required when the system 10 is in use. Optionally, a flow control valve 59 (as shown in FIG. 1) may be provided in the water supply/replenishment conduit 58. The flow control valve 59 can be open while the system 10 is in use to help facilitate the desired flow of water between the shaft 18 and the water source/sink 150. Optionally, the flow control valve 59 can be closed to fluidly isolate the shaft 18 and the water source/sink 150 if desired. For example, the flow control valve 59 may be closed to help facilitate draining the interior 54 of the shaft 18 for inspection, maintenance or the like.

The water source/sink 150 may be of any suitable nature, and may include, for example a connection to a municipal water supply or reservoir, a purposely built reservoir, a storage tank, a water tower, and/or a natural body of water such as a lake, river or ocean, groundwater, or an aquifer. In the illustrated example, the water source/sink 150 is illustrated as a lake. Allowing water to flow through the conduit 58 may help ensure that a sufficient quantity of water 20 may be maintained with shaft 18 and that excess water 20 can be drained from shaft 18. The conduit 58 may be connected to the shaft 18 at any suitable location, and preferably is connected toward the upper end 48. Preferably, the conduit 58 can be positioned and configured such that water will flow from the source/sink 150 to the shaft 18 via gravity, and need not include external, powered pumps or other conveying apparatus. Although the conduit 58 is depicted in the figures as horizontal and linear, it may be non-horizontal and/or non-linear.

In this example, the water 20 in the shaft 18 bears against the outside of bulkhead 24 and is thereby supported atop bulkhead 24. The amount of pressure acting on the outer surface 31 of the bulkhead 24 in this example will vary with the volume of water 20 that is supported, which for a given diameter 56 will vary with the height 50 of the water column. In this arrangement, the magnitude of the counter force 46 can then be generally proportional to the amount of water 20 held in the shaft 18. To increase the magnitude of the counter force 46, more water 20 can be added. To reduce the magnitude of the counter force 46, water 20 can be removed from the interior 54.

The layer of stored compressed air 14 underlying bulkhead 24 serves, along with the technique by which bulkhead 24 is stably affixed to the surrounding in the ground, in one alternative to surrounding stone in the ground at the interface between accumulator 12 and shaft 18, to support bulkhead 24 and the quantity of liquid contained within shaft 18.

Preferably, as will be described, the pressure at which the quantity of water 20 bears against bulkhead 24 and can be maintained so that magnitude of the counter force 46 is as equal, or nearly equal, to the magnitude of the internal accumulator force 41 exerted by the compressed gas in compressed gas layer 14 stored in accumulator 12. In the illustrated embodiment, operating system 10 so as to maintain a pressure differential (i.e. the difference between gas pressure inside the accumulator 12 and the hydrostatic pressure at the lower end 43 of the shaft 18) within a threshold amount—an amount preferably between 0 and 4 Bar, such as 2 Bar—the resulting net force acting on the bulkhead 24 (i.e. the difference between the internal accumulator force 41 and the counter force 46) can be maintained below a pre-determined threshold net force limit. Maintaining the net pressure differential, and the related net force magnitude, below a threshold net pressure differential limit may help reduce the need for the bulkhead 24 to be very large and highly-reinforced, and accordingly relatively expensive. In alternative embodiments, using a relatively stronger bulkhead 24 and/or installation technique for affixing the bulkhead 24 to the accumulator 12 may help withstand relatively higher pressure and net pressure differential, but may be more expensive to construct and install, all other things being equal. Furthermore, the height 17 of the accumulator 12 may be important to the pressure differential: if the height 17 is about 10 metres, then the upward pressure on the bulkhead 24 will be 1 Bar higher than the downward pressure on the bulkhead 24 from the water 20 in shaft 18.

Each of shaft 18 and accumulator 12 may be formed in the ground 200 using any suitable techniques, including techniques that are similar to those used for producing mine-shafts and other underground structures.

To help maintain substantially equal outward and inward forces 41 and 46 respectively on the bulkhead 24, the system 10 may be utilized to help maintain a desired differential in accumulator and shaft pressures that is below a threshold amount. These pressures may be controlled by adding or removing gas from the compressed gas layer 14 accumulator 12 using any suitable compressor/expander subsystem 100, and water can be conveyed between the compensation liquid layer 16 and the water 20 in shaft 18.

In this embodiment, a gas conduit 22 is provided to convey compressed air between the compressed gas layer 14 and the compressor/expander subsystem 100, which can convert compressed air energy to and from electricity. Similarly, a liquid conduit 40 is configured to convey water between the compensation liquid layer 16 and the water 20 in shaft 18. Each conduit 22 and 40 may be formed from any suitable material, including metal, plastic and the like.

In this example, the gas conduit 22 has an upper end 60 that is connected to the compressor/expander subsystem 100, and a lower end 62 that is in communication with the gas layer 14. The gas conduit 22 is, in this example, positioned inside and extends within the shaft 18, and passes through the bulkhead 24 to reach the gas layer 14. Positioning the gas conduit 22 within the shaft 18 may eliminate the need to bore a second shaft and/or access point from the surface to the accumulator 12. This position may also leave the gas conduit 22 generally exposed for inspection and maintenance, for example by using a diver or robot that can travel through the water 20 within the shaft 18 and/or by draining some or all of the water from the shaft 18. Alternatively, as shown using dashed lines in FIG. 1 the gas conduit 22 may be external the shaft 18. Positioning the gas conduit 22 outside the shaft 18 may help facilitate remote placement of the compressor/expander subsystem 100 (i.e. it need not be proximate the shaft 18) and may not require the exterior of the gas conduit 22 (or its housing) to be submerged in water. This may also eliminate the need for the gas conduit 22 to pass through the partition that separates the accumulator 12 from the shaft 18.

Figure 2:
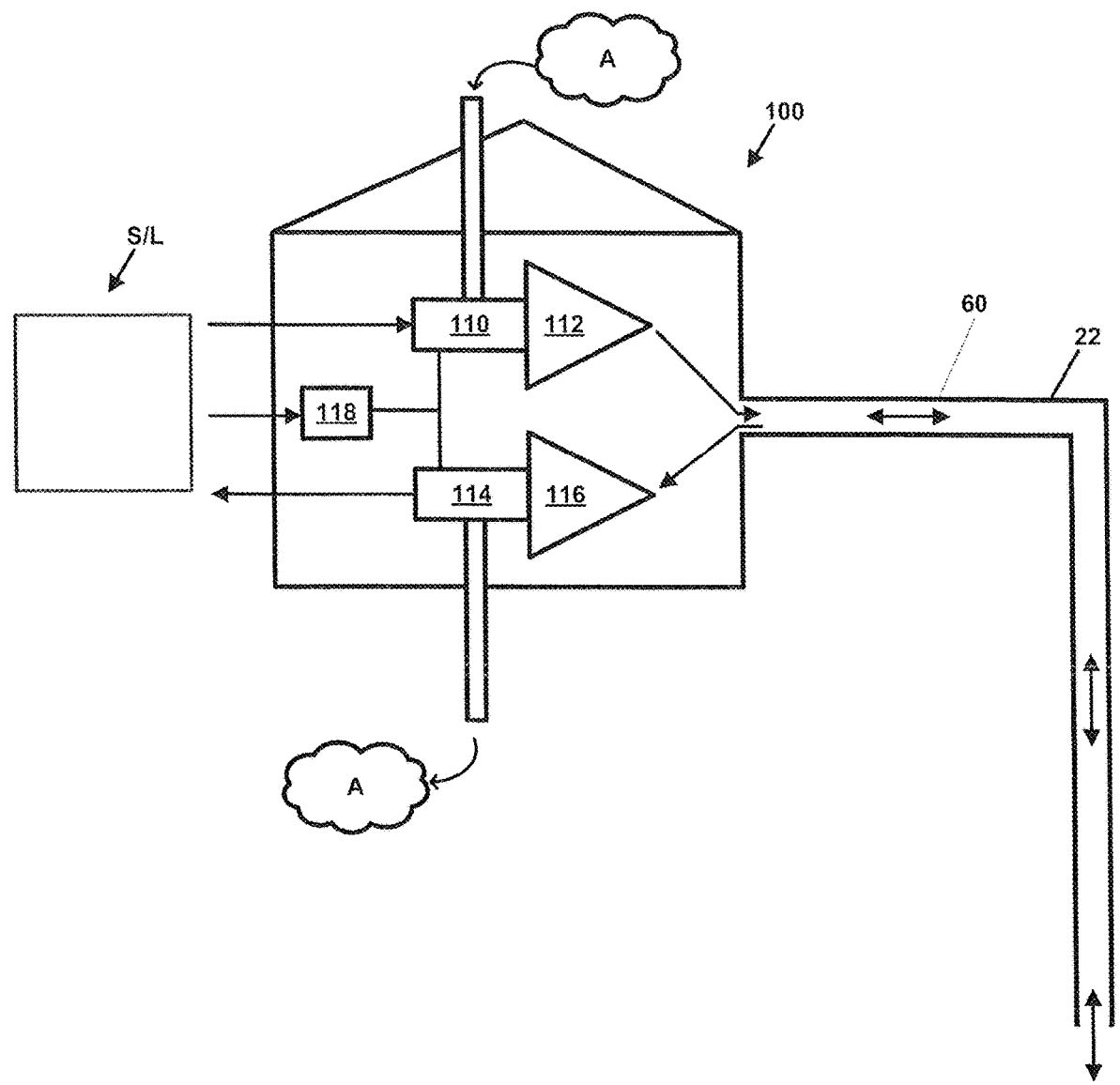
FIG. 2 is a schematic representation of a portion of the system of FIG. 1

FIG. 2 is a schematic view of components of one example of a compressor/expander subsystem 100 for the compressed gas energy storage system 10 described herein. In this example, the compressor/expander subsystem 100 includes a compressor 112 of single or multiple stages, driven by a motor 110 that is powered, in one alternative, using electricity from a power grid or by a renewable power source or the like, and optionally controlled using a suitable controller 118. Compressor 112 is driven by motor 110 during an accumulation stage of operation, and draws in atmospheric air A, compresses the air, and forces it down into gas conduit 22 for storage in accumulator 12 (via thermal storage subsystem 120 (see FIG. 1 for example) in embodiments including same). Compressor/expander subsystem 100 also includes an expander 116 driven by compressed air exiting from gas conduit 22 during an expansion stage of operation and, in turn, driving generator 114 to generate electricity. After driving the expander 116, the expanded air is conveyed for exit to the atmosphere A. While shown as separate apparatuses, the compressor 112 and expander 116 may be part of a common apparatus. Optionally, the motor and generator may be provided in a single machine.

Air entering or leaving compressor/expander subsystem 100 may be conditioned prior to its entry or exit. For example, air exiting or entering compressor/expander subsystem 100 may be heated and/or cooled to reduce undesirable environmental impacts or to cause the air to be at a temperature suited for an efficient operating range of a particular stage of compressor 112 or expander 116. For example, air (or other gas being used) exiting a given stage of a compressor 112 may be cooled prior to entering a subsequent compressor stage and/or the accumulator 12, and/or the air may be warmed prior to entering a given stage of an expander 116 and may be warmed between expander stages in systems that include two or more expander stages arranged in series.

Controller 118 operates compressor/expander subsystem 100 so as to switch between accumulation and expansion stages as required, including operating valves for preventing or enabling release of compressed air from gas conduit 22 on demand.

Optionally, the system 10A may include a thermal storage subsystem 120 (illustrated schematically in FIG. 1) that is configured to transfer heat/thermal energy out of and preferably also into the gas flowing through the gas flow path between the accumulator and the compressor/expander subsystem 100. Preferably, the thermal storage subsystem 120 is configured to extract thermal energy from the gas exiting at least one of the one or more compression stages in a given compressor/expander subsystem 100, and preferably being configured to extract heat from the gas exiting each compression stage 112. The extracted thermal energy can then be stored for a period of time, and then reintroduced into the gas as it is removed from the accumulator 12 and passed through one or more expanders 116 and preferably being configured to reintroduce heat to the gas before entering each expansion stage 116.

FIG. 3 is a schematic representation of another example of a compressed gas energy storage system 10B with a thermal storage subsystem 120 that is provided in the gas flow path between the compressor/expander subsystem 100 and the accumulator 12. The compressed gas energy storage system 10B is analogous to the compressed gas energy storage system 10A, and like features are identified using like reference characters. While one example is explained herein, other suitable thermal storage subsystems may be utilized in other embodiments, including those described in PCT/CA2018/050112 and PCT/CA2018/050282, which are incorporated herein by reference. The thermal storage subsystem 120 may also be used in combination with the systems 10A and 10B, and other systems described herein.

In the example of FIG. 3, the gas conduit 22 that conveys the compressed gas between the compressed gas layer 14 and compressor/expander subsystem 100 includes an upper portion 22A that extends between the compressor/expander subsystem 100 and thermal storage subsystem 120, and a lower portion 22B that extends between thermal storage subsystem 120 and accumulator 12.

The thermal storage subsystem 120 may include any suitable type of thermal storage apparatus, including, for example latent and/or sensible storage apparatuses. The thermal storage system 120 may be disposed at a higher elevation than the accumulator 12, at a lower elevation than the accumulator, or at about the same elevation as the accumulator 12. The thermal storage apparatus 120 can include a chamber 615 (as described herein) and a liquid inlet/outlet passage that can be connected to the other aspects of the thermal storage apparatuses 120 described herein. The thermal storage apparatus(es) may be configured as single stage, two stage and/or multiple stage storage apparatus(es). Similarly, the thermal storage subsystem 120 may include one or more heat exchangers (to transfer thermal energy into and/or out of the thermal storage subsystem 120) and one or more storage apparatuses (including, for example storage reservoirs for holding thermal storage fluids and the like). Any of the thermal storage apparatuses may either be separated from or proximate to their associated heat exchanger and may also incorporate the associated heat exchanger in a single compound apparatus (i.e. in which the heat exchanger is integrated within the storage reservoir). Preferably, the heat exchangers utilized in the thermal storage subsystem 120 are provided in the gas flow path and are operable to transfer thermal energy between the compressed gas travelling through the gas flow path and the thermal storage media (which may be a solid, liquid or gas).

The exchangers may be any suitable type of heat exchanger for a given type of thermal storage media, and may include, for example, indirect heat exchangers or direct heat exchangers. The preferable type of heat exchanger for a given system may depend on a variety of factors and/or elements of the system. For example, a direct heat exchanger (i.e. that permits direct contact between the two sides/streams of the exchanger) may help facilitate for more conductivity between the compressed gas and thermal storage media and may, under some circumstances, be relatively more efficient in transferring thermal energy between the two than a comparable indirect heat exchanger. A direct heat exchanger may be preferred when using solid thermal storage media, such as rocks or gravel and may also be used in combination with a thermal storage liquid if both the gas and liquid streams are maintained under suitable conditions to help maintain the thermal storage liquid in its liquid state, and to avoid boiling and/or mixing of the gas stream and liquid stream.

An indirect heat exchanger may be preferable in systems in which the compressed gas is to be kept separate from the thermal storage media, such as if the thermal storage media needs to be kept under specific conditions, including pressure and/or if both streams in the heat exchanger are gaseous (or would boil if a liquid) such that there would be a mixing of the thermal storage media and the compressed system gas within the heat exchanger.

In the illustrated embodiment, substantial portions of the thermal storage subsystem 120 are located underground, which may help reduce the use of above-ground land and may help facilitate the use of the weight of the earth/rock to help contain the pressure in the storage reservoir. That is, the outward-acting pressure within the storage reservoir containing the heated and, optionally non-heated thermal storage media, can be substantially balanced by the inwardly-acting forces exerted by the earth and rock surrounding the first reservoir. In some examples, if a liner or other type of vessel are provided in the storage reservoir such structures may carry some of the pressure load but are preferably backed-up by and/or supported by the surrounding earth/rock. This can help facilitate pressurization of the storage reservoir to the desired storage pressures, without the need for providing a manufactured pressure vessel that can withstand the entire pressure differential. In this example, the thermal storage subsystem 120 also employs multiple stages including, for example, multiple sensible and/or latent thermal storage stages such as stages having one or more phase change materials and/or pressurized water, or other heat transfer fluid arranged in a cascade. It will be noted that, if operating the system for partial storage/retrieval cycles, the sizes of the stages may be sized according to the time cycles of the phase change materials so that the phase changes, which take time, take place effectively within the required time cycles.

In general, as gas is compressed by the compressor/expander subsystem 100 when in the charging mode and is conveyed for storage towards accumulator 12, the heat of the compressed gas can be drawn out of the compressed gas and into the thermal storage subsystem 120 for sensible and/or latent heat storage. In this way, at least a portion of the heat energy is saved for future use instead of, for example being leached out of the compressed gas into water 20 or in the compensation liquid layer 16, and accordingly substantially lost (i.e. non-recoverable by the system 10).

Similarly, when in a discharge mode as gas is released from accumulator 12 towards compressor/expander subsystem 100 it can optionally be passed through thermal storage subsystem 120 to re-absorb at least some of the stored heat energy on its way to the expander of the compressor/expander subsystem 100. Advantageously, the compressed gas, accordingly heated, can reach the compressor/expander subsystem 100 at a desired temperature (an expansion temperature—that is preferably warmer/higher than the accumulator temperature), and may be within about 10 ° C. and about 60° C. of the compressor exit temperature in some examples, that may help enable the expander to operate within its relatively efficient operating temperature range(s), rather than having to operate outside of the range with cooler compressed gas.

In some embodiments, the thermal storage subsystem 120 may employ at least one phase change material, preferably multiple phase change materials, multiple stages and materials that may be selected according to the temperature rating allowing for the capture of the latent heat. Generally, phase change material heat can be useful for storing heat of approximately 150 degrees Celsius and higher. The material is fixed in location and the compressed air to be stored or expanded is flowed through the material. In embodiments using multiple cascading phase change materials, each different phase change material represents a storage stage, such that a first type of phase change material may change phase thereby storing the heat at between 200 and 250 degrees Celsius, a second type of phase change material may change phase thereby storing the heat at between 175 and 200 degree Celsius, and a third type of phase change material may change phase thereby storing the heat at between 150 and 175 degrees Celsius. One example of a phase change material that may be used with some embodiments of the system includes a eutectic mixture of sodium nitrate and potassium nitrate, or the HITEC® heat transfer salt manufactured by Coastal Chemical Co. of Houston, Tex.

In embodiments of the thermal storage subsystem 120 employing sensible heat storage, pressurized water, or any other suitable thermal storage fluid/liquid and/or coolant, may be employed as the sensible thermal storage medium. Optionally, such systems may be configured so that the thermal storage liquid remains liquid while the system 10A or 10B is in use and does not undergo a meaningful phase change (i.e. does not boil to become a gas). This may help reduce the loss of thermal energy via the phase change process. For example, such thermal storage liquids (e.g. water) may be pressurized and maintained at an operating pressure that is sufficient to generally keep the material in its liquid phase during the heat absorption process as its temperature rises. That is, the reservoir and/or conduits containing a thermal storage liquid can be pressurized to a pressure that is greater than atmospheric pressure, and optionally may be at least between about 10 and 80 bar, and may be between about 30 and 45 bar, and between about 20 and 26 bar, so that the thermal storage liquid can be heated to a temperature that is greater than its boiling temperature at atmospheric pressure.

In some embodiments, the pressure within the thermal storage subsystem 120 may be, at least for portions of operation, approximately the same as the pressure of the gas layer 14 within the accumulator 12. This may allow the gas that is being stored within the accumulator 12 to also be used to pressurize at least some portions of the thermal storage subsystem 120. In some arrangements, there may be fluid communication between the gas layer 14 and aspects of the thermal storage subsystem 120 to help facilitate such pressurization. Optionally, the fluid communication between the gas layer 14 and portions of the thermal storage subsystem 120 may be sufficiently open and/or free (i.e. without substantial flow impediments) such that gas can flow relatively freely between the accumulator 12 and at least portions of the thermal storage subsystem 120 as the system 10 is in use and as pressure changes within the accumulator 12. This exchange of gas may help facilitate an automatic balancing and/or matching of the pressures between the gas layer 14 and the pressurized portions of the thermal storage subsystem 120.

In some embodiments, the pressure within the thermal storage subsystem 120 may be, at least for portions of operation, higher than the pressure of the gas layer 14 within the accumulator 12. This may be achieved with a dedicated compressor. The dedicated compressor may, preferably, have its inlet in communication with the compressed gas in accumulator 12. This may help reduce the amount of pressure which must be added to the gas by the compressor (as compared to drawing air from atmospheric pressure) as the gas layer 14 is already at an elevated pressure relative to the ambient atmosphere. Alternatively, the thermal storage compressor may have its inlet in communication with the atmosphere.

Optionally, the pressurized water may be passed through a heat exchanger or series of heat exchangers to capture and return the heat to and from the gas stream that is entering and exiting the accumulator, via conduit 22. Generally, sensible heat storage may be useful for storing heat of temperatures of 100 degrees Celsius and higher. Pressurizing the water in these systems may help facilitate heating the water to temperatures well above 100 degrees Celsius (thereby increasing its total energy storage capability) without boiling.

Optionally, in some embodiments, a thermal storage subsystem 120 may combine both latent and sensible heat storage stages and may use phase change materials with multiple stages or a single stage. Preferably, particularly for phase change materials, the number of stages through which air is conveyed during compression and expansion may be adjustable by controller 118. This may help the system 10 to adapt its thermal storage and release programme to match desired and/or required operating conditions.

Optionally, at least some of the gas conduit 22 may be external the shaft 18 so that it is not submerged in the water 20 that is held in the shaft 18. In some preferred embodiments, the compressed gas stream will transfer its thermal energy to the thermal storage system 120 (for example by passing through heat exchangers 635 described herein) before the compressed gas travels underground. That is, some portions of the thermal storage subsystem 120 and at least the portion of the gas conduit that extends between the compressor/expander subsystem 100 and the thermal storage subsystem 120 may be provided above ground, as it may be generally desirable in some embodiments to transfer as much excess heat from the gas to the thermal storage subsystem 120, and reduce the likelihood of heat being transferred/lost in the water 20, ground or other possible heat sinks along the length of the gas conduit 22. Similar considerations can apply during the expansion stage, as it may be desirable for the warmed gas to travel from the thermal storage subsystem 120 to the compressor/expander subsystem 100 at a desired temperature, while reducing the heat lost in transit.

Referring again to FIG. 3, in this example the thermal storage subsystem 120 is configured to store thermal energy from the incoming pressurized gas in a thermal storage liquid 600. Optionally, the thermal storage liquid 600 can be pressurized in the thermal storage subsystem 120 to a storage pressure that is higher than atmospheric pressure and may optionally be generally equal to or greater than the accumulator pressure. Harmonizing the storage pressure in the thermal storage subsystem 120 and the accumulator 12 may help facilitate configurations in which there is at least some fluid communication between the thermal storage subsystem 120 and the accumulator 12 (including those described herein). In some examples, the storage pressure may be between about 100% and about 200% of the accumulator pressure.

Pressurizing the thermal storage liquid 600 in this manner may allow the thermal storage liquid 600 to be heated to relatively higher temperatures (i.e. store relatively more thermal energy and at a more valuable grade) without boiling, as compared to the same liquid at atmospheric pressure. That is, the thermal storage liquid 600 may be pressurized to a storage pressure and heated to a thermal storage temperature such that the thermal storage liquid 600 is maintained as a liquid while the system is in use (which may help reduce energy loss through phase change of the thermal storage liquid). In the embodiments illustrated, the storage temperature may be between about 150 and about 500 degrees Celsius, and preferably may be between about 150 and 350 degrees Celsius. The storage temperature is preferably below a boiling temperature of the thermal storage liquid 600 when at the storage pressure but may be, and in some instances preferably will be the above boiling temperature of the thermal storage liquid 600 if it were at atmospheric pressure. In this example, the thermal storage liquid 600 can be water, but in other embodiments may be engineered heat transfer/storage fluids, coolants, oils and the like. When sufficiently pressurized, water may be heated to a storage temperature of about 250 degrees Celsius without boiling, whereas water at that temperature would boil at atmospheric pressure.

Optionally, the thermal storage liquid 600 can be circulated through a suitable heat exchanger to receive heat from the compressed gas stream travelling through the gas supply conduit 22 during a charging mode (downstream from the compressor/expander subsystem 100). The heated thermal storage liquid 600 can then be collected and stored in a suitable storage reservoir (or more than one storage reservoirs) that can retain the heated thermal storage liquid 600 and can be pressurized to a storage pressure that is greater than atmospheric pressure (and may be between about 10 and 60 bar, and may be between about 30 and 45 bar, and between about 20 and 26 bar).

The storage reservoir may be any suitable type of structure, including an underground chamber/cavity, repurposed underground shaft, (e.g. formed within the surrounding ground 200) or a fabricated tank, container, a combination of a fabricated tank and underground chamber/cavity, or the like. If configured to include an underground chamber and/or repurposed underground shafts, the chamber may optionally be lined to help provide a desired level of liquid and gas impermeability and/or thermal insulation. For example, underground chambers may be at least partially lined with concrete, polymers, rubber, plastics, geotextiles, composite materials, metal and the like. Configuring the storage reservoir to be at least partially, and preferably at least substantially impermeable may help facilitate pressurizing the storage reservoir as described herein. Preferably, the underground chamber may be a repurposed or reconfigured structure that was previously used for another purpose during the construction or operation of the system 10. For example, a thermal storage reservoir may be provided in the interior of a construction shaft or decline or other such structure that was used for a non-thermal storage related purpose during the construction of the system 10.

Fabricated tanks may be formed from any suitable material, including concrete, metal, plastic, glass, ceramic, composite materials and the like. Optionally, the fabricated tank may include concrete that is reinforced using, metal, fiber reinforced plastic, ceramic, glass or the like, which may help reduce the thermal expansion difference between the concrete and the reinforcement material.

In this embodiment the storage reservoir 610 of the thermal storage subsystem 120 includes a chamber 615 that is positioned underground, at a reservoir depth 660. Preferably, the reservoir depth 660 is less than the depth of the accumulator 12, which in this example corresponds to the shaft height 50. Optionally, the thermal storage subsystem 120 can be configured so that the reservoir depth 660 is at least about ⅓ of the accumulator depth/shaft height 50, or more. For example, if the accumulator 12 is at a depth of about 300 m, the reservoir depth 660 is preferably about 100 m or more. For example, having the reservoir depth 660 being less than the accumulator depth 50 may help facilitate sufficient net positive suction head to be available to the fluid transfer pumps and other equipment utilized to pump the thermal storage liquid 600 through the thermal storage subsystem 120 (for example between source reservoir 606 and storage reservoir 610). This may allow the transfer pumps to be positioned conveniently above ground and may help reduce the chances of damaging cavitation from occurring.

The reservoir depth 660 being at least ⅓ the depth 50 of the accumulator 12 may also allow for relatively higher rock stability of the subterranean thermal storage cavern, such as chamber 615. The geostatic gradient, which provides an upper limit on pressure inside underground rock caverns, is typically about 2.5-3 times the hydrostatic gradient. Given this rock stability criterion, the shallowest reservoir depth 660 may be approximately three times less than the accumulator depth in some embodiments, such as when the storage pressure is generally equal than the accumulator pressure. Optionally, the reservoir depth may be equal to the accumulator depth, and in some embodiments the storage reservoir may be at the same elevation/horizon as the accumulator. In some arrangements, both the storage reservoir and accumulator may be formed from different portions of a previously continuous chamber. For example, a large chamber/cavern may be excavated and then sub-divided (for example using walls, bulkheads and the like) to form two regions that are fluidly isolated from each other.

In this example, the chamber 615 is a single chamber having a chamber interior 616 that is at least partially defined by a bottom chamber wall 620, a top chamber wall 651, and a chamber sidewall 621. The chamber 615 is connected to one end of a liquid inlet/outlet passage 630 (such as a pipe or other suitable conduit) whereby the thermal storage liquid 600 can be transferred into and/or out of the chamber 615. In addition to the layer of thermal storage liquid 600, a layer of cover gas 602 is contained in the chamber 615 and overlies the thermal storage liquid 600. Like the arrangement used for the accumulator 12, the layer of cover gas 602 can be pressurized using any suitable mechanism to help pressurize the interior of the chamber 615 and thereby help pressurize the thermal storage liquid 600. The cover gas may be any suitable gas, including air, nitrogen, thermal storage liquid vapour, an inert gas and the like. Optionally, at least the subterranean portions of the liquid inlet/outlet passage 630 (i.e. the portions extending between the heat exchanger 635 and the storage reservoir 610) may be insulated (such as by a vacuum sleeve, or insulation material) to help reduce heat transfer between the thermal storage fluid and the surrounding ground.

When the thermal storage subsystem 120 is in use, a supply of thermal storage liquid can be provided from any suitable thermal storage liquid source 605. The thermal storage liquid source can be maintained at a source pressure that may be the same as the storage pressure or may be different than the storage pressure. For example, the thermal storage liquid source may be at approximately atmospheric pressure, which may reduce the need for providing a relatively strong, pressure vessel for the thermal storage liquid source. Alternatively, the thermal storage liquid source may be pressurized. The thermal storage liquid source may also be maintained at a source temperature that is lower, and optionally substantially lower than the storage temperature. For example, the thermal storage liquid source may be at temperatures of between about 2 and about 100 degrees Celsius and may be between about 4 and about 50 degrees Celsius. Increasing the temperature difference between the incoming thermal storage liquid from the source and the storage temperature may help increase the amount of heat and/or thermal energy that can be stored in the thermal storage subsystem 120.

The thermal storage liquid source 605 may have any suitable configuration and may have the same construction as an associated storage reservoir or may have a different configuration. For example, in the embodiment of FIG. 3 the thermal storage liquid source 605 includes a source reservoir 606 that is configured in the same underground chamber as the thermal fluid storage chamber 615. In this arrangement, a closed loop system can be provided, including the storage reservoir 610 and the source reservoir 606. Alternatively, the thermal storage liquid source 605 may include a source reservoir 606 that is configured as an above-ground vessel, and optionally need not be pressurized substantially above atmospheric pressure. In other embodiments, the thermal liquid source 605 may include a body of water such as the lake 150, water 20 from the shaft 18, liquid from the compensation liquid layer 16 in the accumulator 12 (or from any other portion of the overall system 10), water from a municipal water supply or other such sources and combinations thereof.

In the embodiment of FIG. 3, the source reservoir 606 and storage reservoir 610 are adjacent each other and are portions of a generally common underground chamber. This may help simplify construction of the thermal storage subsystem 120 as an excavation of a single chamber may provide space for both the source reservoir 606 and storage reservoir 610. This may also help simplify piping and valving between the source reservoir 606 and the storage reservoir 610.

In some examples, the interiors of the storage reservoir 610 and source reservoir 606 may be substantially fluidly isolated from each other, such that neither gas nor liquid can easily/freely pass between reservoirs 606 and 610. Alternatively, as illustrated in Figure, the interiors of the storage reservoir 610 and source reservoir 606 may be in gas flow communication with each other, such as by providing the gas exchange passage 626 that can connect the layer of cover gas 602 with a layer of cover gas 608 in the source reservoir 606. The gas exchange passage 626 can be configured to allow free, two-way flow of gas between the storage reservoir 610 and the source reservoir 606 or may be configured to only allow one-way gas flow (in either direction). Providing a free flow of gas between the storage reservoir 610 and the source reservoir 606 may help automatically match the pressures within the storage reservoir 610 and the source reservoir 606. Preferably, when arranged in this manner, the interior of the storage reservoir 610 remains at least partially isolated from the interior of the source reservoir 606 during normal operation to inhibit, and preferably prevent mixing of the relatively hot cover gas associated with the thermal storage liquid 600 in the storage reservoir 610 with the relatively cooler cover gas associated with the thermal storage liquid in the source reservoir 606. In this example, the storage reservoir 610 and source reservoir 606 share a common sidewall, which can function as an isolating barrier 625 to prevent liquid mixing between the reservoirs. This common sidewall may be insulated to prevent unwanted heat transfer from the relatively hot thermal storage liquid 600 in the storage reservoir 610 to the relatively cooler thermal storage liquid in the source reservoir 606

When the compressed gas energy storage systems are in a charging mode, compressed gas is being directed into the accumulator 12 and the thermal storage liquid 600 can be drawn from the thermal storage liquid source 605, passed through one side of a suitable heat exchanger 635 (including one or more heat exchanger stages) to receive thermal energy from the compressed gas stream exiting the compressor/expander subsystem 100, and then conveyed/pumped through the liquid inlet/outlet passage 630 and into the storage reservoir 610 for storage at the storage pressure.

When the compressed gas energy storage system is in a storage mode, compressed gas is neither flowing into or out of the accumulator 12 or thorough the heat exchanger 635, and the thermal storage liquid 600 need not be circulated through the heat exchanger 635.

When the compressed gas energy storage systems are in a discharging mode, compressed gas is being transferred from the accumulator 12 and into the compressor/expander subsystem 120 for expansion and the thermal storage liquid 600 can be drawn from the storage reservoir 610, passed through one side of a suitable heat exchanger 635 (including one or more heat exchanger stages) to transfer thermal energy from thermal storage liquid into the compressed gas stream to help increase the temperature of the gas stream before it enters the compressor/expander subsystem 100. Optionally, the thermal storage fluid can then be conveyed/pumped into the source reservoir 606 for storage.

The thermal storage liquid 600 can be conveyed through the various portions of the thermal storage subsystem 120 using any suitable combination of pumps, compressors, valves, flow control mechanisms and the like. Optionally, an extraction pump may be provided in fluid communication with, and optionally at least partially nested within, the storage reservoir 610 to help pump the thermal storage liquid 600 from the storage reservoir 610 up to the surface. Such a pump may be a submersible type pump and/or may be configured so that the pump and its driving motor are both located within the storage reservoir 610. Alternatively, the pump may be configured as a progressive cavity pump having a stator and rotor assembly 668 (including a rotor rotatably received within a stator) provided in the storage reservoir 610 and positioned to be at least partially submerged in the thermal storage liquid 600, a motor 670 that is spaced from the stator and rotor assembly 668 (on the surface in this example) and a drive shaft 672 extending therebetween. In this example, the drive shaft 672 is nested within the liquid inlet/outlet passage 630 extending to the storage reservoir 610, but alternatively may be in other locations. Alternatively, a dedicated thermal storage compressor (such as compressor 664 described herein) may be used to further pressurize the head gas of the thermal storage chamber and drive the heated thermal fluid to the surface while remaining in its liquid state.

Optionally, to help pressurize the storage reservoir 610, the thermal storage subsystem 120 may include any suitable type of pressurization system and may include a thermal storage compressor system that can help pressurize the layer of cover gas 602 in the storage reservoir. This may include a thermal storage compressor 664 that is in fluid communication with the cover gas layer. The compressor itself may be on the surface and may be connected to the cover gas layer by a compressor gas conduit 666 that may be spaced from, or at least partially integrated with the liquid inlet/outlet passage 630. Optionally, the compressor 664 may be configured to raise the pressure of the cover gas layer 602 from atmospheric pressure to the storage pressure. The compressor 664, and any other aspects of the thermal storage subsystem 120 may be controlled at least partially automatically by the controller 118. While shown as a separate compressor 664, pressure for the storage reservoir 610 may at least partially be provided by the compressor/expander subsystem 100.

Figure 4:
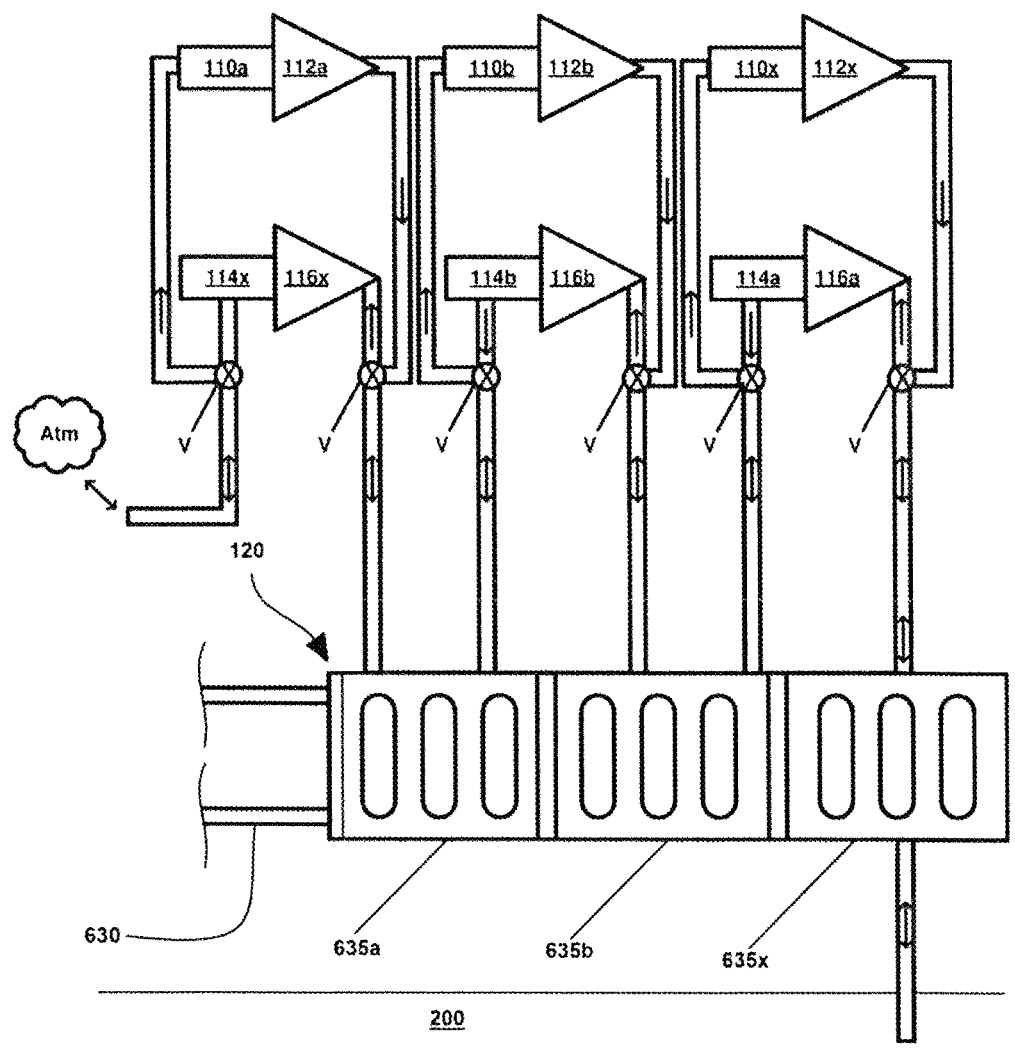
FIG. 4 is a schematic view of components of an alternative compressor/expander subsystem for a compressed gas energy storage system, with pairs of compression and expansion stages each associated with a respective stage of a thermal storage subsystem.

FIG. 4 is a schematic view of components of on example of a compressor/expander subsystem for use with a suitable compressed gas energy storage system (including the hydrostatically compensated systems described herein and other systems that are not hydrostatically compensated), with pairs of compression and expansion stages each associated with a respective heat exchanger of the thermal storage subsystem 120.

In this embodiment, a given exchanger of the thermal storage subsystem 120 is used during both the compression and expansion stages, by routing air being conveyed into the accumulator 12 through the thermal storage subsystem 120 to remove heat from the air either prior to a subsequent stage of compression or prior to storage, and routing air being conveyed out of accumulator 12 through the thermal storage subsystem 120 to add heat to the air either after release from accumulator or after a stage of expansion. In a sense, therefore, pairs of compression and expansion stages share a heat exchanger 635a, 635b and 635x and airflow is controlled using valves V, as shown in FIG. 4. This embodiment may be useful where the "same" heat/thermal energy received from the compressed air being conveyed through the air flow path towards the accumulator 12 during a storage phase is intended to be reintroduced and/or transferred into the air being released from the accumulator 12 during a release phase.

The embodiment of FIG. 4 has a first heat exchanger 635a provided in the gas flow path and operable to transfer thermal energy between the compressed gas travelling through the gas flow path and the thermal storage liquid. A further second heat exchanger 635b is provided in the gas flow path downstream from the first heat exchanger and operable to transfer thermal energy between the compressed gas travelling through the gas flow path and the thermal storage liquid. For clarity, downstream refers to the path of compressed gas in charging mode. A further third heat exchanger 635x is provided in the gas flow path downstream from the second heat exchanger and operable to transfer thermal energy between the compressed gas travelling through the gas flow path and the thermal storage liquid.

Usage of multiple heat exchangers may allow the system to operate under desirable conditions. Since there are multiple stages of heat exchangers in this arrangement, no single heat exchanger needs to be responsible for capturing all the thermal energy from the compressed gas. Instead, there are multiple opportunities for the thermal energy in the compressed gas to be transferred to the thermal storage media. The thermal storage media can therefore be kept at a lower temperature, which may reduce the pressure to which the thermal storage liquid needs to be pressurized to maintain its liquid state, may optionally eliminate the need to pressurize the thermal storage liquid generally above atmospheric pressure and/or may help reduce the need for thermal insulative material in the thermal storage reservoir or other portions of the thermal storage subsystem 120.

Similarly, in the discharging mode, the gas exiting the accumulator may receive thermal energy from the thermal storage media at each of the heat exchangers. The additional heat exchangers may help improve the overall efficiency of the thermal energy transfer back to the gas.

Figure 5:
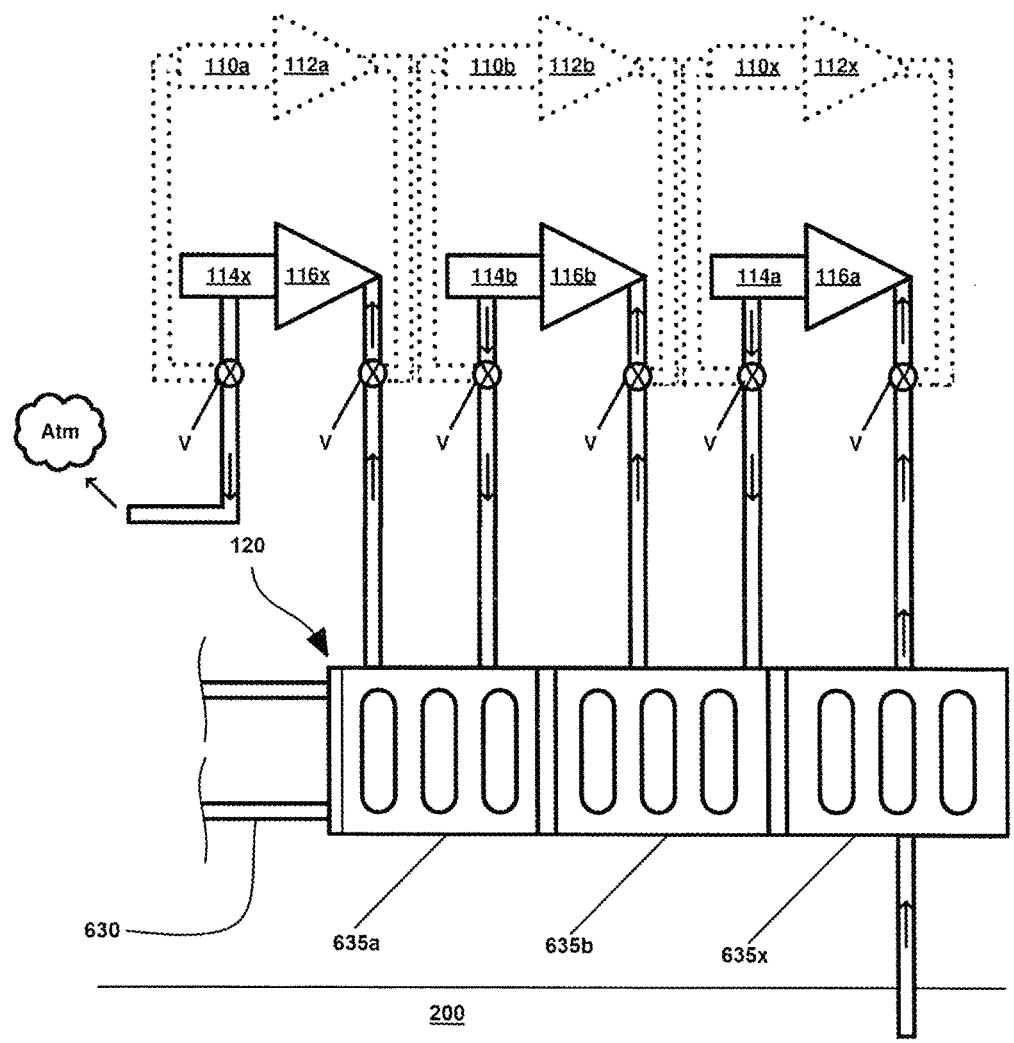
FIG. 5 is a schematic view of components of the alternative compressor/expander subsystem of FIG. 4, showing airflow during an expansion (release) phase from storage through multiple expanders and respective stages of a thermal storage subsystem.

FIG. 5 is a schematic view of components of the alternative example of a compressor/expander subsystem, showing airflow during an expansion (release) phase from storage through multiple expander stages and multiple respective heat exchangers of the thermal storage subsystem 120. In this phase, through control of valves V, airflow is directed through multiple expansion. The dashed lines show multiple compression stages the airflow to which is prevented during an expansion phase by the control of valves V.

Figure 6:
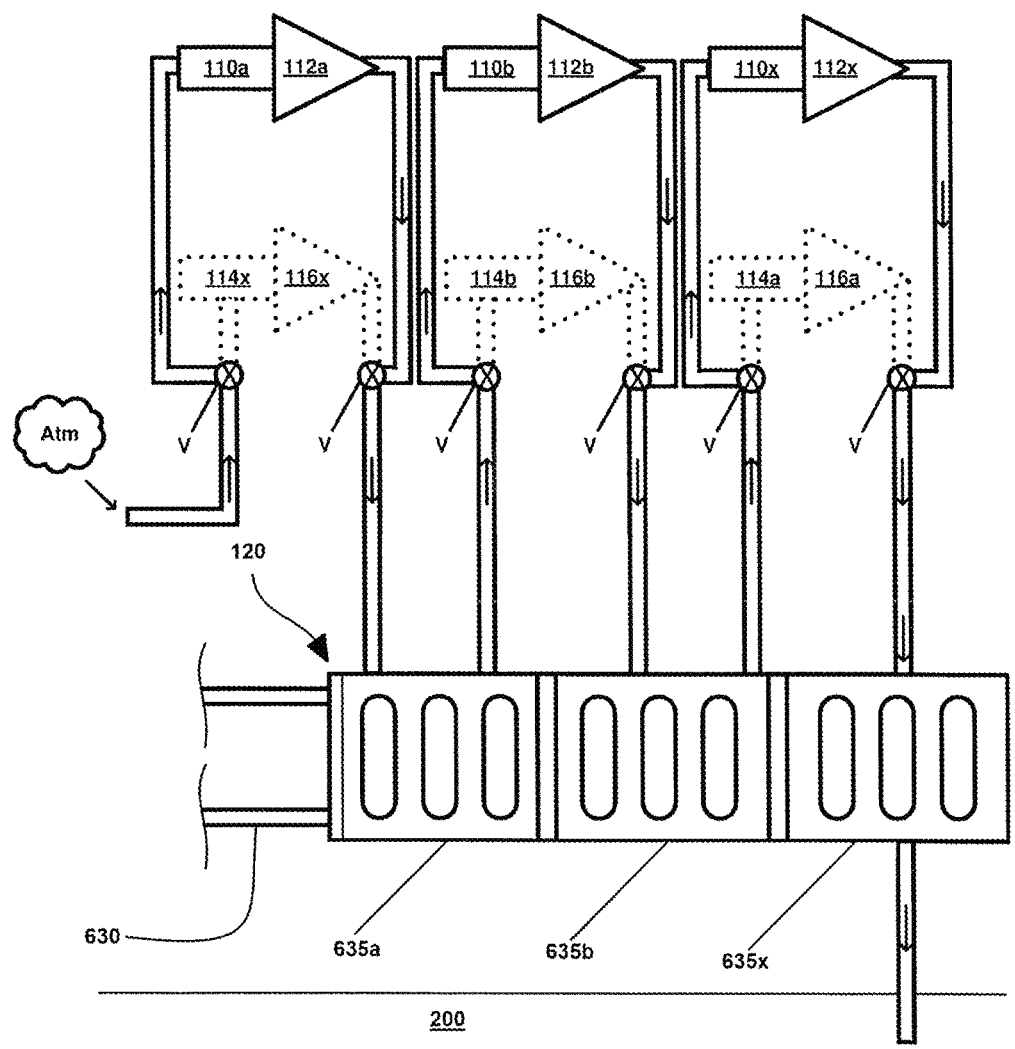
FIG. 6 is a schematic view of components of the alternative compressor/expander subsystem of FIG. 4, showing airflow during a compression (storage) from the ambient through multiple compressors and respective stages of a thermal storage subsystem.

FIG. 6 is a schematic view of components of the alternative compressor/expander subsystem of FIG. 4, showing airflow during a compression (storage) phase from the ambient A through multiple compressor stages and multiple respective heat exchangers of the thermal storage subsystem 120. In this phase, through control of valves V, airflow is directed through multiple compression stages. The dashed lines show multiple expansion stages the airflow to which is prevented during the compression phase by the control of valves V.

Figure 7:
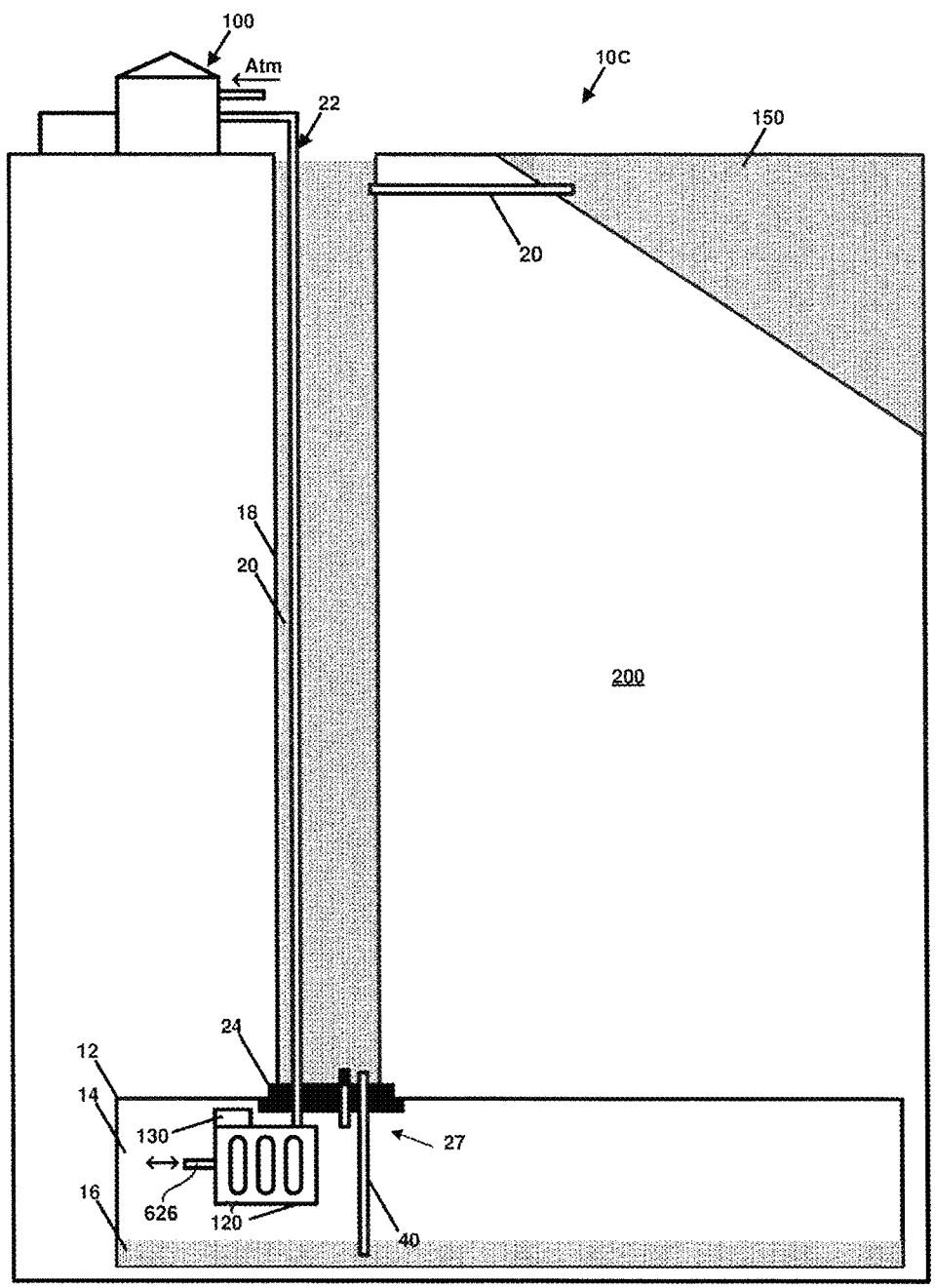
FIG. 7 is a sectional view of components of a compressed gas energy storage system, according to an alternative embodiment.

FIG. 7 is a sectional view of components of an alternative compressed gas energy storage system 10C, according to an embodiment. In this embodiment, compressed gas energy storage system 10C is similar to the other embodiments of the compressed gas energy storage systems described herein. However, in this embodiment the thermal storage subsystem 120 (including any of the suitable variations described herein, including a storage reservoir 610, source reservoir 606 and related equipment) is located within the accumulator 12 and may be at least partially immersed within the compressed gas in compressed gas layer 14. The thermal storage subsystem 120 may be positioned within the accumulator 12 during construction via the opening 27 that is thereafter blocked with bulkhead 24 prior to filling shaft 18 with liquid 20. The thermal storage subsystem 120 can thus be designed to allow for the construction, insulation, etc. to be completed prior to placement within the accumulator 12 and/or is constructed in easily-assembled components within the accumulator 12. This allows for the units to be highly insulated and quality-controlled in their construction, which enables the thermal storage subsystem 120 to be generally independent of the accumulator 12, with the exception of an anchoring support (not shown).

Optionally, a regulating valve 130 associated with the interior of thermal storage subsystem 120 may be provided and configured to open should the pressure within the thermal storage subsystem 120 become greater than the designed pressure-differential between its interior and the pressure of the compressed gas layer 14 in the surrounding accumulator 12. Pressure within the thermal storage subsystem 120 may be maintained at a particular level for preferred operation of the latent or sensible material. For example, heated water as a sensible material may be maintained at a particular pressure to maintain the thermal fluid in its liquid state at the storage temperature. The regulating valve 130 may open to allow the pressurized gas in the interior to escape to the accumulator 12 and can close once the pressure differential is lowered enough to reach a designated level. In an alternative embodiment, such a regulating valve may provide fluid communication between the interior of the thermal storage subsystem 120 and the ambient A at the surface thereby to allow gas to escape to the ambient rather than into the accumulator 12. While thermal storage subsystem 120 is shown entirely immersed in the compressed gas layer 14, alternative thermal storage subsystems 120 may be configured to be immersed partly or entirely within compensation liquid layer 16. In some examples, only a portion of the thermal storage subsystem 120, such as the storage reservoir 610, may be at least partially nested within the accumulator 12, and other portions, such as the heat exchangers and the source reservoir 606, may be spaced apart from the accumulator 12.

Figure 8:
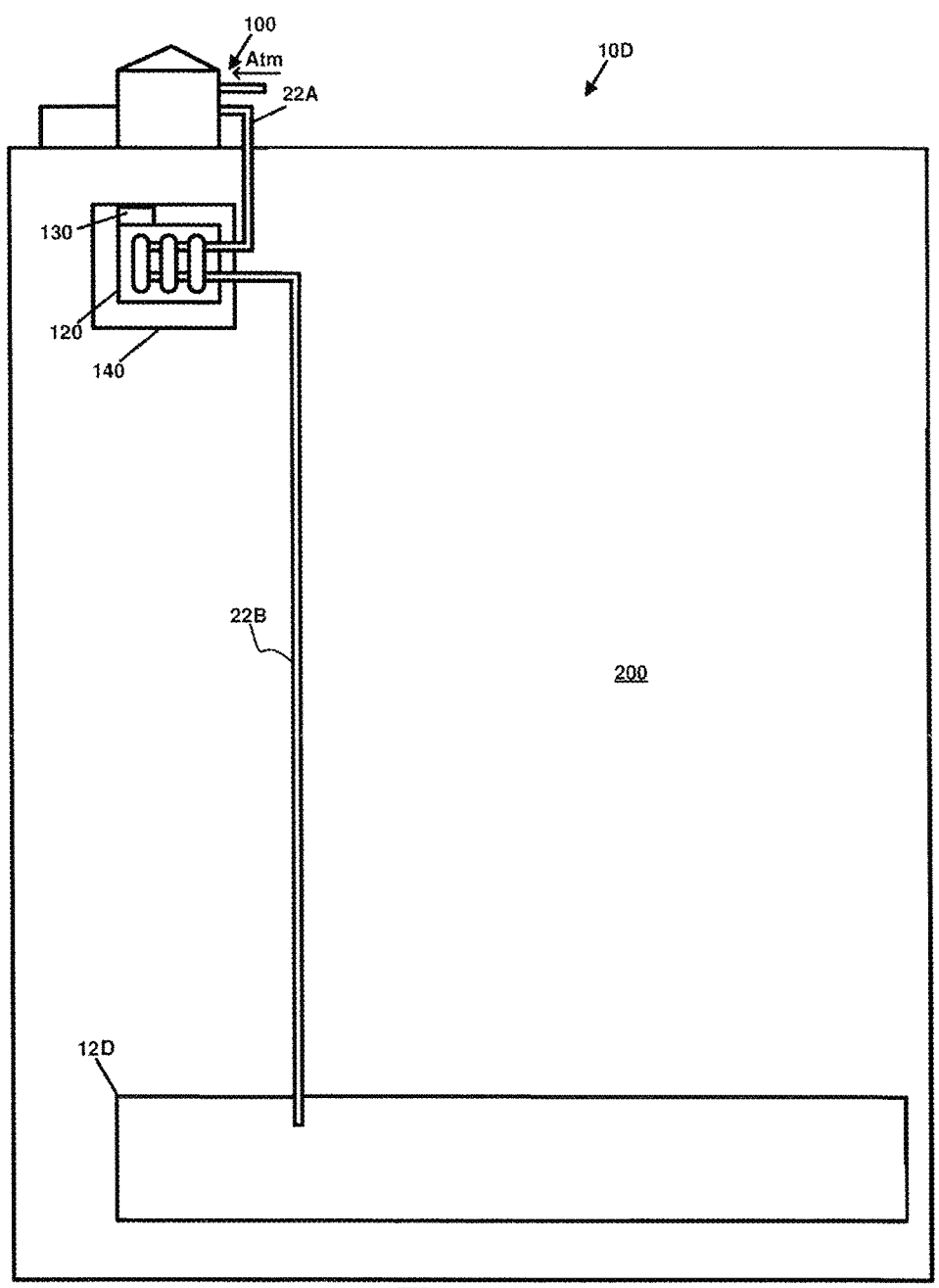
FIG. 8 is a sectional view of components of an alternative compressed gas energy storage system, according to another alternative embodiment.

FIG. 8 is a sectional view of components of an alternative compressed gas energy storage system 10D, according to another alternative embodiment. In this embodiment, the compressed energy gas storage system 10D includes a different type of accumulator 12D that is not hydrostatically compensated, and may be a salt cavern, an existing geological formation, or manmade. That is, the accumulator 12D is configured to contain compressed gas but need not include a liquid layer or be associated with a shaft containing water. This is another type of accumulator that may, in some embodiments, be used in place of or in addition to the accumulators 12 used with respect to other embodiments of the compressed gas energy storage systems described herein. Aspects of the thermal storage subsystems 120 described in this embodiment may be used in combination with the hydrostatically compensated compressed gas energy storage systems described, and aspects of the thermal storage subsystems 120 depicted in other embodiments may be utilized with accumulators similar to accumulator 12D. In this embodiment, compressed gas energy storage system 10D is similar to above-described compressed gas energy storage systems. However, the thermal storage subsystem 120 is located within an isobaric pressurized chamber 140 within ground 200 that may be maintained at the same pressure as is accumulator 12, or a pressure that is substantially similar to the accumulator pressure or optionally at a pressure that is less than or greater than the accumulator pressure. Optionally, the thermal storage subsystem 120 may be positioned within the pressurized chamber 140 during construction via an opening that is thereafter blocked so the chamber 140 may be pressurized to a working pressure that is, preferably, greater than atmospheric pressure. The thermal storage subsystem 120 can thus be designed to allow for the construction, insulation, etc. to be completed prior to placement within the chamber 140 and/or is constructed in easily-assembled components within the chamber 140. This allows for the units to be highly insulated and quality-controlled in their construction, which enables the thermal storage subsystem 120 to be generally independent of the chamber 140, with the exception of anchoring support (not shown). A regulating valve 130 associated with the interior of thermal storage subsystem 120 is provided and configured to open should the pressure within the thermal storage subsystem 120 become greater than the designed pressure-differential between the interior and the surrounding pressurized chamber 140. Pressure within the thermal storage subsystem 120 may be required to be maintained at a particular level for optimal operation of the latent or sensible material. For example, heated water as a sensible material may be required to be maintained at a particular pressure to maintain the thermal fluid in its liquid state at the storage temperature. The regulating valve 130 opens to allow the pressurized gas in the interior to escape to the pressurized chamber 140 and closes once the pressure differential is lowered enough to reach a designated level. In an alternative embodiment, such a regulating valve 130 may provide fluid communication between the interior of the thermal storage subsystem 120 and the ambient A at the surface thereby to allow gas to escape to the ambient rather than into the pressurized chamber 140.

Locating the thermal storage subsystem 120 above the accumulator 12, and thus physically closer to the compression/expansion subsystem 100, may help reduce the length of piping required, which may help reduce the costs of piping, installation and maintenance, as well as reduced fluid-transfer power requirements.

Locating the thermal storage system 120 above the accumulator 12 and thus physically closer to the compression/expansion subsystem 100, will help reduce the vertical distance/height which the thermal fluid has to travel to reach the compression/expansion subsystem 100. This may help reduce the pressure loss due to gravity head of the fluid when travelling from the thermal storage system 120 to the compression/expansion subsystem 100. This may help reduce the pressure which the thermal storage system 120 must be maintained at and/or may reduce pumping requirements of the system.

While the embodiment of compressed gas energy storage system 10D includes an isobaric pressurized chamber 140, alternatives are possible in which the chamber 140 is not strictly isobaric. Furthermore, in alternative embodiments the pressurized chamber 140 may be in fluid communication with gas layer 14 and thus can serve as a storage area for compressed gas being compressed by compressor/expander subsystem 100 along with accumulator 12. In this way, the pressure of the gas in which the thermal storage subsystem 120 is immersed can be maintained through the same expansions and compressions of gas being conveyed to and from the accumulator 12.

Optionally, any of the thermal storage subsystems 120 described herein may include a thermal conditioning system that can be used to regulate the temperature of the layer of cover gas 602 in the storage reservoir 610 and/or in the source reservoir 606. For example, the thermal conditioning system may include a fan cooler, heat exchanger, evaporator coils or other such equipment so that it can be used to optionally reduce (or alternatively increase) the temperature of the layer of cover gas 602 when the thermal storage subsystem 120 is in use.

Figure 9:
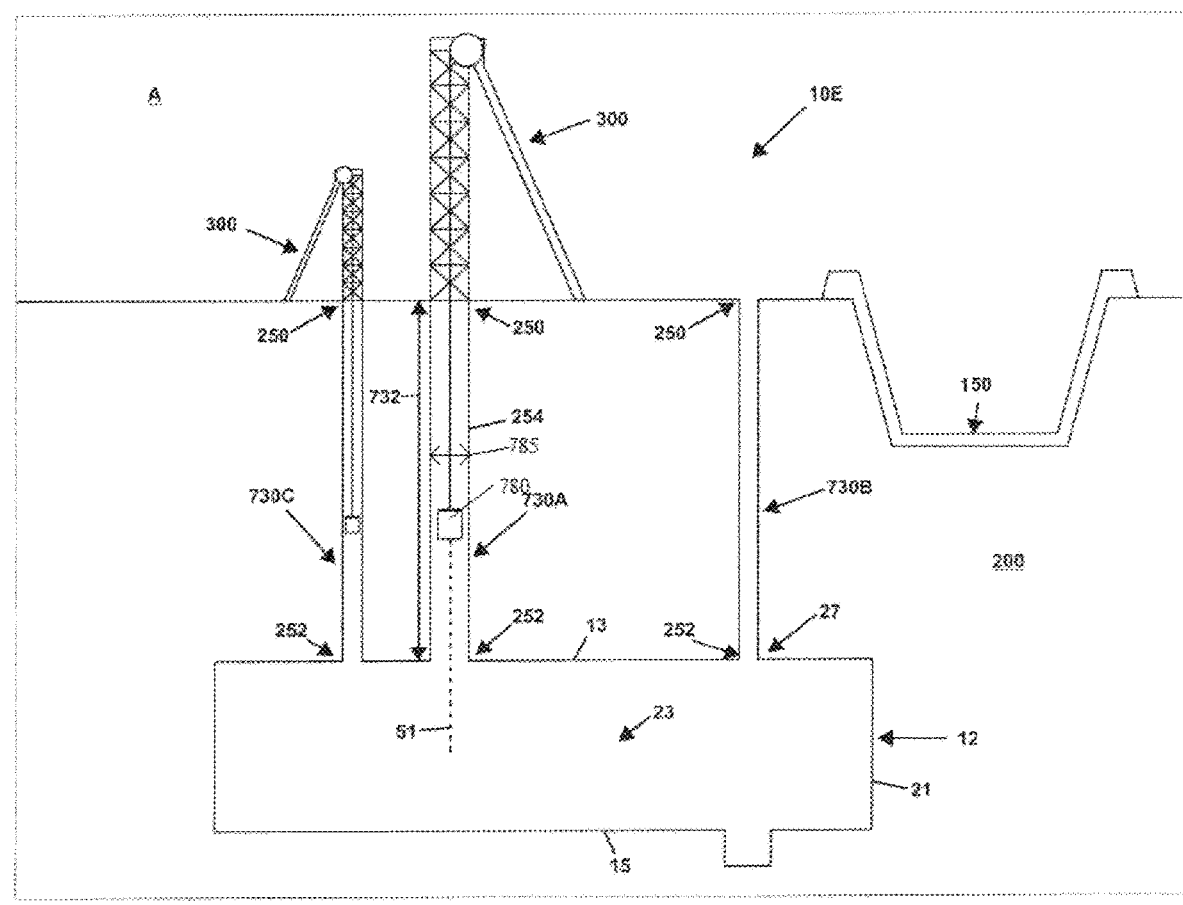
FIG. 9 is a schematic representation of another example of a compressed gas energy storage system in a construction phase.

Referring to FIG. 9, another example of a hydrostatically compensated compressed gas energy storage system 10E is schematically illustrated in a construction phase of development. The compressed gas energy storage system 10E is analogous to the other compressed gas energy storage systems described herein, and analogous features are identified using like reference characters. Features and/or aspects of the system 10E may be utilized in combination with suitable features from any other embodiment of a compressed gas energy storage system, including systems 10 described herein.

In this embodiment, the system 10E is schematically illustrated while under construction, with the accumulator 12 being excavated and not yet containing the gas and liquid layers 14 and 16. During the construction phase, one or more construction shafts may be created as part of the process of excavating and accessing the accumulator 12 and/or other underground components of the system 10E. The number of shafts or similar structures used during the construction of a given system may vary based on the size and configuration of the system and its components, as well as the local ground conditions, construction regulations and other similar factors.

The construction shafts may be sized and configured to accommodate the passage of a construction apparatus 780 therethrough. By way of non-limiting example, the construction apparatus 780 may include an elevator, vehicle, hoist, equipment lift, or other apparatus suitable for moving equipment and/or people in and out of the construction shaft). In certain embodiments, the one or more construction shafts may each have a transverse width 785 of about 2 m or more. In certain preferred embodiments, the one or more construction shafts may each comprise a circular cross-sectional shape and may have diameter of between about 2 m and about 5 m, or more preferably between about 1.5 m and about 7 m. In certain preferred embodiments, the one or more construction shafts may each have a cross-sectional area of between about 3 m$^2$ and about 60 m$^2$ or more preferably between about 4 m$^2$ and about 20 m$^2$.

Generally, there will be at least one shaft created during the construction phase that extends from the surface (i.e. is accessible from the surface to facilitate access to the system 10E during construction) to the accumulator 12. In the example of FIG. 9, the system 10E includes three construction shafts 730. The construction shafts 730 are shown schematically as being substantially vertical shafts that have a generally similar configuration. However, when constructed in a given system, the shafts 730 need not be vertical and need not have the same configuration as each other.

Referring again to FIG. 9, the system 10E has an excavation shaft 730A that can function as the primary excavation shaft that is used to access the accumulator 12 during construction. This shaft 730 includes an upper end 250 that is accessible from the surface during the construction phase, and a lower end 252 that is connected to the accumulator 12 with a sidewall 254 extending therebetween. The shaft has a transverse width 785. In this example the lower end 252 is connected to an opening in the upper wall 13 of the accumulator 12 and provides communication between the surface and the interior of the accumulator 12. A shaft of this nature may be used during construction to raise and lower debris, personnel, equipment (such as trucks, excavators, etc.) into and out of the accumulator 12. The shafts 730, including shaft 730A, may therefore be configured and sized appropriately to facilitate these usages, and may be large enough to accommodate large construction equipment and the like, etc. It may also be used to transport construction materials, liners, etc. down into the accumulator 12.

In addition to, or in alternative to, be used to excavate debris and/or transport equipment, shafts 730 may be constructed for other purposes. For example, shafts 730 extending generally from the surface to the accumulator 12 (or to other construction features) may be used to provide ventilation to the underground features, to provide access and egress from the underground features (for example to help satisfy safety requirements, etc.

The system 10E also includes other shafts 730 that are separate from shaft 730A. These additional shafts may be used for an alternative purpose, such as ventilation or service access. Although any of these could be used as an excavation shaft in the invention, without loss of generality, excavation shaft 730A may be considered the main excavation shaft. Any reference to excavation shaft 730A could also be accomplished with either excavation shaft 730.

Referring again to FIG. 9, when the system 10E is under construction (e.g. is in a construction phase) the excavation shaft 730A connects the surface above ground 200 to accumulator 12 so that the interior of accumulator 12 is accessible from the surface via excavation shaft 730A. This allows access to accumulator 12 for construction or maintenance. This access may be by a direct connection, or some sort of indirect connection through other elements.

During the construction phase, a head frame or hoist 300, or other suitable construction apparatus 780, may be used to assist in the construction of the system 10E. Head frame 300 may be of varying sizes depending on the needs of excavation shaft 730A, accumulator 12, system 10E or any other component of system 10E.

System 10E may also comprise a second excavation shaft 730B extending between an upper end 250 accessible from the surface and a lower end 250 in fluid communication with the interior of the accumulator 23 so that when the accumulator 12 was being constructed the interior of the accumulator 23 was also accessible via the excavation shaft 730B, the upper end of the second excavation shaft is sealed fluidly isolating an interior of the second excavation shaft from the atmosphere A wherein the interior of the second excavation shaft 730B forms part of the gas flow path and is in fluid communication with the gas compressor/expander subsystem 100.

Figure 10:
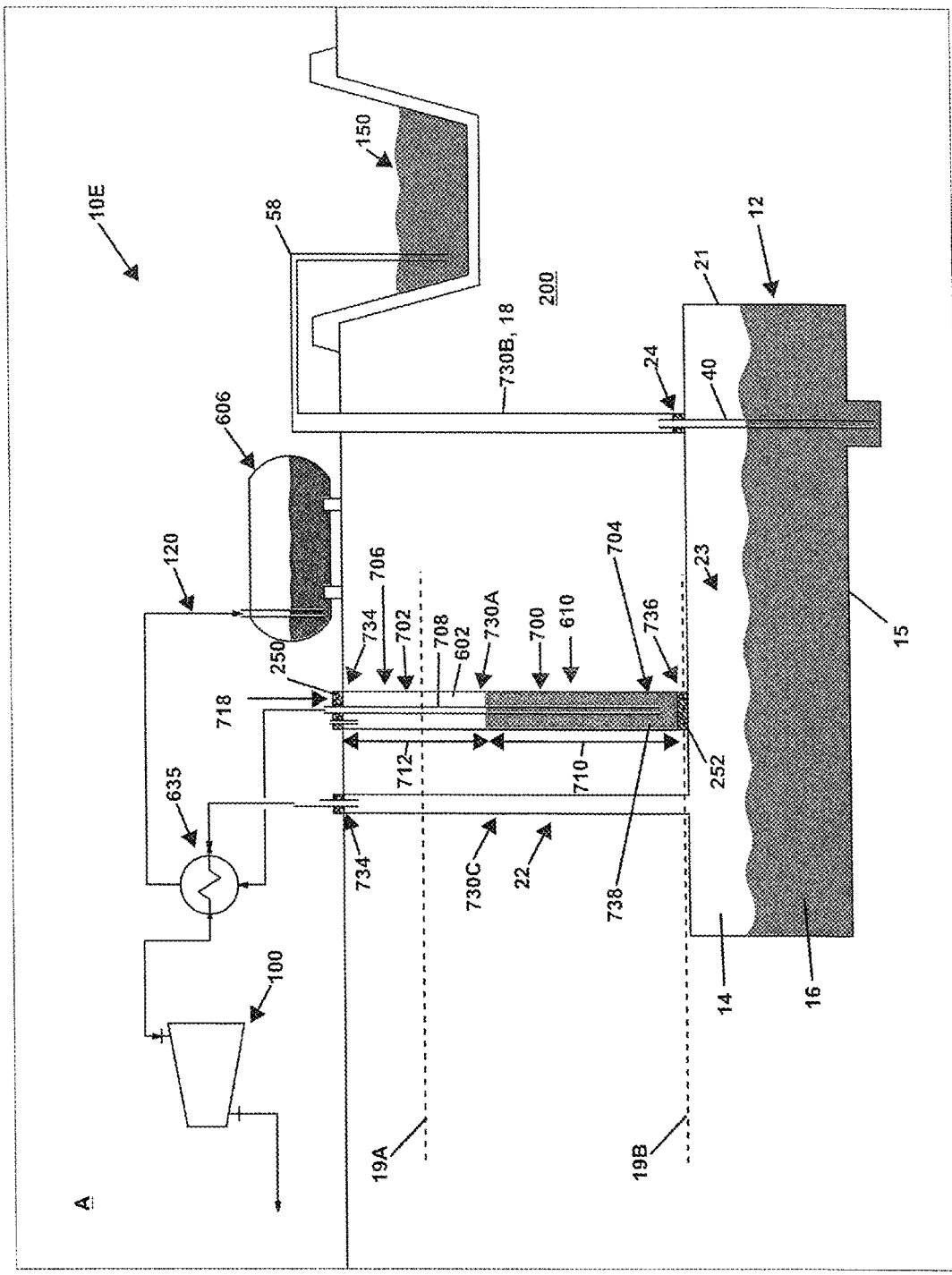
FIG. 10 is a schematic representation of compressed gas energy storage system of FIG. 9 in a use phase.

When the system 10E is configured into its operational, use state, as shown in FIG. 10, one or more of the shafts 730 can be repurposed to provide one or more functional component of the system 10E. In the illustrated embodiment, for example, the shaft 730A may be reconfigured to operate as a gas flow path, the shaft 730B may reconfigured to operate as the hydrostatic liquid compensation shaft 18, and the shaft 730C may be reconfigured to operate as one or more parts of a thermal storage system 120 as described herein. To transition between uses, the shafts 730A, 730B, and 730 C can be reconfigured by, amongst other things, capping the lower or upper end of each shaft with a suitable bulkhead to provide the desired isolation between the interior of each shaft and the surface or isolation between the interior of the shaft and the accumulator. For example, to transition from a construction shaft to a liquid compensation shaft 18, shaft 730B may be reconfigured by capping its lower end 252 with a suitable bulkhead 24 (and conduit 40 and other components described herein but not shown in this figure for simplicity) to provide the desired isolation between the interior of the shaft 730B and the accumulator 12, the shaft 730B can filled with water and can be connected to the water source/sink 150 to allow water to flow into or out of the interior of the shaft 18 as required when the system 10 is in operational modes.

Similarly, another construction shaft 730, such as the shaft 730C may be converted from being a secondary access or egress shaft or ventilation shaft or the like to forming a portion of the gas flow path extending between the compressor/expander subsystem 100 and the accumulator 12. In this example, the shaft 730C can be repurposed during a transition phase by enclosing the upper end 250 with a suitable end wall 734 to fluidly isolate the interior of the shaft 730C from the atmosphere. The lower end 252 of shaft 730C may be left open to the accumulator 12 as shown, or a lower end wall or similar structure may be provided to at least partially cover the lower end 252 or otherwise change the configuration of the shaft 730C as desired. When configured in this manner, as shown in FIG. 10, some or all of the shaft 730C may be reconfigured to function as at least a portion of the gas flow conduit 22 described herein which forms part of the gas flow path (or alternatively a separate conduit 22 may be disposed within the shaft 730C. In this arrangement, the interior of the shaft 730C is in fluid communication with gas compressor/expander subsystem 100 using a suitable conduit and/or pipe that can, optionally, extend from the compressor/expander subsystem 100, through the upper end wall 734, and into the interior of the shaft 730C.

In this embodiment, the gas flow path may be used to convey the pressurized air from gas compressor/expander subsystem 100 and heat exchanger 635 to accumulator 12 during charging mode, and to allow the pressurized gas to flow from accumulator 12 to heat exchanger 635 and gas compressor/expander subsystem 100 during discharging mode. The fluid isolation of the interior of the shaft 730C from the atmosphere, as provided by the upper wall 734, can help prevent the escape of the pressurized system gas from the gas flow path and accumulator into the surrounding atmosphere A.

In the embodiment of FIG. 10, the system 10E includes a thermal storage subsystem 120 that includes a heat exchanger assembly 635 (which can include one or more individual heat exchangers 635), and preferably includes a source reservoir 606 for holding relatively cool thermal storage fluid (water in this embodiment) and an associated storage reservoir 610 for containing relatively warm thermal storage fluid. Preferably, the shaft 730A can be repurposed to form part of the thermal storage subsystem 120. For example, the upper end 250 of the shaft 730A can be covered to isolate the interior of the shaft 730A from the atmosphere, and the lower end 252 can be covered to isolate the interior of the shaft 730A from the interior of the accumulator. This may help allow the interior of the shaft 730A to be configured to store materials, heat exchangers, compressors, expanders, pumps, equipment, process fluids and/or other suitable items generally separate from the accumulator 12 and atmosphere A.

In this particular example, the shaft 730A has been reconfigured by installing an upper end wall 734 to seal its upper end and isolate the interior of the shaft 730A from the atmosphere A, and by installing a lower dividing wall 736 to seal its lower end 252 and isolate the interior of the shaft 730A from the accumulator 12. In this arrangement, the interior of the shaft 730A includes a containment region 700 that is able to store a liquid, and optionally may include a cover region 702 that can contain a layer of cover gas 602 that overlies the liquid in the containment region 700. When reconfigured in this manner, the shaft 730A may provide a functional component of the thermal storage subsystem 120 and may be operated as a storage reservoir 610 and can contain a thermal storage liquid (e.g. water) within its containment region 700.

In this example, the containment region 700 is disposed toward lower end 704 and lower dividing wall 736 and is configured to contain the thermal storage liquid. In this example, a containment height 710 can be defined as the height of the containment region from of the lower end wall 734 to the level of the free surface of the liquid contained in the containment region 700, as shown in FIG. 10. Similarly, the cover portion 702 is disposed above the containment portion 700 and defines a cover height 712 that is the distance from the free surface of the liquid to the upper end wall 734. The height, and in turn volume, of the containment region 700 and cover portion 702 may vary during system operation.

Repurposing of construction shafts 730 of this nature may be part of an overall process and/or method of creating the system 10E that includes forming one or more structures (e.g. shafts) during a construction phase, reconfiguring the structure(s) during a transition phase by modifying their configuration and/or properties so that what was once a construction element can operate as a functional component of a compressed gas energy storage system 10E while it is in use.

Referring to FIGS. 9 and 10 as an example, a process may include building aspects of the system 10E during a construction phase and then, once the construction of system 10E is complete or substantially complete, moving into a transition phase in which reconfiguration and/or retrofit work is performed, before the system 10E is ready for use in its operating phase. For example, during the transition state, the shafts 730 in system 10E are each repurposed from being primarily used for construction and excavation, access, ventilation and the like to a second state in which they are substantially less suitable or incapable of being used for their original construction purpose (i.e. the ends are sealed, access is no longer possible, etc.) but are instead suitable for use as an operational component. The exact tasks performed in the transition state for a given shaft 730 or other such structure will depend on the elements used in system 10E, the construction techniques employed to build system 10E and its features and the desired operating conditions in the final operation state of system 10E.

During the transition state, accumulator 12 may be reconfigured so it is suitable to be usable during the operation phase. For example, its interior may be configured (lined, etc.) to contain the compressed gas layer 14 and water layer 16 when in use (or just compressed gas in systems that are not hydrostatically compensated). The amount and type of work necessary to reconfigure the accumulator 12 to contain the compressed gas will depend on several factors, including, but not limited to, the surrounding ground 200, the depth at which accumulator 12 is situated underground and the operating conditions. This may, in some examples, involve reinforcing upper wall 13, lower wall 15, or side walls 21 of accumulator 12.

Also, during the transition phase, the construction shafts 730 may be reconfigured to function as part of the system 10E. Specifically, as exemplified in FIGS. 10 and 11, the shaft 730B can be converted to function as the hydrostatic compensation column 18, shaft 730C can be converted to be part of the gas flow path and shaft 730A can be converted to function as the storage reservoir 610 in the thermal storage subsystem 120.

In the arrangement of FIG. 10, the storage reservoir 610 is located at least partially underground (in this example almost all of the storage reservoir 610 is underground) and it is bounded by the lower dividing wall 736, an upper end wall 734 and the sidewall of the shaft 730A. The lower portion of the shaft 730A forms the containment region 700 for containing the water that serves as the thermal storage media that is circulated through the thermal storage subsystem 120. For example, during the transition phase, the lower dividing wall 736 and upper end wall 734 can be created using any suitable material and/on construction technique and can be and positioned to help fluidly isolate the shaft 730A from both accumulator interior 23 and the atmosphere A. Fluidly isolating excavation shaft 730A from accumulator interior 23 can help prevent mixing of the thermal storage fluid within the shaft 730A with the gas or water layers 14, 16 in the accumulator 12.

Optionally, it may be desirable to operate the thermal storage system 120 such that the heated fluid that is contained in the storage reservoir 610, identified as heated fluid 600A in FIG. 10, is heated to a storage temperature that is greater than the vapour temperature/boiling point of water at atmospheric pressure. To help maintain the water in its liquid state, the interior of the shaft 730A is preferably pressurized to a partial pressure of the thermal fluid that is greater than atmospheric pressure and is sufficient to inhibit boiling of the thermal storage fluid/water. In the illustrated example, the shaft 730A includes a gas filled cover region 702 that overlies the containment region 700 and can be pressurized with thermal fluid in its gaseous state to help pressurize the interior of the shaft 730A and the water in the containment region 700.

The cover region 702 may be pressurized using any suitable type of pressurization system, such as through vaporization of the thermal fluid or through a separate thermal storage compressor 664 that is in fluid communication with the cover region 702 and can pressurize the cover gas layer 602 independently of the state or operation of the accumulator 12 or compressor/expander subsystem 100.

One way to achieve the required thermal storage reservoir pressure is to allow the heated thermal to vaporize until the partial pressure of the gaseous thermal fluid in the storage reservoir is equal to the boiling pressure of the thermal fluid, at which point vaporization will stop.

Alternatively, a thermal storage compressor (such as compressor 664) may be used to increase the pressure in the cover region 702 to a pressure that is greater than the storage pressure of the accumulator 12 during at least a portion of operating life of the systems 10. The thermal storage compressor outlet being fluidly connected to the cover region 702. Alternatively, the thermal compressor inlet may be connected to the ambient atmosphere A.

As described earlier, by having the cover pressure (i.e. the partial pressure of gaseous thermal fluid in the cover gas layer 602 within the cover region 702) greater than the vapour pressure of the thermal storage liquid (water) at the thermal storage temperature, the thermal storage liquid will remain a liquid rather than boil. This allows the thermal storage liquid to be stored as a liquid at a greater temperature than its boiling point at atmospheric pressure. Since the liquid can be stored at a higher temperature, it can hold more thermal energy. This may either allow for more thermal energy from compressed gas to be captured, or reduce the amount of thermal storage liquid used, since less thermal storage liquid is needed to hold the same amount of thermal energy.

Although the desired thermal storage temperature may vary depending on the choice of thermal storage liquid and its vapour pressure at the thermal storage temperature, the thermal storage temperature may be, in some examples, between about 150 degrees Celsius and about 350 degrees Celsius and may be between about 175 and about 300 degrees Celsius, and between about 200 and 275 degrees Celsius. This lower and upper limit on the thermal storage liquid is with regard to feasibility of the system, as lower temperatures may not have a significant impact on the amount of thermal energy that can be stored while higher temperatures may be difficult to maintain with regards to thermal insulation and conductivity.

Preferably, the thermal storage subsystem 120 in this embodiment also includes a source reservoir 606, which is in the example of FIG. 10 an above ground tank that is spaced apart from (and does not overlie) the shaft 730A or its upper end wall 734. Because the temperature of the water in the source reservoir 606 is less than the temperature of the heated water contained in the storage reservoir 610, it may remain in its liquid state at atmospheric pressure, which may reduce and/or eliminate the need to pressurize the source reservoir 606.

In the example illustrated, the excavation shaft 730A extends substantially vertically along a shaft axis 51 and has an overall shaft height 732 (which can be the sum of the heights 710 and 712). In this example, the excavation shaft 730A is shown has having a generally constant cross-sectional shape (and area), i.e. taken in a plane orthogonal to the shaft axis 51, along its height 732, and may be a substantially cylindrical shaft. A generally constant, possibly cylindrical shape, may be relatively convenient to excavate and may be useful for excavation purposes. Alternatively, the cross-sectional shape of the shaft 730 need not be constant along its entire height 732, and instead may have a constant shape along about 90%, 85%, 80%, 75%, 70%, 65%, 60% or less of its height 732 if desired. For example, some variations in the cross-sectional shape of the shaft 730A may be used to help accommodate the geology of ground 200 and/or to help facilitate the repurposing of the shaft 730A for other uses after the construction phase is complete.

In this example, the cross-sectional area of cover region 702 may be generally the same as a cross sectional area of containment region 700. This may help simplify construction, and may also provide some flexibility in the system, since the portion of excavation shaft 730A used for containment portion 700 and cover portion 702 can be easily adjusted, for example as the level of the liquid within the storage reservoir 610 varies.

In another preferential arrangement, the storage reservoir 610 may be the same horizon/depth as the accumulator 12 (or at least partially overlap the accumulator 12 in the vertical direction). This may help reduce excavation costs, but may require the use of a thermal storage compressor Optionally, the excavation shaft 730A can include any suitable type of insulation or analogous layer that can help inhibit the transfer of thermal energy between thermal storage liquid within the storage reservoir 610 and the ground 200.

To help provide fluid communication between the source reservoir 606 and the containment region 700 in the storage reservoir 610, the thermal storage subsystem 120 may include any suitable conduit or passage member. Optionally, such conduits or passages may extend through the ground 200, or at least partially though the cover region 702.

In the embodiments of FIG. 10, a liquid flow conduit 708 is provided to fluidly connect the source reservoir 606 and the storage reservoir 610 via a heat exchanger system. In this example, the conduit 708 includes a lower end 738 disposed toward the lower end 704 of excavation shaft 730A and in liquid communication with the containment region 700 and upper conduit end 740 disposed at the upper end 706 of the excavation shaft and in liquid communication with liquid outlet from the heat exchanger assembly 635. In this arrangement, the liquid flow conduit 708 can move the thermal storage liquid of one relative temperature from one thermal storage reservoir to another thermal storage reservoir where the thermal storage liquid is at a different relative temperature. As shown in FIG. 10, liquid flow conduit 708 extends to near the bottom of the excavation shaft 730A. As long as there is sufficient thermal storage liquid within the containment region 700 to submerge lower conduit end 716, the compressed gas in the cover region 702 will not escape via the liquid flow conduit 708 and the cover/storage pressure may be maintained.

Optionally, liquid flow conduit 708 may extend through the upper end wall 24B of excavation shaft 730A as shown, which may reduce the need to excavate another shaft to the bottom of the excavation shaft 730A to install liquid flow conduit 708. Alternatively, the liquid flow conduit 708 may extend through the ground 200.

When in charging mode, compressed gas from compressor/expander subsystem 100 passes through heat exchanger 635 while thermal storage media also passes through heat exchanger 635. Thermal energy can be transferred from the compressed gas stream being conveyed into accumulator 12 to the thermal storage liquid and the heated thermal storage liquid can be stored in thermal storage reservoir 610. When in discharging mode, the process is reversed, and the relatively hot thermal storage liquid is drawn from the containment region 700 and passed through heat exchanger 635 to heat the gas being drawn from the accumulator 12. The cooled thermal storage liquid can then be returned to the source reservoir 606 until needed again.

The compressed gas within accumulator 12 is preferably, in these examples, maintained at substantially a storage pressure that is between about 20 bar and about 100 bar when the compressed gas energy storage system is in use, which can be the same as the cover pressure within the storage reservoir 610. Accumulator 12 will need to be configured to maintain the storage pressure. If accumulator 12 is largely relying on ground 200 to provide the necessary support for maintaining the storage pressure, then the storage pressure chosen will be dependent on the depth of the accumulator underground. As the accumulator is placed deeper underground, there is more ground 200 above the accumulator to support the higher pressure, and as such, the storage pressure may be increased. Ideally, an accumulator will operate at as high a pressure as it can feasible operate, since this will maximize the amount of energy that can be stored in the form of compressed gas.

In some embodiments of the systems described herein, there may be preferential heights and/or constraints on where storage reservoir 606 may be built along excavation shaft 730A. Storage reservoir 606A may need to be built below upper limit plane 19A such that the pressure in the storage reservoir 606A is lower than the fracture pressure of the surrounding rock at the storage reservoir construction depth. For embodiments where the storage reservoir 606A is maintained at the same pressure as the accumulator, this depth may be approximately ⅓ the depth of the accumulator. For embodiments where the storage reservoir 606A is maintained at the same pressure as the accumulator it may also be beneficial to construct storage reservoir 606A above lower limit plane 19B such that the superheated thermal fluid can be transported from the lower depth of the storage chamber 606A to the height of the heat exchangers (e.g. 635) while remaining above its vapor pressure at the storage temperature. For embodiments where the thermal fluid is water, this height may be about ¾ the depth 50 of the accumulator 12. A different height for lower limit plane 19B will exist for different thermal fluids.

In other embodiments, it may be beneficial to construct the thermal storage reservoir 606A at the same depth as the accumulator such that construction time and cost is reduced. In this embodiment the thermal storage chamber may be substantially located inside the accumulator, but will remain fluidly isolated during operation, separated by bulkheads and the surrounding rock.

Figure 11:
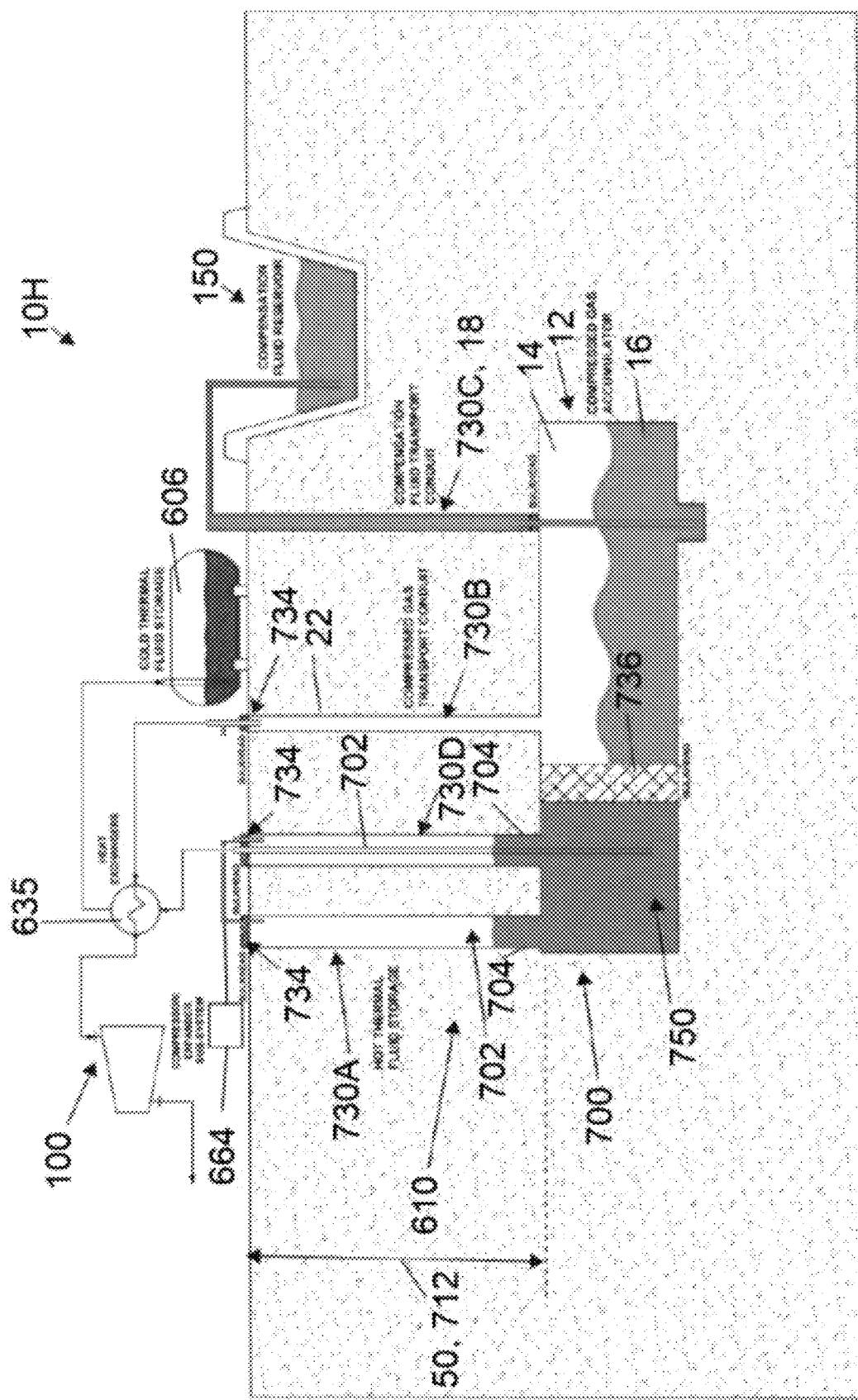
FIG. 11 is a schematic representation of another example of a compressed gas energy storage system.

Referring to FIG. 11, another example of a hydrostatically compensated compressed gas energy storage system 10H is schematically illustrated. The compressed gas energy storage system 10H is analogous to the other compressed gas energy storage systems 10 described herein, and analogous features are identified using like reference characters. Features and/or aspects of the system 10H may be utilized in combination with suitable features from any other embodiment of a compressed gas energy storage system, including systems 10 described herein.

In this embodiment, the thermal storage reservoir 610 includes a pair of construction shafts 730A and 730D that are spaced apart from each other. While two shafts 730A and 730D are shown, more than two construction shafts 730 may be included in the thermal storage reservoir 610 in other embodiments.

Each shaft 730A and 730D includes, in this example, an upper end wall 734 as described herein but instead of a being sealed with lower end walls 736, the lower ends 704 of the shafts 730A and 730D are in fluid communication with a reservoir chamber portion 750. Together the interiors of the shafts 730A, 730D and chamber 750 can form the interior of the thermal storage reservoir 610. In the embodiment illustrated in FIG. 13 the chamber 750 and lower portions of the shafts 730A and 730D are shown as forming the containment portion 700, while the interiors of the shafts 730A and 730D each provide part of the cover portion 702.

Figure 13:
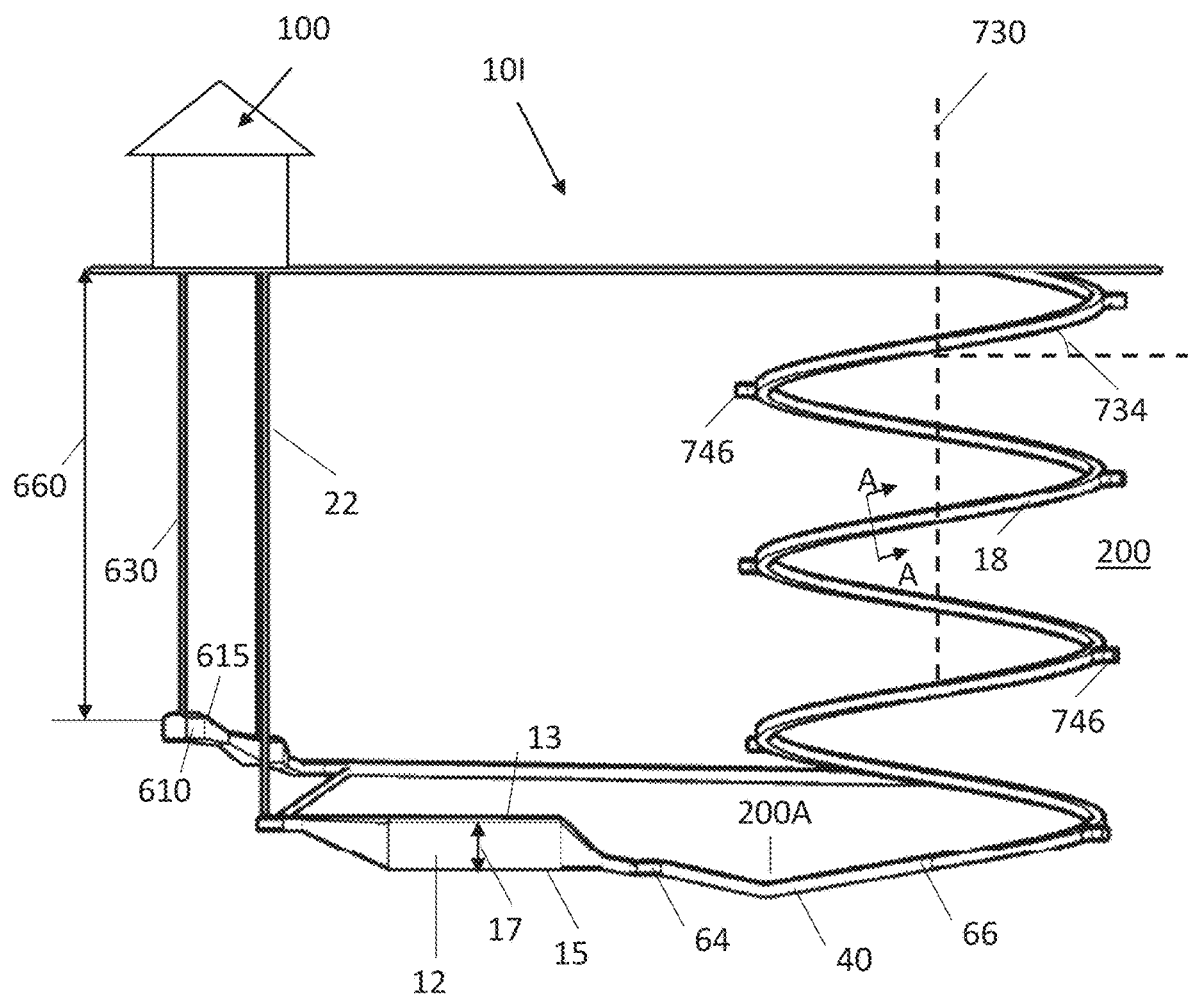
FIG. 13 is a side view of another example of a hydrostatically compressed gas energy storage system.

Optionally, the reservoir chamber portion 750 may be formed separately from the accumulator 12. Alternatively, as shown in the embodiment of FIG. 13, both the reservoir chamber portion 750 and the accumulator 12 may be formed as part of a common cavern that was formed during the construction phase and is then subdivided in a fluid-isolating manner to provide fluidly isolated accumulator 12 and reservoir chamber portion 750 regions. In this example, the accumulator 12 and reservoir chamber portion 750 are separated by a dividing wall 736 that can contain the respective liquid and gas layers and can withstand the expected pressure differential between the accumulator 12 and reservoir chamber portion 750. The dividing wall 736 may be formed from concrete or any other suitable material.

When arranged in this manner, the thermal storage reservoir 610 at least partially vertically overlaps the accumulator 12, and in particular the accumulator 12 and reservoir chamber portion 750 are at the same depth. This may help simplify the construction of the accumulator 12 and reservoir chamber portion 750 and may help reduce the overall cost and construction time required to create the system 10H.

Preferably, but optionally, if the reservoir chamber portion 750 is at the same depth as the accumulator 12 a thermal storage compressor 664 can be integrated into the system (as shown using dashed lines in FIG. 13) to help pressurize the cover region 702 when desired, which may help with the transport of the liquid within the reservoir chamber portion 750 to the surface.

Optionally, instead of using a liquid as the thermal storage media, a system may be configured to utilize a solid, optionally granular thermal storage media as part of the thermal storage system 120. This may eliminate the need to pump or otherwise transport the thermal storage media and may reduce and/or eliminate the need to pressurize the thermal storage subsystem 120, as a solid thermal storage media will not boil at elevated temperatures in the same manner that a liquid thermal storage media would.

Figure 12:
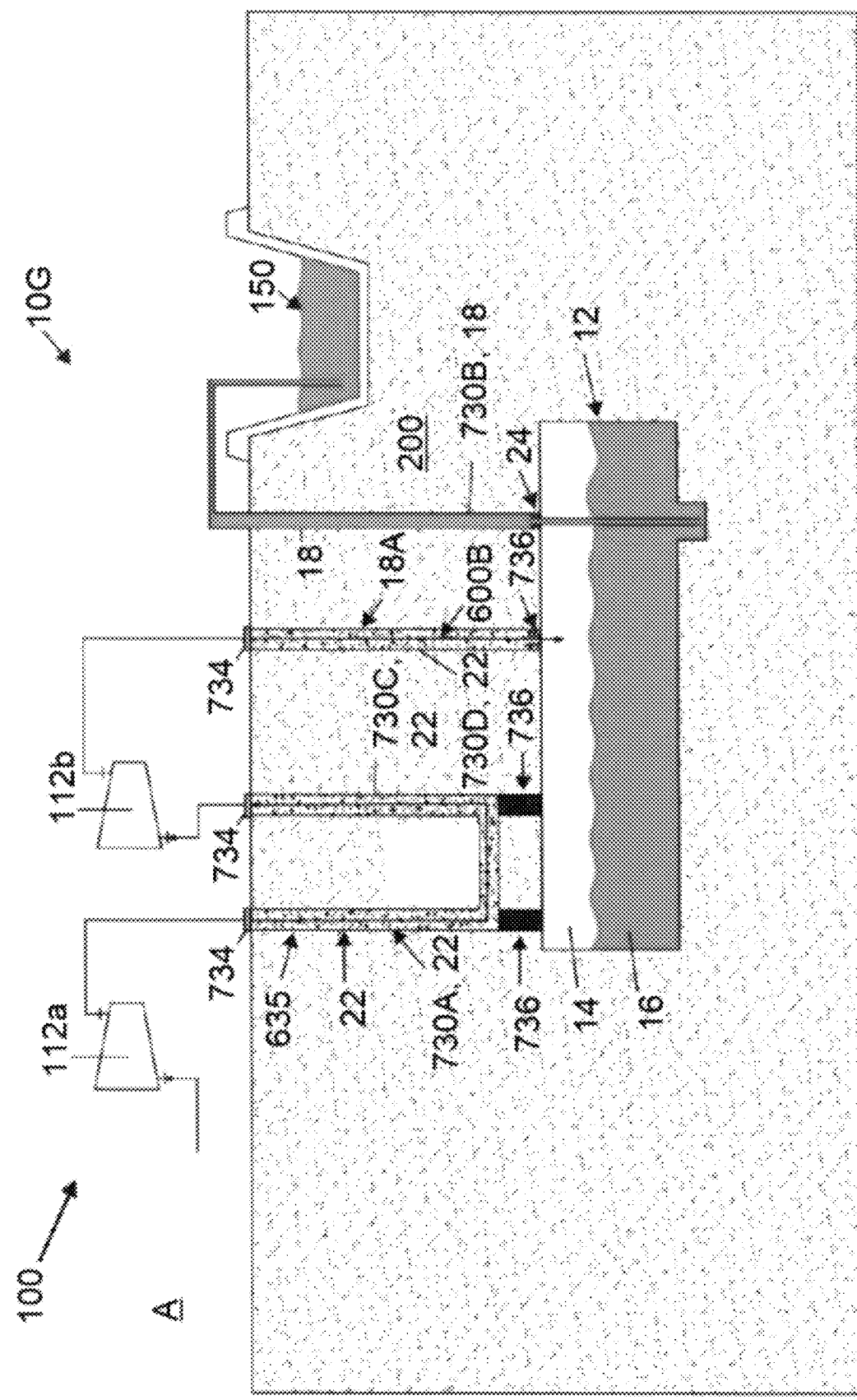
FIG. 12 is a schematic representation of another example of a compressed gas energy storage system.

Referring to FIG. 12, an alternative embodiment of a system 10G that is analogous to the other systems described herein includes a solid thermal storage media 600B instead of utilizing a thermal storage liquid. In this example, the system 10G includes four shafts 730A-D, which are utilized during cavern construction and converted during the transition period before the system 10G is ready for use. For embodiments where a solid thermal storage media 600B is utilized, more construction shafts than are required purely for accumulator construction may be built, as this will expedite the speed of accumulator construction and ensure that the correct number of shafts have been constructed for thermal media storage. The number of construction shafts may be selected to match the number of compression stages based on the formula:

(Number of construction shafts)=((Number of compressions stages)−1)*2+2.

Alternatively, one or more shafts may be added during the transition phase if not all of the shafts 730 were required during construction.

Instead of circulating a liquid between the source and storage reservoirs as shown in the embodiments of FIGS. 9-10, in this example the shafts 730A, C and D are covered in the same manner as described above and are each configured to contain a quantity of a solid, granular thermal storage media 600B in the form of as crushed stone, gravel or the like.

The shaft 730B is again repurposed to provide the hydrostatic compensation shaft 18 as described herein.

In this configuration, when in charging mode, the relatively hot gas exiting compressor/expander subsystem 100 is passed through the shafts 730A, CB and D in series, comes into direct contact with the solid thermal storage medium 600B, and can transfer thermal energy from the gas into the rocks/gravel, as illustrated using the flow arrows in FIG. 12.

In discharging mode, gas exiting the accumulator follows in the opposite direction as the flow arrows in FIG. 12, and passes back through the shafts 730A, C and D where it again contacts the rocks/gravel to absorb thermal energy.

Further, FIG. 12 illustrates a possible embodiment where multiple connected shafts are used. There are two compression stages 112a and 112b in the compressor/expander subsystem 100, and the gas passes through the three shafts 730A, C and D. After being compressed by second compressor 112b, the gas can then flow generally downwardly through shaft 730D into the accumulator 12. Other systems may have other arrangements of shafts 730 containing a suitable thermal storage media.

Creating a longer air flow path by joining the shafts 730A and 730C in this manner may help facilitate the use of relatively more thermal storage particles than could be contained only in one of the shafts 730A or 730C, which may provide more opportunity for the compressed gas to contact the thermal storage particles and thus more energy to be captured and stored by the thermal storage particles. As the second excavation shaft 730C originally could access the interior of the accumulator, it is desirable to seal off access via lower dividing wall 736 to ensure the compress gas flows through the entire long path rather than directly into accumulator 12. Similarly, an upper end wall 734 can be used to isolate the shafts 730A and 730C from the atmosphere and preserve the high pressure within the gas flow path.

There are several possibilities for thermal storage media 600B. In one embodiment, the thermal storage media comprises granular, thermal storage particles. These granular, thermal storage particles may further comprise stone/rock particles. By using relatively small particles, there is a greater amount of surface area, and thus there is more opportunity for contact, which is useful when a direct heat exchanger is used since there will be more thermal energy transferred. Relatively small particles may also be easier to install or replace than larger solid thermal storage media. By using relatively larger particles, there is more void space and in turn a less obstructed flow path, which will decrease the pressure drop of the compressed gas travelling along the flow path. Thus, a balance must exist to choose the correct particle size.

In contrast with the embodiments illustrated in FIG. 10, the embodiment of FIG. 12 employs at least a portion of the gas flow path between the gas compressor/expand subsystem 100 and accumulator 12 to also operates as a direct contact heat exchanger and part of the thermal storage subsystem 120, whereby the compressed gas flowing through the gas flow path contacts the thermal storage particles. In this arrangement, a substantial portion of the entire gas flow path also acts as a direct heat exchanger 635. In this example the thermal storage particles do not need to be transported, as they will hold the thermal energy. Thus, each of the shafts 730A, C and D acts as the thermal storage reservoir 610 for the thermal storage particles.

Optionally, one or more of the shafts 730 may be provided with a shaft liner that is configured to help facilitate the containment of the thermal storage media that is used in a given embodiment of the system 10. A shaft liner of this nature may have different requirements or capabilities than a liner or similar structure on a shaft that is only intended to be used during the construction phase. For example, conventional shafts used merely for construction may include some type of liner to help maintain stability and/or other desirable operating conditions within the shaft, such as limiting the ingress of ground water, debris or other contaminants. Alternatively, when the shafts 730 are being constructed with the intention of being repurposed as an operating/functional component of the final system 10, other factors beyond what is generally needed for construction, may be consider when creating the shaft liner. For example, a more expensive drilling technique than is required purely for accumulator construction may be selected if this technique leads to preferential shaft permeability after construction.

Optionally, a shaft liner may be installed, replaced or reinforced during the construction phase and it may be modified during the transition phase. For example, a construction shaft liner may be replaced with an operations shaft liner. If construction shaft liner is being replaced, then it will may be removed, and a shaft liner designed to be used for the operating state will be installed. Alternatively, if there is existing construction shaft liner, it may be possible to simply reinforce, modify or overlie such a liner with another shaft liner that would be suitable for the operation phase. In some systems, the shaft liner may have different operating requirements in the construction and use phase. For example, during the construction phase, it may be desirable for a shaft liner to provide structural reinforcement, contain debris, limit the ingress of ground water, debris or other contaminants and other such attributes but need not generally be thermally insulative, temperature resistance, vapour impermeable or the like. However, a shaft liner for the use phase may have different operating requirements, such as being thermally insulative and providing a thermal conductivity of 0.02 W/m K to 60 W/m K, being substantially liquid and vapour impermeable, and be able to with stand relatively higher operating pressures and temperatures. Alternatively, if the shaft liner used in the construction state is also suitable for the operation state, then the liner may not need to be substantially altered during the transition phase. As it may be cheaper to install a liner with the required properties for use during construction rather than during the transition phase, a liner which meets all of the use requirements may be installed during construction despite a cheaper or simpler liner being available to meet the needs during construction.

Referring to FIGS. 13-16, embodiments of hydrostatically compensated compressed gas energy storage system 10I is illustrated. The system 10I is generally analogous to the systems 10A-10H described herein, and like features are identified using like reference characters. Various aspects of the system 10I are described herein, along with some examples of possible/preferred processes for constructing the system 10I.

Figure 14:
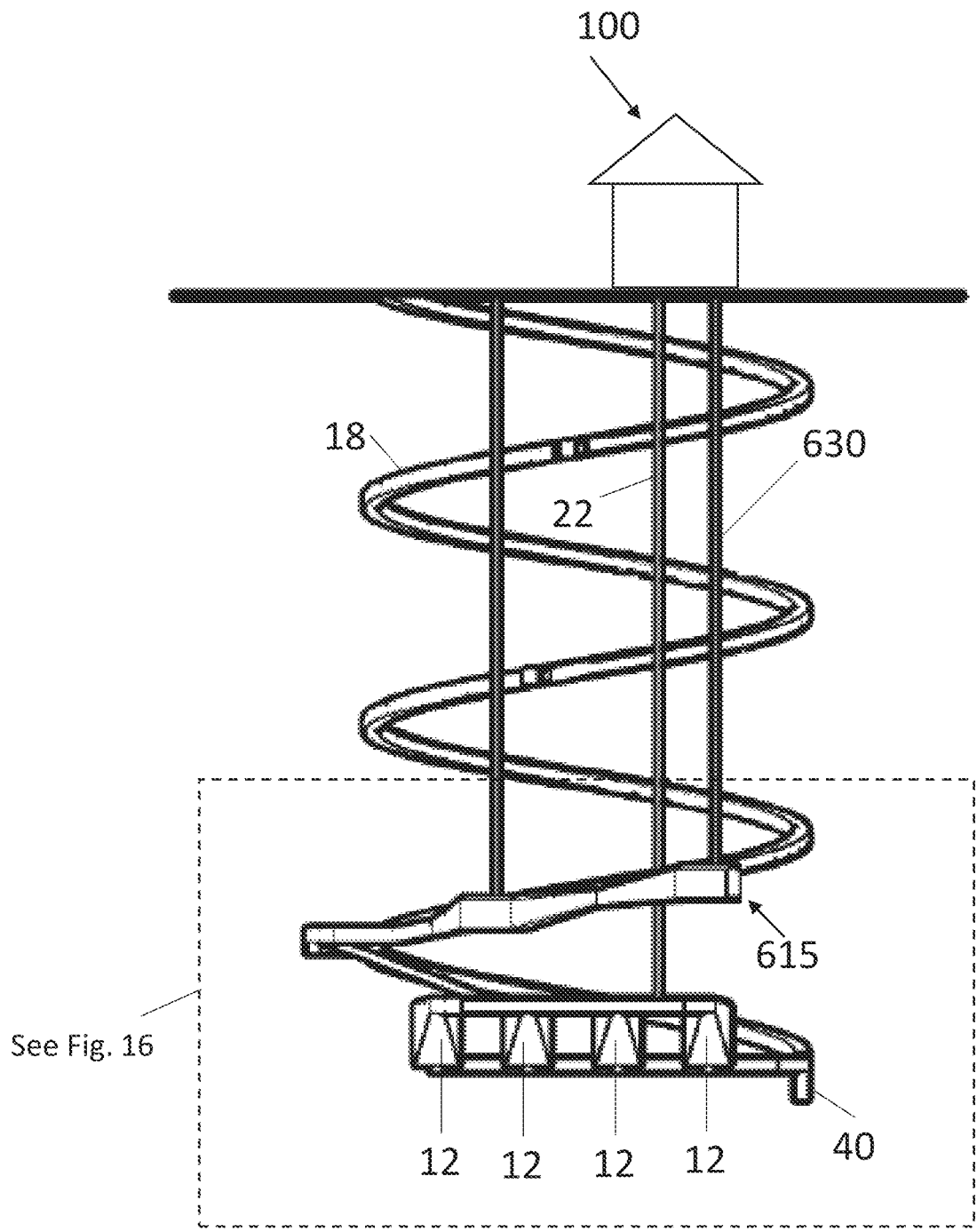
FIG. 14 is an end view of the system of FIG. 13.
Figure 15:
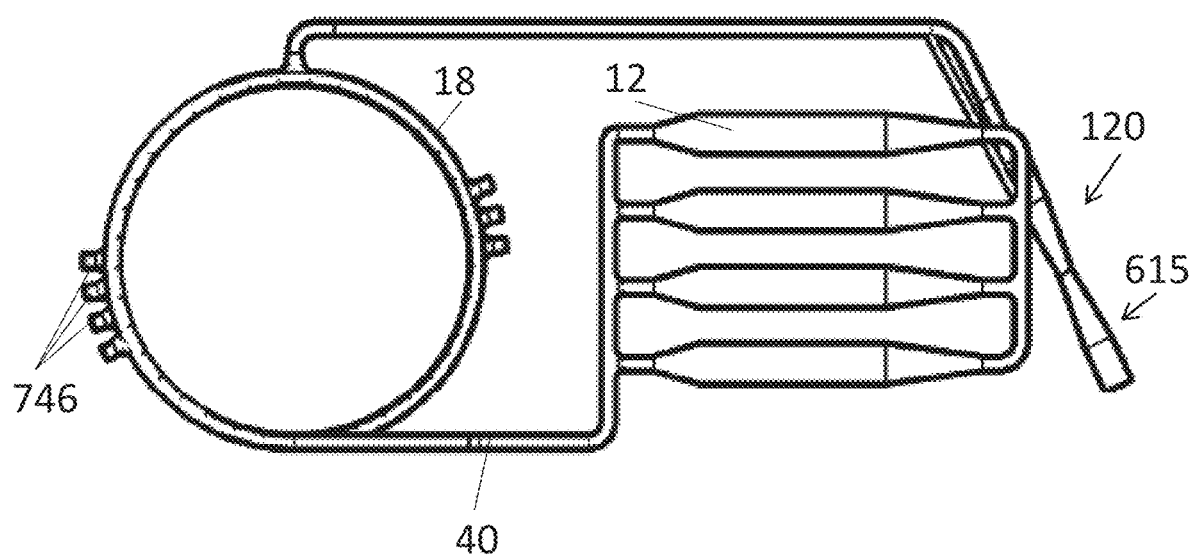
FIG. 15 is a bottom view of the system of FIG. 13.
Figure 16:
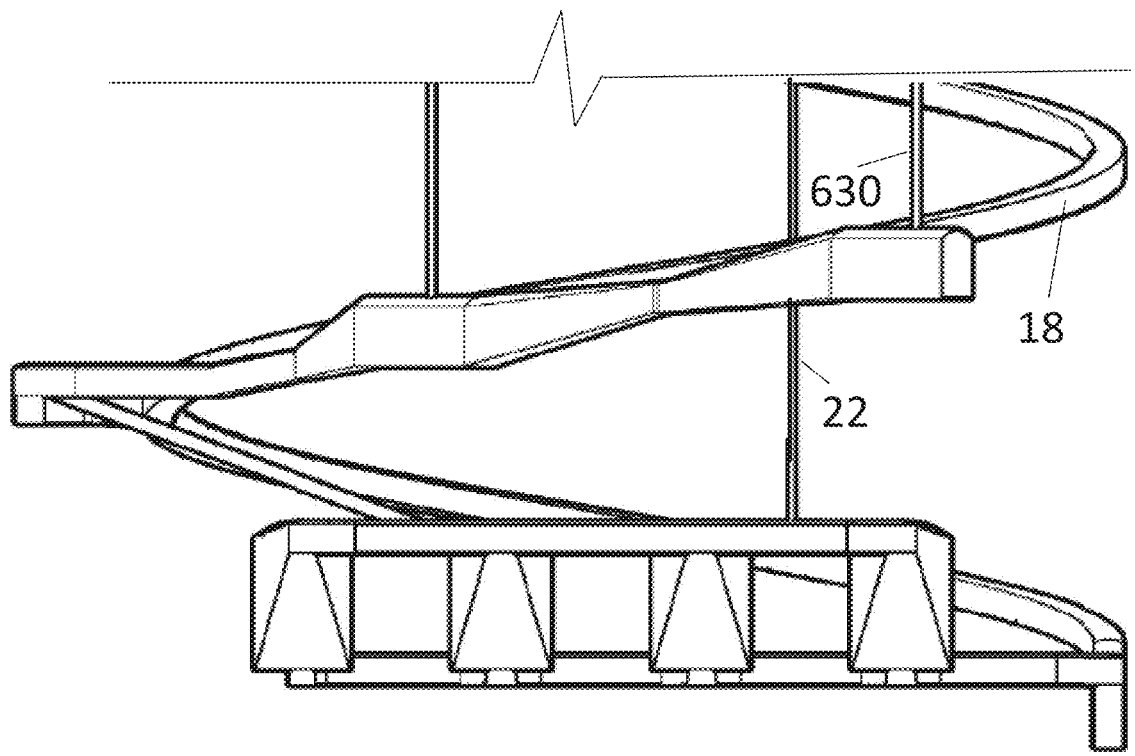
FIG. 16 is an enlarged view of a portion of FIG. 13.

Referring to FIG. 13, a side elevation view of the system 10I shows the location of an accumulator 12 that is positioned underground 200, and a shaft/decline 18 that is provided in the form of a generally downwardly spiraling decline that winds around a decline axis 730. FIG. 14 shows and end view of the shaft 18, the accumulator 12 and the thermal cavern 615, and FIG. 15 is a bottom plan view of the system 10I (i.e. looking upwardly) showing a bottom plan view of the shaft 18, the accumulator 12 and the thermal cavern 615.

In this embodiment, the shaft 18 can provide at least two different functions. When the system 10I is under construction and/or is at least partially drained in a maintenance mode, the decline 18 is configured to operate as an access road that is suitable to allow the travel of human operators, vehicles (such as trucks, excavators, etc.) and other equipment that may be utilized in the construction or maintenance of the shaft 18 or other system components (such as the accumulator 12, thermal storage system 120, fluid conduit 40 and the like). For example, the shaft 18 may be excavated to its lowest elevation, at which point portions of the fluid conduit 40 can be formed as well as excavating the earth to define a projection 200A to serve as the partition between the shaft 18 and the accumulator 12. The accumulator 12 can then also be excavated, with the excavated material being carried up the shaft 18 to the surface for disposal.

When the system 10I is in operational modes, the shaft 18 may be flooded with water, and may function as the shaft 18 described herein, that can help hydrostatically compensate the accumulator 12. To maintain the system 10I, water can be drained from the shaft 18 and it can again function as a roadway or passage for carrying people and equipment.

Because it is used for multiple purposes, the configuration of the shaft 18 may include some features that are useful for is construction and maintenance uses that may not be required for a shaft design that is not used for construction or maintenance access. For example, the shaft 18 may be declined at a shaft angle 734 that is selected based on the acceptable grade that is traversable by the vehicles and equipment used during construction/maintenance. The average shaft angle 734 may be 8°-12°. In contrast, a shaft 18 that was only intended to be used for the conveyance of fluids may not be limited to such angles, and may, for example, be relatively steeper.

Figure 17:
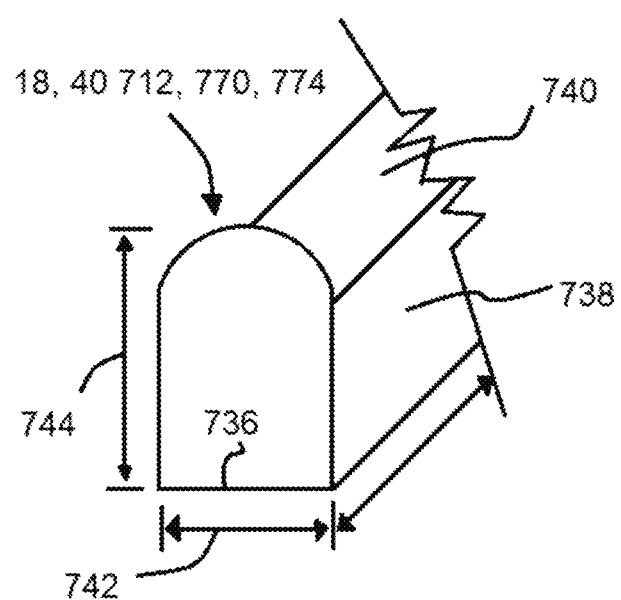
FIG. 17 is a schematic cross-sectional representation of one example of portions of the system of FIG. 13.

Similarly, the shaft 18 in this embodiment may be configured to have a generally flat bottom (i.e. lower surface) that is suitable for vehicles to drive on, and a sufficiently large cross-sectional area to help facilitate for the transportation of heavy equipment, optionally in two directions simultaneously, and removed material in and out of the shaft 18. The sidewalls of the shaft 18 may be generally upright to help provide sufficient height/clearance for construction vehicles, and the roof may be flat, arched or have any suitable shape. Referring also to FIG. 17, a representative cross-sectional view of the shaft 18 (as if taken along line A-A in FIG. 13) shows one example in which the shaft 18 has a generally flat lower wall 736, generally vertical sidewalls 738 and an arched upper wall 740. The shaft 18 has a width 742 and a height 744 that is sufficient to accommodate construction vehicles. Both the width 742 and height 744 may be between 3 m and about 12 m or more, and preferably may be between about 5 m and about 8 m, and may each be about 6 m in some embodiments.

Optionally, the shaft 18 may include one or more turnarounds spaced along its length. The turnarounds 746 (FIG. 13) can be sized to accommodate the expected construction vehicles and can allow vehicles to pull out of the main shaft 18 to allow another vehicle to pass and/or to turn around and change direction. Optionally, the turnarounds 746 may be spaced approximately every 30-60 m of depth of the shaft 18 to allow for vehicles to turnaround a portion of the distance along the shaft 18.

A shaft configured solely for fluid use need not have such a configuration, and could instead have a round cross-sectional area.

Similarly, some of the features of the shaft 18 may be selected based on its intended use as system hydrostatic compensation line are, and may not be required in a conventional underground roadway.

For example, the walls 736, 378 and/or 740 may be constructed to be smoother than would be required for a typical mine access road, as providing smooth walls may help facilitate water flow within the shaft 18 when flooded.

Figure 18:
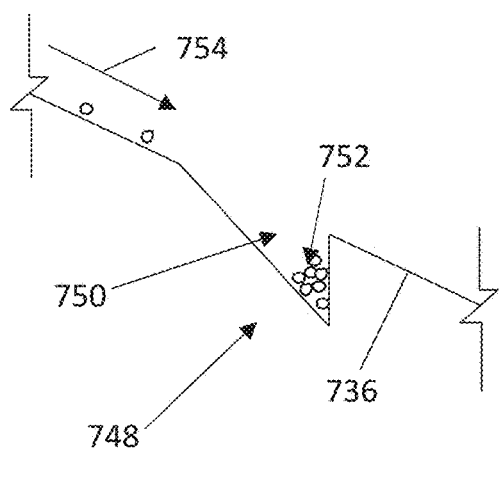
FIG. 18 is a schematic representation of one example of a debris catchment.
Figure 19:
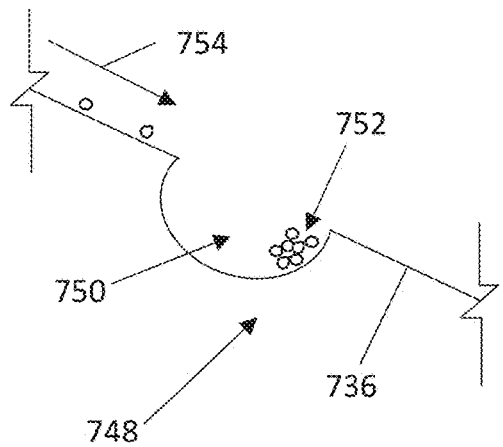
FIG. 19 is a schematic representation of another example of a debris catchment.

Similarly, the shaft 18 may include one or more debris catchments that are positioned along its length. When water is flowing down the shaft 18, rocks and other debris may be carried down the shaft 18 with the water. Being denser than water, most such debris may slide/roll along the lower wall 736 of the shaft 18 and may generally travel downwardly within the shaft 18, toward the liquid supply conduit 40 and the accumulator 12. If sufficient debris accumulates in the liquid supply conduit it may affect operation of the system 10I. To help inhibit the movement of such debris, the lower wall 736 of the shaft 18 may include one or more recessed debris catchments, two examples of which are schematically illustrated in FIGS. 18 and 19. In FIG. 18, the debris catchment 748 includes a generally flat, declined surface that helps define a catchment interior 750 that can receive and at least temporarily contain rocks 752 that are travelling down the lower wall 736 in a downward flow direction, indicated via arrow 754. Rocks 752 that have accumulated in the catchment interior 750 can be cleared out when the shaft 18 is drained for maintenance. The debris catchment 748 in FIG. 19 has an analogous function, and includes a generally curved lower wall bounding the catchment interior 750 instead of an inclined linear surface. In both embodiments, the catchment interior 750 is recessed below the level lower wall 736 driving surface within the shaft 18. Multiple debris catchments 748 can be spaced apart from each other along the length of the shaft 18.

In some configurations, the debris catchments 748 may be configured such that they can be traversed by construction vehicles. Alternatively, the debris catchments 748 may be generally impassible by construction vehicles (i.e. may be too deep, have steep angles of approach, etc.). In such embodiments, the debris catchments 748 may be formed after construction of the rest of the system 10I is substantially complete, such that the debris catchments 748 may be formed as the construction vehicles exit the shaft 18 for the last time, leaving the shaft 18 generally impassible. To allow vehicles to traverse the shaft 18 during maintenance, the debris catchments 748 may be filled in or otherwise covered to accommodate vehicle traffic.

Figure 20:
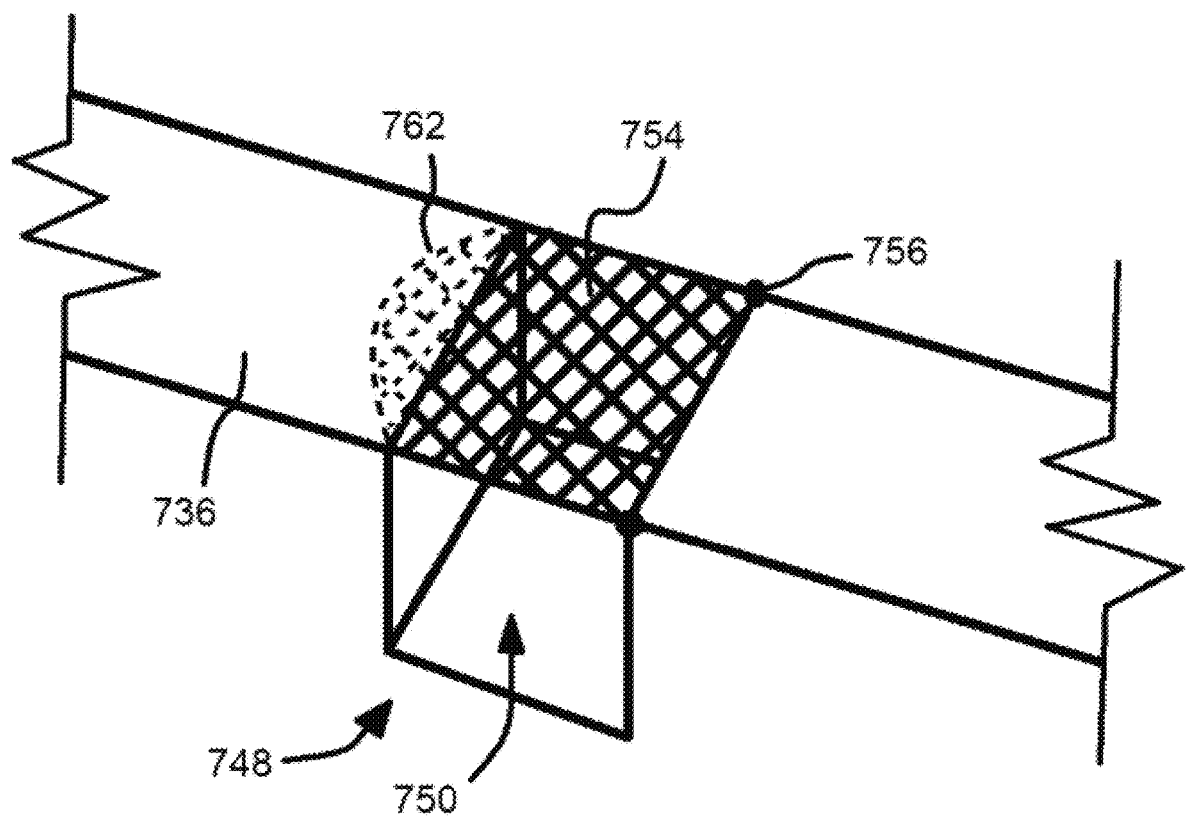
FIG. 20 is a schematic representation of another example of a debris catchment with a cover in a closed position.
Figure 21:
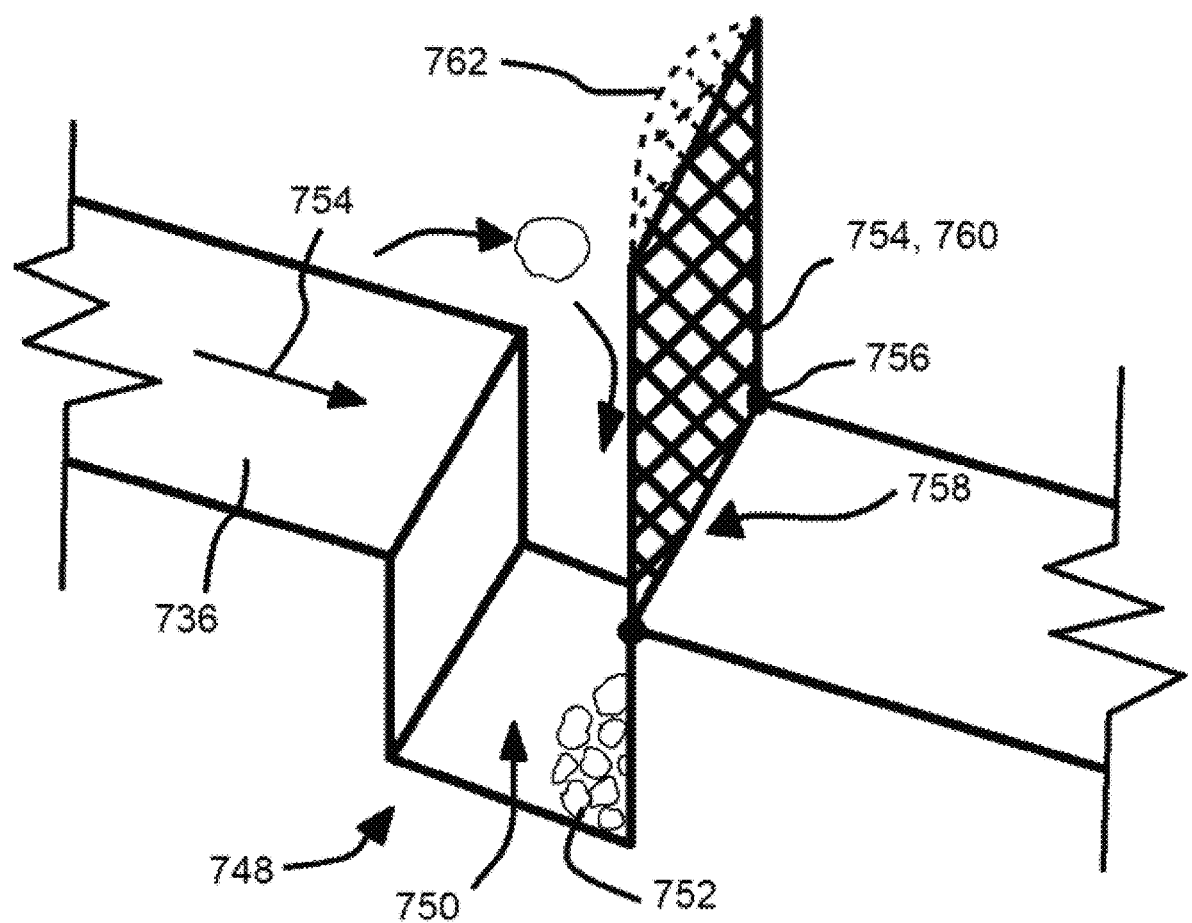
FIG. 21 is the debris catchment of FIG. 20 with the cover in an open position.

In one embodiment, shown schematically in FIGS. 20 and 21, the debris catchments 748 may include a moveable cover member 754 that can be moved between a closed position (FIG. 20) in which the cover 754 provides a bridge across the catchment interior 750 that can be traversed by a vehicle, and an open position (FIG. 22) in which the top of the catchment interior 750 is open to receive rocks 752. The cover member 754 may be detachable, pivotable, for example using about hinges 756, or may be other wise movable.

Preferably, if the cover 754 is pivotable it may be connected to the downstream side 758 of the debris catchment 748. In this configuration, the cover 754 may be less likely to inhibit rocks 752 from entering the catchment interior 750, and may serve as a backstop against which some rocks 752 entrained in the flowing water may hit and then fall downwardly into the catchment interior 750 (FIG. 21).

Optionally, the cover 754 may have openings which may help reduce the drag or blockage of water flowing through the shaft 18 when the cover 754 is open as shown in FIG. 21. For example, the cover 754 may be formed from a metal grate or the like.

It may also be desirable to provide one or more dispersion members along the length of the shaft 18 to help disperse/disrupt any gas bubbles that may be travelling upwardly through the shaft 18 when flooded. This may be advantageous as it may help break relatively large bubbles (that may displace an undesirable amount of water out of the shaft 18) into relatively smaller bubbles that pose less of a displacement risk. Such dispersion members may include projections extending into the interior of the shaft 18, grates, meshes and the like.

Figure 22:
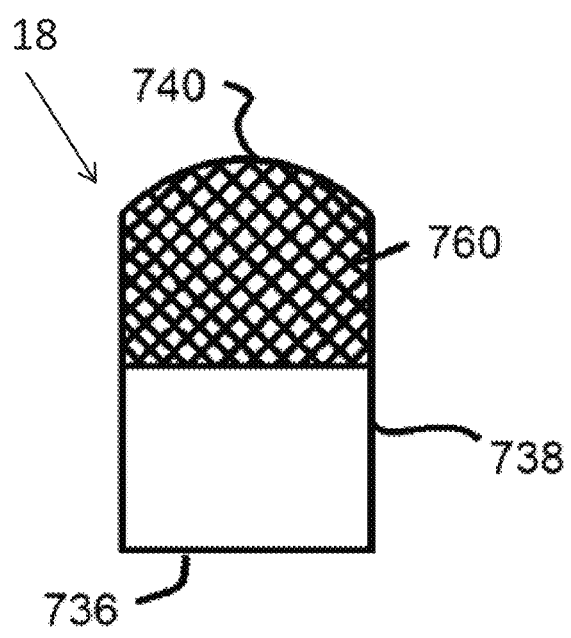
FIG. 22 is a schematic cross-sectional representation of one example of a dispersion grate.

FIG. 22 is a schematic representation of the shaft 18 with a dispersion member in the form of a grate 760 covering an upper portion of the interior, as bubbles may tend to collect along the upper wall 740 of the shaft 18. In such examples, the grate may be configured to cover between about 10% and about 50% of the cross-sectional flow area of the shaft 18. Optionally, the dispersion grates 760 provided toward the upper portion of the shaft 18 may be generally larger (i.e. cover a larger portion of the shaft 18 cross-sectional area) than the dispersion grates 760 provided toward the lower portions of the shaft 18.

Figure 23:
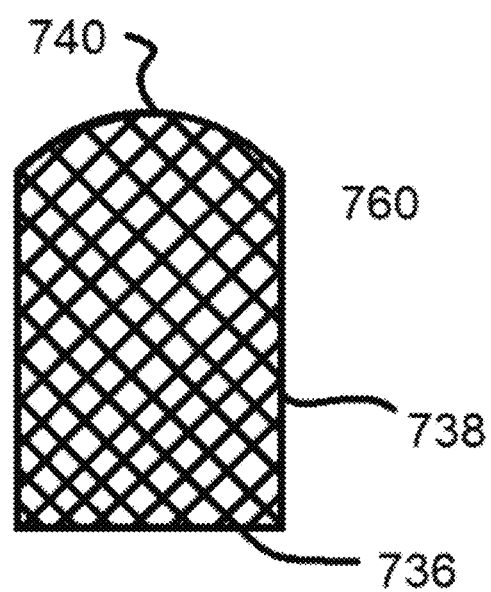
FIG. 23 is a schematic cross-sectional representation of another example of a dispersion grate.

Alternatively, as shown in FIG. 23, the grate 760 (or other suitable member) may cover substantially the entire area of the shaft 18. Referring again to FIGS. 20 and 21, in some embodiments the cover 754 that is used to cover the debris catchments 748 in the construction and maintenance operations may be formed from a grate that can also function as the dispersion grate 760 when in the open position. In such examples, the grate 760 may include a curved distal end 762 (shown in dashed lines in FIGS. 20 and 21) to help the distal end 762 of the cover 754 to generally match the shape of the upper wall 740 of the shaft 18.

While an inclined shaft 18 is generally preferred (e.g. spiral as in FIG. 13, linear as in FIGS. 10-12 or another configuration) as relatively less infrastructure and associated construction cost is required. Alternatively, as shown in some of the schematic examples, the shaft used in combination with system 10I may be a generally vertical. In such embodiments, hoists or other such infrastructure may be provided to help transport people and equipment from the surface and into the shaft. A generally vertical shaft of this nature may be advantageous for brownfield/retrofit-type projects in which the embodiments of the systems described herein may make use of an existing vertical mineshaft, or for projects where faster excavation rates and/or construction time are desired.

Preferably, the beginning of the decline/shaft 18 construction may be performed at the same time as the source/sink 150 construction for some projects, such as closed loop projects utilizing a purpose-built reservoir, as described herein. This may be advantageous for the purpose of reducing overall construction time, as well as for providing a dewatering reservoir to pump groundwater ingress once the construction of the shaft 18 is below the level of the water table.

In the examples disclosed herein, any or all of the shafts and the accumulator may, for example, have a liner that is provided inside the shaft or accumulator and is preferably configured to cover at least a portion of an inner surface of the shaft or accumulator and it may be configured to be substantially liquid impermeable. This may not be necessarily required during the construction phase but may help facilitate the retention and/or storage of liquid, such as a thermal storage liquid, within the shaft 730A after it has been converted into an operating component.

The type of liner that is used may depend on the hydraulic conductivity of the rock surrounding the shafts or accumulator. For example, for hydraulic conductivities of $<1\times10^{-7}$ m/s, the rock is sufficiently impermeable to maintain leakage to acceptable levels and no liner is needed. For hydraulic conductivities of $1\times10^{-7}$ m/s to $1\times10^{-5}$ m/s, grout may be pressure injected into the rock surface, impregnating the cracks, fissure and pores with grout. Pressure injection grouting for reducing water inflow through fractures and joints or for stabilizing unconsolidated ground typically involves drilling a pattern of holes into the fractured, jointed, or unconsolidated ground and pressure injecting cement-based or chemical-based grouts through a packer installed near the hole's collar. Grout injection continues until refusal or until portions of the grout recirculates back to the excavated opening through open joints or fractures. Several rounds of drilling and pressure grouting may be required to effectively reduce the water inflow or reconsolidate broken ground. To effectively stop or reduce water inflow, the grout fills the open fractures or joints, impeding water flow. Special chemical grouts may be used to reconsolidate ("glue") unconsolidated/broken rock together so they behave as a solid rock mass. For hydraulic conductivities of $>1\times10^{-5}$ m/s, a thick concrete liner may be installed on the walls of the shaft or accumulator. The thickness of the concrete may be approximately 1m and may be sized to resist the pressure difference present during construction and depressurized maintenance of the groundwater on one side (substantially similar to storage pressure) and atmospheric air on the other Optionally, a shaft liner that is configured to be used on a shaft that is to be repurposed after the construction phase is complete, may be configured to provide a thermal conductivity of 0.02 W/m K to 60 W/m K. While thermal conductivity between a shaft and the surrounding ground may not be particularly important during the construction phase, it may, during operation, help inhibit the transfer of thermal energy between the thermal storage media (or the like) that is contained within the repurposed shaft 730 and the surrounding ground 200.

The shaft liner may be constructed from any suitable material that can provide the desired liquid (i.e. water) and gas impermeability and that preferably can withstand operating temperatures and pressures when the system 10 is use that are relatively higher, and possibly substantially higher, than the ambient temperature and pressure conditions that may be expected during a typical construction phase. For example, if the shaft 730 is repurposed as the thermal storage reservoir containing the heated thermal storage media, it may be expected to be exposed to operating temperatures that are between about 150 and 300 deg. C., and possibly more than 300 deg. C. depending on the particular system design, without failing prematurely or otherwise affecting the operation of the system. In contrast, temperatures during the construction phase may be expected to be between 0° C. and 40° C.

Similarly, the shaft liner may be constructed so that its liquid impermeability and/or temperature resistance will maintain their desired levels/values when subjected to relatively high operating pressures when the system is in use. In contrast to the construction phase, during which the interior of the shaft is exposed to approximately atmospheric pressure, the operating pressure within the shaft 730 when the system is in use may be substantially higher (e.g. if filled with a pressurized liquid) and the shaft liner may be exposed to operating pressures of between about 20 bar and about 100 bar, and possibly 40 bar and 80 bar.

A given shaft liner may be formed from any material that can meet both the construction and operation state performance requirements and may include a steel shaft liner used for blind boring, or any suitable liner fabricated from concrete, metal, or plastics.

Preferably, when the systems described herein are being constructed, a shaft liner may be installed in a given shaft (730A, 730B, 730C, etc.) that is suitable for both the construction phase requirements and the operation phase requirements. This may allow a common shaft liner to be used throughout the life of the system 10 and may eliminate the need to install a secondary liner prior to the operation/use phase. Alternatively, a shaft liner installed during the construction phase may be suitable for the requirements of the construction phase but may not have all of the features required during the use phase and/or may be unsuitable for the operation/use phase. Another possibility is that no shaft liner was installed during the construction phase, but the operating requirements of the operation phase would dictate the use of a shaft liner. If a change in the nature/properties of a shaft liner is required when transitioning from construction to use phases the liner installation may be done during the transition state, as described below.

When excavation is complete, liner installation can begin. As liner installation may require a specialized crew with training for liner installation, it may be preferential that the optional liners for the accumulator 12 and any shafts are installed at the same time if required.

In some examples, the following steps may be required for liner installation: application of a shotcrete base over the rock surface, application of a geotextile over the installed shotcrete, and installation of the substantially impermeable membrane or thin spray on liner over the geotextile layer.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A method of reusing at least a first construction shaft utilized for construction of a hydrostatically compressed air energy storage system during operation of the hydrostatically compressed air energy storage system, the method comprising:
   step a) conveying at least a first construction apparatus into or out of an underground accumulator through the first construction shaft when constructing the accumulator;
   step b) removing the first construction apparatus from the accumulator and the first construction shaft;
   step c) converting the first construction shaft to become an operating component of the hydrostatically compressed air energy storage system by fluidly connecting the first construction shaft to form part of at least one of:
      i. an air flow path fluidly connecting a gas compressor/expander subsystem with a layer of compressed gas within the accumulator;
      ii. a compensation liquid flow path fluidly connecting a compensation liquid reservoir and a layer of compensation liquid within the accumulator; and
      iii. a thermal fluid flow path fluidly connecting a thermal source reservoir and a thermal storage reservoir;
   the method further comprising operating the hydrostatically compressed air energy storage system in at least one of:
      a charging mode in which the gas compressor/expander subsystem convey compressed air at a storage pressure into the layer of compressed air which displaces a corresponding amount of compensation liquid from the layer of compensation liquid out of the accumulator via the compensation liquid flow path thereby maintaining the layer of compressed air at substantially the storage pressure during the charging mode;
      a discharging mode in which air from the layer of compressed air exits the accumulator and drives the gas compressor/expander subsystem and a corresponding amount of compensation liquid is re-introduced into the layer of compensation liquid within the accumulator thereby maintaining the layer of compressed air at substantially the storage pressure during the discharging mode; and
      a storage mode in which there is no flow of the compressed air or compensation liquid and the layer of compressed air and the layer of compensation liquid are retained within the accumulator at substantially the storage pressure.

2. The method of claim 1 wherein the step a) further comprises transporting construction debris from an interior of the accumulator to a surface via the first construction shaft.

3. The method of claim 1, further comprising providing a hoist at an upper end of the first construction shaft for raising and lowering the at least one of the first construction apparatus, construction personnel, or construction debris within the first construction shaft during the steps a) and b) and then removing the hoist.

4. The method of claim 1, wherein the first construction shaft forms part of the compensation liquid flow path for conveying compensation liquid between the compensation liquid reservoir and an interior of the accumulator via the first construction shaft.

5. The method of claim 1, further comprising lining an interior surface of the first construction shaft with a shaft liner that is substantially liquid impermeable, and wherein the step b) is completed with the shaft liner in place.

6. Use of a first construction shaft as a fluid conveying component of a hydrostatically compressed air energy storage system, the first construction shaft extending from a surface of ground to an underground accumulator and being sized and configured to accommodate a passage of a construction apparatus therethrough when the hydrostatically compressed air energy storage system is being constructed, and wherein when the hydrostatically compressed air energy storage system is in use the first construction shaft is configured to be part of at least one of:
   a) an air flow path extending between a compressor/expander subsystem and an underground accumulator containing a layer of compressed air atop a layer of compensation liquid;
   ) a compensation liquid flow path extending between a compensation liquid reservoir and the underground accumulator containing the layer of compressed air atop layer of the compensation liquid; and
   c) a thermal fluid flow path fluidly connecting a thermal source reservoir and a thermal storage reservoir;
   wherein the hydrostatically compressed air energy storage system is configured to be operated in at least one of:
      a charging mode in which a gas compressor/expander subsystem conveys compressed air at a storage pressure into the layer of compressed air which displaces a corresponding amount of compensation liquid from the layer of compensation liquid out of the underground accumulator via the compensation liquid flow path thereby maintaining the layer of compressed air at substantially the storage pressure during the charging mode;
      a discharging mode in which air from the layer of compressed air exits the underground accumulator and drives the gas compressor/expander subsystem and a corresponding amount of compensation liquid is re-introduced into the layer of compensation liquid within the underground accumulator thereby maintaining the layer of compressed air at substantially the storage pressure during the discharging mode; and
      a storage mode in which there is no flow of the compressed air or compensation liquid and the layer of compressed air and the layer of compensation liquid are retained within the underground accumulator at substantially the storage pressure.

* * * * *